(12) United States Patent
Hebeisen et al.

(10) Patent No.: US 10,619,415 B2
(45) Date of Patent: Apr. 14, 2020

(54) SKY CAMERA SYSTEM UTILIZING CIRCADIAN INFORMATION FOR INTELLIGENT BUILDING CONTROL

(71) Applicant: Mechoshade Systems, LLC, Middleton, WI (US)

(72) Inventors: Stephen P. Hebeisen, Amawalk, NY (US); Alex Greenspan, Hempstead, NY (US); Joel Berman, Hewlett, NY (US)

(73) Assignee: MECHOSHADE SYSTEMS, LLC, Middleton, WI (US)

( * ) Notice: Subject to any disclaimer, the term of this patent is extended or adjusted under 35 U.S.C. 154(b) by 0 days.

(21) Appl. No.: 16/240,479

(22) Filed: Jan. 4, 2019

(65) Prior Publication Data

US 2019/0136618 A1    May 9, 2019

Related U.S. Application Data

(63) Continuation-in-part of application No. 15/906,674, filed on Feb. 27, 2018, now Pat. No. 10,253,564, and (Continued)

(51) Int. Cl.
   *G05B 5/00*  (2006.01)
   *E06B 9/68*  (2006.01)
   (Continued)

(52) U.S. Cl.
   CPC ........... *E06B 9/68* (2013.01); *F24F 11/30* (2018.01); *F24F 11/62* (2018.01); *G05B 17/02* (2013.01); *H04L 12/2827* (2013.01); *H05B 45/20* (2020.01); *H05B 47/11* (2020.01); *E06B 9/24* (2013.01); *E06B 9/40* (2013.01); (Continued)

(58) Field of Classification Search
   CPC ..... G05B 2219/2642; E06B 2009/6827; E06B 9/24; E06B 9/40; E06B 9/68
   See application file for complete search history.

(56) References Cited

U.S. PATENT DOCUMENTS

| 2,464,623 A | 3/1949 | Vogel |
| 3,042,001 A | 7/1962 | Dubie |

(Continued)

FOREIGN PATENT DOCUMENTS

| CN | 101160444 | 4/2008 |
| CN | 102165132 | 8/2011 |

(Continued)

OTHER PUBLICATIONS

Exam Report dated Jun. 19, 2019 in UK Application No. 1805128.4.
(Continued)

*Primary Examiner* — Karen Masih
(74) *Attorney, Agent, or Firm* — Snell & Wilmer, L.L.P.

(57) ABSTRACT

Intelligent building control systems utilize sky information from a camera or cameras to facilitate control of building systems such as lighting, motorized window coverings, electrochromic glazings, HVAC systems, and so forth. Based on the sky information, interior lighting intensity and/or color temperature may be modified, for example in order to achieve a desired circadian effect for building occupants. In this manner, energy efficiency and occupant comfort and convenience are improved.

16 Claims, 19 Drawing Sheets

Related U.S. Application Data a continuation-in-part of application No. 14/692,868, filed on Apr. 22, 2015, now Pat. No. 9,938,765, which is a continuation of application No. PCT/US2013/066316, filed on Oct. 23, 2013, which is a continuation of application No. 13/671,018, filed on Nov. 7, 2012, now Pat. No. 8,890,456, which is a continuation-in-part of application No. 13/556,388, filed on Jul. 24, 2012, now Pat. No. 8,432,117, which is a continuation of application No. 13/343,912, filed on Jan. 5, 2012, now Pat. No. 8,248,014, said application No. 14/692,868 is a continuation-in-part of application No. 14/461,619, filed on Aug. 18, 2014, now Pat. No. 9,360,731, which is a continuation of application No. 13/656,401, filed on Oct. 19, 2012, now Pat. No. 8,836,263, which is a continuation-in-part of application No. 13/359,575, filed on Jan. 27, 2012, now Pat. No. 8,723,467, which is a continuation-in-part of application No. 13/343,912, filed on Jan. 5, 2012, now Pat. No. 8,248,014, which is a continuation of application No. 12/475,312, filed on May 29, 2009, now Pat. No. 8,120,292, which is a continuation-in-part of application No. 12/421,410, filed on Apr. 9, 2009, now Pat. No. 8,125,172, which is a continuation-in-part of application No. 12/197,863, filed on Aug. 25, 2008, now Pat. No. 7,997,904, which is a continuation-in-part of application No. 11/162,377, filed on Sep. 8, 2005, now Pat. No. 7,417,397, which is a continuation-in-part of application No. 10/906,817, filed on Mar. 8, 2005, now abandoned.

(60) Provisional application No. 62/513,733, filed on Jun. 1, 2017, provisional application No. 60/521,497, filed on May 6, 2004.

(51) Int. Cl.

| | | |
|---|---|---|
| *F24F 11/62* | (2018.01) | |
| *F24F 11/30* | (2018.01) | |
| *G05B 17/02* | (2006.01) | |
| *H04L 12/28* | (2006.01) | |
| *H05B 45/20* | (2020.01) | |
| *H05B 47/11* | (2020.01) | |
| *E06B 9/24* | (2006.01) | |
| *E06B 9/40* | (2006.01) | |

(52) U.S. Cl.
CPC ............... *E06B 2009/2464* (2013.01); *E06B 2009/6809* (2013.01); *E06B 2009/6818* (2013.01); *E06B 2009/6827* (2013.01); *E06B 2009/6863* (2013.01); *Y02A 30/257* (2018.01); *Y02B 80/50* (2013.01)

(56) References Cited

U.S. PATENT DOCUMENTS

| | | |
|---|---|---|
| 3,294,152 A | 12/1966 | Kuijvenhoven |
| 3,675,023 A | 7/1972 | Kunke et al. |
| 3,696,845 A | 10/1972 | Acker et al. |
| 3,710,597 A | 1/1973 | Schmidt |
| 3,860,055 A | 1/1975 | Wild |
| 3,965,348 A | 6/1976 | Anetseder, Sr. et al. |
| 4,204,368 A | 5/1980 | Lockshin |
| 4,377,195 A | 3/1983 | Weil |
| 4,397,346 A | 8/1983 | Chumbley et al. |
| 4,610,294 A | 9/1986 | Anesi et al. |
| 4,622,470 A | 11/1986 | Makino et al. |
| 4,698,276 A | 10/1987 | Duval |
| 4,712,104 A | 12/1987 | Kobayashi |
| 4,727,918 A | 3/1988 | Schroeder |
| 4,766,941 A | 8/1988 | Sloop et al. |
| 4,864,201 A | 9/1989 | Bernot |
| 4,915,763 A | 4/1990 | Swiszcz |
| 4,979,550 A | 12/1990 | Long et al. |
| 5,063,984 A | 11/1991 | Cherveny |
| 5,142,133 A | 8/1992 | Kern et al. |
| 5,205,333 A | 4/1993 | Judkins |
| 5,237,169 A | 8/1993 | Grehant |
| 5,371,447 A | 12/1994 | Boss |
| 5,467,808 A | 11/1995 | Bell |
| 5,532,560 A | 7/1996 | Element et al. |
| 5,566,471 A | 10/1996 | Hirano |
| 5,598,000 A | 1/1997 | Popat |
| 5,648,656 A | 7/1997 | Begemann et al. |
| 5,655,585 A | 8/1997 | Fry |
| 5,662,147 A | 9/1997 | Haiber |
| 5,663,621 A | 9/1997 | Popat |
| 5,675,487 A | 10/1997 | Patterson et al. |
| 5,693,404 A | 12/1997 | Shiraishi |
| 5,793,174 A | 8/1998 | Kovach et al. |
| 6,024,156 A | 2/2000 | Chu |
| 6,064,949 A | 5/2000 | Werner et al. |
| 6,084,231 A | 7/2000 | Popat |
| 6,103,345 A | 8/2000 | Oshima et al. |
| 6,263,260 B1 | 7/2001 | Bodmer |
| 6,307,331 B1 | 10/2001 | Bonasia et al. |
| 6,444,137 B1 | 9/2002 | Collins |
| 6,901,439 B1 | 5/2005 | Bonasia |
| 6,983,783 B2 | 1/2006 | Carmen et al. |
| 7,012,394 B2 | 3/2006 | Moore et al. |
| 7,079,045 B2 | 7/2006 | Baud |
| 7,085,627 B2 | 8/2006 | Bamberger et al. |
| 7,139,617 B1 | 11/2006 | Morgan |
| 7,375,871 B2 | 5/2008 | Libretto et al. |
| 7,417,397 B2 | 8/2008 | Berman et al. |
| 7,631,641 B1 | 12/2009 | Goldman |
| 7,643,908 B2 | 1/2010 | Quirino et al. |
| 7,647,288 B2 | 1/2010 | Friedlander |
| 7,653,609 B2 | 1/2010 | Friedlander |
| 7,925,384 B2 | 4/2011 | Huizenga |
| 7,977,904 B2 | 7/2011 | Berman et al. |
| 8,091,604 B2 | 1/2012 | Kluck |
| 8,120,292 B2 | 2/2012 | Berman |
| 8,125,172 B2 | 2/2012 | Berman |
| 8,248,014 B2 | 8/2012 | Berman |
| 8,275,471 B2 | 9/2012 | Huizenga |
| 8,432,117 B2 | 4/2013 | Berman |
| 8,476,897 B2 | 7/2013 | Favre-Reguillon |
| 8,587,242 B2 | 11/2013 | Berman |
| 8,723,467 B2 | 5/2014 | Berman |
| 8,755,915 B2 | 6/2014 | Huizenga |
| 8,836,263 B2 | 9/2014 | Berman |
| 8,841,859 B2 | 9/2014 | Chemel |
| 8,854,208 B2 | 10/2014 | Huizenga |
| 9,095,013 B2 | 7/2015 | Leinen |
| 9,237,634 B2 | 1/2016 | Knibbe |
| 9,271,375 B2 | 2/2016 | Balasubramanian |
| 9,295,144 B2 | 3/2016 | Bora |
| 9,360,731 B2 | 6/2016 | Berman et al. |
| 9,938,765 B2 | 4/2018 | Berman et al. |
| 2003/0221800 A1 | 12/2003 | Jones |
| 2003/0222587 A1 | 12/2003 | Dowling |
| 2004/0164231 A1 | 8/2004 | Motte |
| 2005/0110416 A1 | 5/2005 | Veskovic |
| 2005/0215147 A1 | 9/2005 | Masters et al. |
| 2005/0234596 A1 | 10/2005 | Rietschel |
| 2006/0185799 A1 | 8/2006 | Kates |
| 2006/0207730 A1 | 9/2006 | Berman et al. |
| 2007/0097484 A1 | 5/2007 | LiBretto |
| 2007/0187042 A1 | 8/2007 | Kalstrom |
| 2007/0248246 A1 | 10/2007 | Cherkassky et al. |
| 2008/0065576 A1 | 3/2008 | Friedlander |
| 2008/0115425 A1 | 5/2008 | Forbis et al. |
| 2008/0172352 A1 | 7/2008 | Friedlander |
| 2008/0177687 A1 | 7/2008 | Friedlander |
| 2008/0177688 A1 | 7/2008 | Friedlander |
| 2008/0236763 A1 | 10/2008 | Kates et al. |
| 2009/0222137 A1 | 4/2009 | Berman et al. |

(56) References Cited

U.S. PATENT DOCUMENTS

| | | | |
|---|---|---|---|
| 2009/0254222 | A1 | 10/2009 | Berman et al. |
| 2010/0157427 | A1 | 6/2010 | Berman et al. |
| 2010/0176733 | A1 | 7/2010 | King |
| 2010/0286937 | A1 | 11/2010 | Hedley et al. |
| 2010/0294915 | A1 | 11/2010 | Williams et al. |
| 2011/0054697 | A1 | 3/2011 | Ma |
| 2011/0164304 | A1 | 7/2011 | Brown et al. |
| 2011/0220299 | A1 | 9/2011 | Berman et al. |
| 2011/0240232 | A1 | 10/2011 | Kluck |
| 2012/0133315 | A1 | 5/2012 | Berman et al. |
| 2012/0242697 | A1 | 9/2012 | Border et al. |
| 2013/0063065 | A1 | 3/2013 | Berman et al. |
| 2013/0087296 | A1 | 4/2013 | Mullet et al. |
| 2013/0261774 | A1 | 10/2013 | Lu et al. |
| 2014/0239817 | A1 | 8/2014 | Leinen et al. |
| 2014/0244044 | A1 | 8/2014 | Davis et al. |
| 2014/0292206 | A1* | 10/2014 | Lashina ............... H05B 37/02 315/149 |
| 2014/0306833 | A1 | 10/2014 | Ricci |
| 2014/0375218 | A1 | 12/2014 | Leinen |
| 2015/0225999 | A1 | 8/2015 | Berman et al. |
| 2015/0232065 | A1 | 8/2015 | Ricci |
| 2015/0286941 | A1 | 10/2015 | Blair et al. |
| 2016/0040478 | A1 | 2/2016 | Lundy et al. |
| 2016/0047164 | A1 | 2/2016 | Lundy et al. |
| 2016/0127642 | A1 | 5/2016 | Schechner et al. |
| 2016/0203403 | A1 | 7/2016 | Nagel et al. |
| 2016/0258209 | A1 | 9/2016 | Berman et al. |
| 2016/0273726 | A1* | 9/2016 | Adler ................... F21S 19/005 |
| 2018/0187484 | A1 | 7/2018 | Hebeisen et al. |

FOREIGN PATENT DOCUMENTS

| | | |
|---|---|---|
| CN | 103513295 | 1/2014 |
| DE | 4023673 | 6/1992 |
| EP | 1069277 | 1/2001 |
| EP | 2518254 | 4/2012 |
| GB | 2443773 | 5/2008 |
| GB | 2462753 | 2/2010 |
| GB | 2462754 | 2/2010 |
| JP | H10317849 | 2/1988 |
| JP | 01219283 | 9/1989 |
| JP | 03017381 | 1/1991 |
| JP | 04044589 | 2/1992 |
| JP | 1072985 | 3/1998 |
| JP | 2000054762 | 2/2000 |
| JP | 2000096956 | 4/2000 |
| JP | 2001295154 | 10/2001 |
| JP | 2002 092597 | 3/2002 |
| JP | 20020129852 | 5/2002 |
| JP | 2011013036 | 1/2011 |
| JP | 2015 055591 | 3/2015 |
| JP | 2015055591 | 3/2015 |
| WO | 1992000557 | 1/1992 |
| WO | 2007006775 | 1/2007 |
| WO | 2014074308 | 5/2014 |

OTHER PUBLICATIONS

Office Action dated Aug. 8, 2019 in CN Application No. 201810145649.0.
Re-Exam Report dated Mar. 19, 2019 in UK Application No. GB1413226.0.
Non-Final Office Action dated Feb. 3, 2019 in Chinese Application No. 201810145649.0.
Exam report dated Apr. 12, 2019 in UK Application No. 1507466.9.
Exam Report dated May 8, 2019 in UK Application No. GB1413226.0.
Exam Report dated Jun. 20, 2019 in UK Application No. GB1413226.0.
USPTO; Office Action dated Mar. 16, 2009 for U.S. Appl. No. 11/539,559.
USPTO; Office Action dated Sep. 14, 2009 for U.S. Appl. No. 11/539,559.
USPTO; Notice of Allowance dated Nov. 9, 2009 for U.S. Appl. No. 11/539,559.
USPTO; Office Action dated Apr. 21, 2008 for U.S. Appl. No. 11/162,377.
USPTO; Office Action dated May 22, 2008 for U.S. Appl. No. 11/162,377.
USPTO; Notice of Allowance dated Jul. 11, 2008 for U.S. Appl. No. 11/162,377.
USPTO; Notice of Allowance dated Apr. 27, 2011, U.S. Appl. No. 12/197,863.
USPTO; Restriction Requirement dated Mar. 7, 2011, U.S. Appl. No. 12/197,863.
USPTO; Office Action dated Apr. 6, 2011, U.S. Appl. No. 12/197,863.
USPTO; Office Action dated Sep. 21, 2011 in U.S. Appl. No. 12/421,410.
USPTO; Office Action dated Oct. 19, 2011 in U.S. Appl. No. 12/475,312.
USPTO; Notice of Allowance dated Dec. 12, 2011 in U.S. Appl. No. 12/475,312.
USPTO; Notice of Allowance dated Jan. 11, 2012 in U.S. Appl. No. 12/421,410.
USPTO; Office Action dated May 15, 2012 in U.S. Appl. No. 13/343,912.
USPTO; Notice of Allowance dated Jun. 28, 2012 in U.S. Appl. No. 13/343,912.
USPTO; Notice of Allowance dated Jan. 3, 2013 in U.S. Appl. No. 13/556,388.
USPTO; Restriction Requirement dated Mar. 8, 2013 in U.S. Appl. No. 13/116,281.
USPTO; Office Action dated Apr. 3, 2013 in U.S. Appl. No. 13/116,281.
USPTO; Notice of Allowance dated Jun. 27, 2013 in U.S. Appl. No. 13/116,281.
USPTO; Notice of Allowance dated Jul. 23, 2013 in U.S. Appl. No. 13/786,002.
USPTO; Notice of Allowance dated Mar. 19, 2014 in U.S. Appl. No. 13/359,575.
USPTO; Office Action dated May 28, 2014 in U.S. Appl. No. 13/656,401.
USPTO; Notice of Allowance dated Jul. 15, 2014 in U.S. Appl. No. 13/656,401.
USPTO; Office Action dated Jul. 23, 2014 in U.S. Appl. No. 13/671,018.
USPTO; Office Action dated Feb. 8, 2016 in U.S. Appl. No. 14/461,619.
USPTO; Notice of Allowance dated Mar. 29, 2016 in U.S. Appl. No. 14/461,619.
USPTO; Office Action dated Feb. 9, 2017 in U.S. Appl. No. 14/692,868.
USPTO; Final Office Action dated Jul. 13, 2017 in U.S. Appl. No. 14/692,868.
USPTO; Advisory Action dated Sep. 8, 2017 in U.S. Appl. No. 14/692,868.
USPTO; Office Action dated Oct. 6, 2017 in U.S. Appl. No. 14/692,868.
USPTO; Notice of Allowance dated Dec. 1, 2017 in U.S. Appl. No. 14/692,868.
USPTO; Non-Final Office Action dated Dec. 4, 2018 in U.S. Appl. No. 15/906,674.
PCT; International Search Report and Written Opinion dated Mar. 18, 2014 in Application No. PCT/US2013/066316.
PCT; International Preliminary Report on Patentability dated Jul. 29, 2014 in Application No. PCT/US2012/071121.
PCT; International Preliminary Report on Patentability dated Sep. 29, 2014 in Application No. PCT/US2013/066316.
PCT; International Search Report and Written Opinion dated Aug. 10, 2009 for International Application No. PCT/US2009/48387.
PCT; International Search Report and Written Opinion dated Apr. 24, 2008 for International Application No. PCT/US2006/032874.
PCT; International Preliminary Report on Patentability dated Apr. 16, 2009 for International Application No. PCT/US2006/032874.

(56) References Cited

OTHER PUBLICATIONS

PCT; International Preliminary Report on Patentability dated Feb. 14, 2011 for International Application No. PCT/US09/48387.
PCT; International Search Report and Written Opinion dated Apr. 15, 2013 in Application No. PCT/US2012/071121.
GB; Examination Report dated Dec. 18, 2009 for GB Patent Application No. GB0804163.4.
GB; Examination Report dated Jul. 21, 2009 for GB Patent Application No. 0804163.4.
GB; Search and Examination Report dated Dec. 18, 2009 for GB Patent Application No. 0920586.5.
GB; Search and Examination Report dated Dec. 18, 2009 for GB Patent Application No. 0920589.9.
GB; Search and Examination Report dated Dec. 18, 2009 for GB Patent Application No. GB0920602.0.
Ca; Notice of Allowance dated Jul. 23, 2012 for Canadian Patent Application No. 2708374.
GB; Notice of Allowance dated May 25, 2010 for GB Patent Application No. 2443773.
GB; Examination Report dated May 19, 2010 for GB Patent Application No. 0920586.5.
GB; Examination Report dated Feb. 25, 2010 for GB Patent Application No. 0920586.5.
GB; Examination Report dated Apr. 7, 2010 for GB Patent Application No. 0920589.9.
GB; Examination Report dated Feb. 24, 2010 for GB Patent Application No. 0920589.9.
GB; Examination Report dated May 20, 2010 for GB Patent Application No. 0920602.0.
GB; Examination Report dated Feb. 18, 2010 for GB Patent Application No. 0804163.4.
GB; Examination Report dated Feb. 24, 2010 for GB Patent Application No. 0920602.0.
GB; Examination Report dated Feb. 24, 2010 for GB Patent Application No. 0804163.4.
CA; Restriction Requirement dated Oct. 6, 2011 in Canadian Application No. 2708374.
GB; Examination Report dated Mar. 12, 2012 in GB Application No. 1102612.7.
CA; Examination Report dated May 3, 2012 in Canadian Application No. 2708374.
GB; Examination Report dated Jul. 27, 2012 in GB Application No. 1102612.7.
KR; Examination Report dated Sep. 17, 2012 in Korean Application No. 10-2011-7006954.
CA; Examination Report dated Sep. 26, 2012 in Canadian Application No. 2734846.
GB; Examination Report received Nov. 28, 2012 in GB Application No. 1102612.7.
KR; Notice of Last Preliminary Rejection dated Mar. 25, 2013 in Korean Application No. 10-2011-70006954.
GB; Examination Report dated Apr. 12, 2013 in GB Application No. 1102612.7.
GB; Examination Report dated Jul. 19, 2018 in GB Application No. 1413226.0.
GB; Search and Examination Report dated Sep. 24, 2018 in GB Application No. 1805128.4.
CA; Examination Report dated May 2, 2013 in Canadian Application No. 2774283.
CA; Examination Report dated May 7, 2013 in Canadian Application No. 2774137.
CN; Examination Report dated Jun. 8, 2013 in Chinese Application No. 200980138091.2.
CA; Notice of Allowance dated Jun. 5, 2013 in Canadian Application No. 2734846.
CA; Examination Report dated Jan. 20, 2014 in Canadian Application No. 2774137.
CA; Notice of Allowance dated Jan. 27, 2014 in Canadian Application No. 2774283.
CA; Examination Report dated Oct. 28, 2014 in Canadian Application No. 2774137.
CA; Examination Report dated Jul. 8, 2015 in Canadian Application No. 2774137.
CA; Examination Report dated Aug. 24, 2015 in Canadian Application No. 2889978.
CA; Notice of Allowance dated Sep. 25, 2015 in Canadian Application No. 2889978.
CA; Notice of Allowance dated Oct. 23, 2015 in Canadian Application No. 2774137.
CN; Examination Report dated Jul. 14, 2016 in Chinese Application No. 201380065533.1.
CN; Examination Report dated Mar. 13, 2017 in Chinese Application No. 201380065533.1.
CN; Examination Report dated Aug. 14, 2017 in Chinese Application No. 201380065533.1.
CN; Notice of Grant of Patent for Invention dated Nov. 29, 2017 in Chinese Application No. 201380065533.1.
SolarTrac Specifications Document—created Nov. 7, 2007.
"Managing Light and Energy Along the Windowed Wall: Part 1," Hunter Douglas, 2006, 64 Pages.
Nysan Control Systems Brochure, Hunter Douglas 2007, 20 Pages.
"Pilot Daylight Weather Control System," Hunter Douglas, Jul. 10, 2008, 7 Pages.
Facade Controller overview, Embedia Technologies, 2009, 3 Pages, retrieved from: http://www.embedia.com/façade-controller on Aug. 11, 2011.
Jordaans, A. A., "Computer Program for Calculating the Daylight Level in a Room," Energy and Building, Institute of Applied Physics, 1984, pp. 207-212.
Krieder, Jan et al., "Solar Radiation and Windows," Heating and Cooling of Buildings: Design for Efficiency, McGraw-Hill College, Jan. 1, 1994, pp. 220-269.
Krieder, Jan et al., "Lighting," Heating and Cooling of Buildings: Design for Efficiency, McGraw-Hill College, Jan. 1, 1994, pp. 668-693.
"Animeo IB+—a complete and autonomous solution for blind and window automation in commercial buildings," Sonify, pp. 1-11, Feb. 2003.
Galata, et al. "A Smart Control Strategy for Shading Devices to Improve the Thermal and Visual Comfort," 4th European Conference on Solar Energy and Urban Planning, Berlin, Mar. 1996, Paper No. 5.16, pp. 1-4.
Gueymard, "Critical Analysis and Performance Assessment of Clear Sky Solar Irradiance Models Using Theoretical and Measured Data," Solar Energy, vol. 51, No. 2, 1993, pp. 121-138.
Klems, et al., "Solar Heat Gain Coefficient of Complex Fenestrations with a Venetian Blind for Differing Slat Tilt Angles," ASHRAE Transactions, vol. 103, No. 1, 1997 Symposis, pp. 1026-1034.
Wurmsdobler, "Simulation of a Heated Room with Window Blind Control," Documentation for the Simulation Program and the Fuzzy Control Algorithm used, Sep. 1994, pp. 1-9.
Guillemin, et al., "An energy-efficient controller for shading devices self-adapting to the user wishes," Building and Environment 37, 2002, pp. 1091-1097.
Bauer, et al., "Delta: A Blind Controller Using Fuzzy Logic," Final Report, Nov. 1996, pp. 1-134.
"Vision Systems Debuts Its SPD-SmartGlass Transportation Products with Multi-Zone Management at InnoTrans 2012 in Berlin", Globe Newswire, Sep. 18, 2012, Woodbury, N.Y. and Berlin, 2 Pages.
"Isoclima Debuts Its CromaLite Brand of SPD-SmartGlass Railway Windows at InnoTrans 2012in Berlin", Globe Newswire, Sep. 20, 2012, Berlin, 2 Pages.
Martin C. Pedersen, "A Day in The Light," Metropolis, May 2004, pp. 1-8, http://www.mechoshade.com/sustainable/a_day_in_the_light.pdf.
"ABB i-bus EIB / KNX Shutter Control Unit, MDRC JBS/S 1.1", Product Manual, Intelligent Installation Systems, Jul. 23, 2004, pp. 1-59.

(56) References Cited

OTHER PUBLICATIONS

International Commission on Illumination, "Spatial Distribution of Daylight—CIE Standard General Sky," ISO 15469:2004E/CIE S 011/E:2003.

* cited by examiner

SKY CAMERA SYSTEM UTILIZING CIRCADIAN INFORMATION FOR INTELLIGENT BUILDING CONTROL

CROSS-REFERENCE TO RELATED APPLICATIONS

This application is a continuation-in-part of U.S. Ser. No. 15/906,674 filed on Feb. 27, 2018 and entitled "Sky Camera System for Intelligent Building Control".

U.S. Ser. No. 15/906,674 is a non-provisional of, and claims priority to, U.S. Provisional Patent Application Ser. No. 62/513,733 filed on Jun. 1, 2017 and entitled "Sky Camera System for Intelligent Building Control."

U.S. Ser. No. 15/906,674 is also a continuation-in-part of U.S. Ser. No. 14/692,868 filed on Apr. 22, 2015, now U.S. Pat. No. 9,938,765 entitled "Automated Shade Control System Interaction with Building Management System." U.S. Ser. No. 14/692,868 is a continuation of PCT Application No. PCT/US2013/066316 filed on Oct. 23, 2013 and entitled "Automated Shade Control System Utilizing Brightness Modeling". PCT Application No. PCT/US2013/066316 is a continuation of U.S. Ser. No. 13/671,018 filed on Nov. 7, 2012, now U.S. Pat. No. 8,890,456 entitled "Automated Shade Control System Utilizing Brightness Modeling". U.S. Ser. No. 13/671,018 is a continuation-in-part of U.S. Ser. No. 13/556,388 filed on Jul. 24, 2012, now U.S. Pat. No. 8,432,117 entitled "Automated Shade Control System". U.S. Ser. No. 13/556,388 is a continuation of U.S. Ser. No. 13/343,912 filed on Jan. 5, 2012, now U.S. Pat. No. 8,248,014 entitled "Automated Shade Control System".

U.S. Ser. No. 14/692,868 is also a continuation-in-part of U.S. Ser. No. 14/461,619 filed on Aug. 18, 2014, now U.S. Pat. No. 9,360,731 entitled "Systems and Methods for Automated Control of Electrochromic Glass." U.S. Ser. No. 14/461,619 is a continuation of U.S. Ser. No. 13/656,401 filed on Oct. 19, 2012, now U.S. Pat. No. 8,836,263 entitled "Automated Shade Control in Connection With Electrochromic Glass". U.S. Ser. No. 13/656,401 is a continuation-in-part of U.S. Ser. No. 13/359,575 filed on Jan. 27, 2012, now U.S. Pat. No. 8,723,467 entitled "Automated Shade Control in Connection with Electrochromic Glass." U.S. Ser. No. 13/359,575 is a continuation-in-part of U.S. Ser. No. 13/343,912 filed on Jan. 5, 2012, now U.S. Pat. No. 8,248,014 entitled "Automated Shade Control System".

U.S. Ser. No. 13/343,912 is a continuation of U.S. Ser. No. 12/475,312 filed on May 29, 2009, now U.S. Pat. No. 8,120,292 entitled "Automated Shade Control Reflectance Module". U.S. Ser. No. 12/475,312 is a continuation-in-part of U.S. Ser. No. 12/421,410 filed on Apr. 9, 2009, now U.S. Pat. No. 8,125,172 entitled "Automated Shade Control Method and System". U.S. Ser. No. 12/421,410 is a continuation-in-part of U.S. Ser. No. 12/197,863 filed on Aug. 25, 2008, now U.S. Pat. No. 7,977,904 entitled "Automated Shade Control Method and System." U.S. Ser. No. 12/197,863 is a continuation-in-part of U.S. Ser. No. 11/162,377 filed on Sep. 8, 2005, now U.S. Pat. No. 7,417,397 entitled "Automated Shade Control Method and System." U.S. Ser. No. 11/162,377 is a continuation-in-part of U.S. Ser. No. 10/906,817 filed on Mar. 8, 2005, and entitled "Automated Shade Control Method and System." U.S. Ser. No. 10/906,817 is a non-provisional of U.S. Provisional No. 60/521,497 filed on May 6, 2004, and entitled "Automated Shade Control Method and System." The entire contents of all of the foregoing applications are hereby incorporated by reference for all purposes.

TECHNICAL FIELD

This disclosure generally relates to intelligent building control, and more specifically, to intelligent systems that utilize camera views of the sky in connection with control of building systems (e.g., window coverings, electrochromic glazings, HVAC, lighting, and the like).

BACKGROUND

A variety of automated systems currently exist for controlling window covering systems, lighting systems, heating, ventilation, and air conditioning (HVAC) systems, and the like. However, these systems may be limited in their ability to respond to rapidly changing local or micro-climatic sky conditions (such as moving clouds, sunrise, sunset, and so forth), or to effectively predict future sky conditions. Accordingly, improved intelligent building control systems are desirable.

Lighting systems are now utilizing LED technology, which can permit discrete adjustment of light levels and/or adjustment of color temperature at the fixture level. Accordingly, improved systems, including sky camera systems, which take advantage of these capabilities are desirable.

SUMMARY

In various embodiments, a method comprises calculating for a location of interest on a building, by an automated control system and utilizing a first camera image of the sky, a color temperature associated with the location of interest; and performing, by the automated control system, at least one of: (i) communicating, to a building management system, information regarding the calculated color temperature at the location of interest, (ii) activating a motor to adjust a window covering associated with the location of interest, (iii) activating a glass controller to adjust a variable characteristic of a glass associated with the location of interest, (iv) communicating, to a lighting control system, information regarding the calculated color temperature at the location of interest, or (v) adjusting, by the automated control system, a color temperature of a lighting fixture associated with the location of interest.

The foregoing statements are intended as a simplified introduction to the disclosure, and are not intended to be utilized to limit the scope of any claim.

BRIEF DESCRIPTION OF THE DRAWINGS

The accompanying drawings, wherein like numerals depict like elements, illustrate exemplary embodiments of the present disclosure, and together with the description, serve to explain the principles of the disclosure. In the drawings.

DETAILED DESCRIPTION

The detailed description of exemplary embodiments of the disclosure herein shows the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented.

Principles of the present disclosure may suitably be combined with principles of automated control as set forth in U.S. patent application Ser. No. 14/692,868 filed on Apr. 22, 2015, now U.S. Pat. No. 9,938,765 entitled "AUTOMATED SHADE CONTROL SYSTEM INTERACTION WITH BUILDING MANAGEMENT SYSTEM". Moreover, principles of the present disclosure may suitably be combined with principles of automated control as set forth in U.S. Pat. No. 9,360,731 issued on Jun. 7, 2016 and entitled "SYSTEMS AND METHODS FOR AUTOMATED CONTROL OF ELECTROCHROMIC GLASS". Additionally, principles of the present disclosure may suitably be combined with principles of notification as set forth in U.S. patent application Ser. No. 15/057,354 filed on Mar. 1, 2016, now U.S. Patent Application Publication 2016-0258209 entitled "SHADE ADJUSTMENT NOTIFICATION SYSTEM AND METHOD". Additionally, principles of the present disclosure may suitably be combined with principles of targeted illumination as set forth in U.S. Provisional Application No. 62/597,285 filed on Dec. 11, 2017 and entitled "TARGETED ILLUMINATION SYSTEM". The entire contents of each of the foregoing patents and patent applications are incorporated by reference herein for all purposes.

Moreover, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
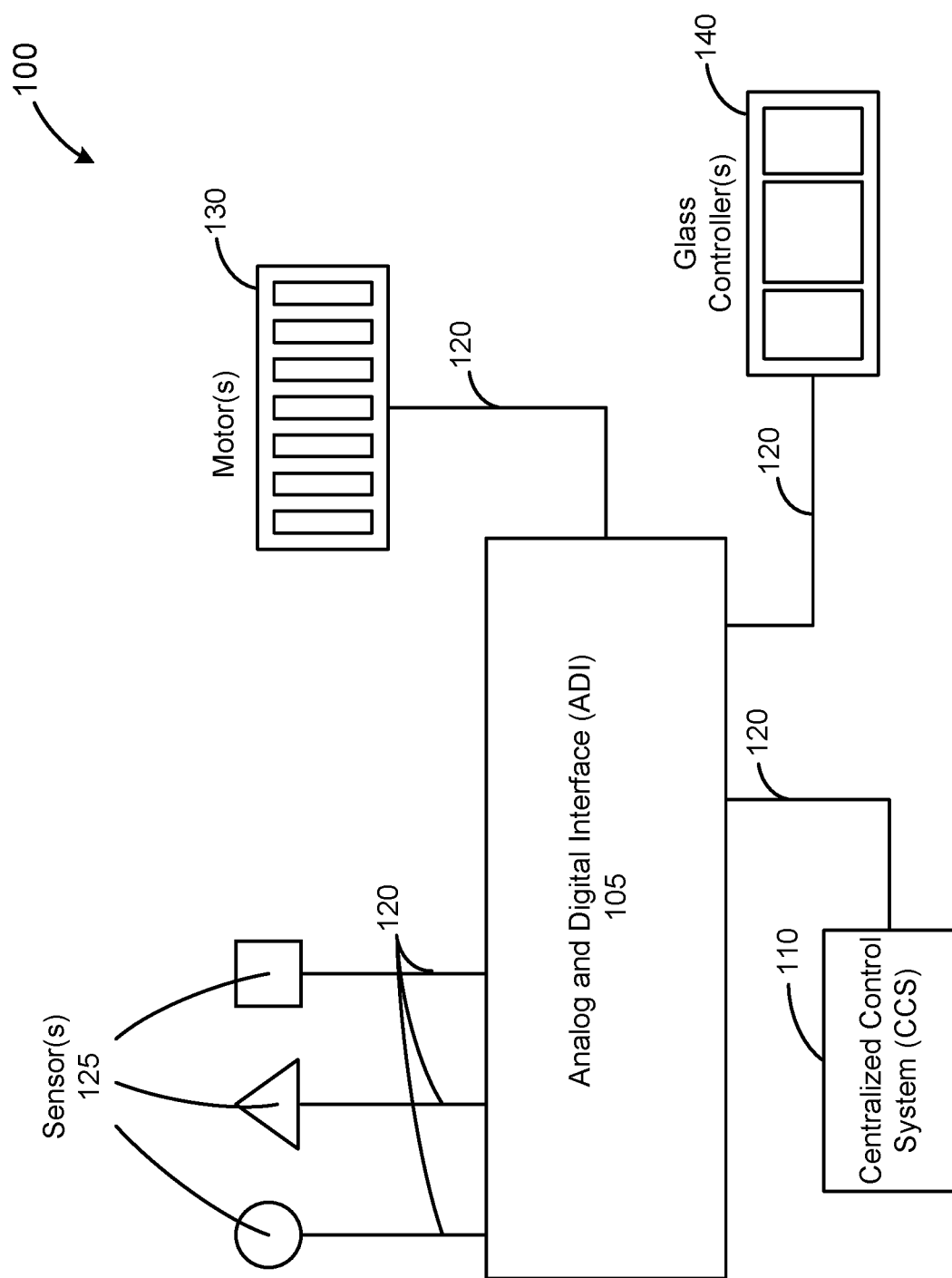
FIG. 1 illustrates a block diagram of an exemplary automated shade control system in accordance with various embodiments.

FIG. 1 illustrates an exemplary automated shade control (ASC) system 100 in accordance with various embodiments. ASC 100 may comprise an analog and digital interface (ADI) 105 configured for communicating with centralized control system (CCS) 110, motors 130, and sensors 125. ADI 105 may communicate with CCS 110, motors 130, sensors 125 and/or any other components through communication links 120. For example, in one embodiment, ADI 105 and CCS 110 are configured to communicate directly with motors 130 to minimize lag time between computing commands and motor movement.

ADI 105 may be configured to facilitate transmitting shade position commands and/or other commands. ADI 105 may also be configured to interface between CCS 110 and motors 130. ADI 105 may be configured to facilitate user access to motors 130. By facilitating user access, ADI 105 may be configured to facilitate communication between a user and motors 130. For example, ADI 105 may allow a user to access some or all of the functions of motors 130 for any number of zones. ADI 105 may use communication links 120 for communication, user input, and/or any other communication mechanism for providing user access.

ADI 105 may be configured as hardware and/or software. While FIG. 1 depicts a single ADI 105, ASC 100 may comprise multiple ADIs 105. In one embodiment, ADI 105 may be configured to allow a user to control motors 130 for multiple window coverings. As used herein, a zone refers to any area of a structure wherein ASC 100 is configured to control the shading. For example, an office building may be divided into eight zones, each zone corresponding to a different floor. Each zone, in turn may have 50 different glazings, windows and/or window coverings. Thus, ADI 105 may facilitate controlling each motor in each zone, some or all window coverings for some or all floors (or portion thereof), and/or multiple ADIs 105 (i.e., two, four, eight, or any other suitable number of different ADIs 105) may be coupled together to collectively control some or all window coverings, wherein each ADI 105 controls the motors 130 for each floor. Moreover, ASC 100 may log, record, classify, quantify, and otherwise measure and/or store information related to one or more window coverings. Additionally, each ADI 105 may be addressable, such as via an internet protocol (IP) address, a MAC address, and/or the like.

ADI 105 may also be configured with one or more safety mechanisms. For example, ADI 105 may comprise one or more override buttons to facilitate manual operation of one or more motors 130 and/or ADIs 105. ADI 105 may also be configured with a security mechanism that requires entry of a password, code, biometric, or other identifier/indicia suitably configured to allow the user to interact or communicate with the system, such as, for example, authorization/access code, personal identification number (PIN), Internet code, bar code, transponder, digital certificate, biometric data, and/or other identification indicia.

CCS 110 may be used to facilitate communication with and/or control of ADI 105. CCS 110 may be configured to facilitate computing of one or more algorithms to determine, for example, solar radiation levels, sky type (such as clear, overcast, bright overcast, and/or the like), interior lighting information, exterior lighting information, temperature information, glare information, shadow information, reflectance information, and the like. CCS 110 algorithms may include proactive and reactive algorithms configured to provide appropriate solar protection from direct solar penetration; reduce solar heat gain; reduce radiant surface temperatures and/or veiling glare; control penetration of the solar ray, optimize the interior natural daylighting of a structure and/or optimize the efficiency of interior lighting systems. CCS 110 algorithms may operate in real-time. CCS 110 may be configured with a RS-485 communication board to facilitate receiving and transmitting data from ADI 105. CCS 110 may be configured to automatically self-test, synchronize and/or start the various other components of ASC 100. CCS 110 may be configured to run one or more user interfaces to facilitate user interaction. An example of a user interface used in conjunction with CCS 110 is described in greater detail below.

CCS 110 may be configured as any type of computing device, personal computer, network computer, work station, minicomputer, mainframe, or the like running any operating system such as any version of Windows, Windows NT, Windows XP, Windows 2000, Windows 98, Windows 95, MacOS, OS/2, BeOS, Linux, UNIX, Solaris, MVS, DOS or the like. The various CCS 110 components or any other components discussed herein may include one or more of the following: a host server or other computing system including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. The user may interact with the system via any input device such as a keypad, keyboard, mouse, kiosk, personal digital assistant, handheld computer (e.g., Palm Pilot®, Blackberry®), cellular phone and/or the like.

CCS 110 may also be configured with one or more browsers, remote switches and/or touch screens to further facilitate access and control of ASC 100. For example, each touch screen communicating with CCS 110 can be configured to facilitate control of a section of a building's floor plan, with motor zones and shade zones indicated (described further herein). A user may use the touch screen to select a motor zone and/or shade zone to provide control and/or obtain control and/or alert information about the shade position of that particular zone, current sky condition information, sky charts, global parameter information (such as, for example, local time and/or date information, sunrise and/or sunset information, solar altitude or azimuth information, and/or any other similar information noted herein), floor plan information (including sensor status and location) and the like. The touch screen may also be used to provide control and/or information about the brightness level of a local sensor, to provide override capabilities of the shade position to move a shade to a more desired location, and/or to provide access to additional shade control data that is captured for each particular zone. The browser, touch screen and/or switches may also be configured to log user-directed movement of the shades, manual over-rides of the shades, and other occupant-specific adaptations to ASC 100 and/or each shade and/or motor zone. As another example, the browser, touch screen and/or switches may also be configured to provide remote users access to particular data and shade functions depending upon each remote user's access level. For example, the access levels may, for example, be configured to permit only certain individuals, levels of employees, companies, or other entities to access ASC 100, or to permit access to specific ASC 100 control parameters. Furthermore, the access controls may restrict/permit only certain actions such as opening, closing, and/or adjusting shades. Restrictions on radiometer controls, algorithms, and the like may also be included.

CCS 110 may also be configured to be responsive to one or more alarms, warnings, error messages, and/or the like. For example, CCS 110 may be configured to move one or more window coverings responsive to a fire alarm signal, a smoke alarm signal, or other signal, such as a signal received from a building management system. Moreover, CCS 100 may further be configured to generate one or more alarms, warnings, error messages, and/or the like. CCS 110 may transmit or otherwise communicate an alarm to a third party system, for example a building management system, as appropriate.

CCS 110 may also be configured with one or more motor controllers. The motor controller may be equipped with one or more algorithms which enable it to position the window covering based on automated and/or manual control from the user through one or a variety of different user interfaces which communicate to the controller. CCS 110 may provide control of the motor controller via hardwired low voltage dry contact, hardwired analog, hardwired line voltage, voice, wireless IR, wireless RF or any one of a number of low voltage, wireless and/or line voltage networking protocols such that a multiplicity of devices including, for example, switches, touch screens, PCs, Internet Appliances, infrared remotes, radio frequency remotes, voice commands, PDAs, cell phones, PIMs, etc. are capable of being employed by a user to automatically and/or manually override the position of the window covering. CCS 110 and/or the motor controller may additionally be configured with a real time clock to facilitate real time synchronization and control of environmental and manual override information.

CCS 110 and/or the motor controller is also equipped with algorithms which enable it to optimally position the window covering for function, energy efficiency, light pollution control (depending on the environment and neighbors), cosmetic and/or comfort automatically based on information originating from a variety of sensing device options which can be configured to communicate with the controller via any of the communication protocols and/or devices described herein. The automation algorithms within the motor controller and/or CCS 110 may be equipped to apply both proactive and reactive routines to facilitate control of motors 130. Proactive and reactive control algorithms are described in greater detail herein.

CCS 110 algorithms may use occupant-initiated override log data to learn what each local zone occupant prefers for his optimal shading. This data tracking may then be used to automatically readjust zone-specific CCS 110 algorithms to adjust one or more sensors 125, motors 130 and/or other ASC 100 system components to the needs, preferences, and/or desires of the occupants at a local level. That is, ASC 100 may be configured to actively track each occupant's adjustments for each occupied zone and actively modify CCS 110 algorithms to automatically adapt to each adjustment for that particular occupied zone. CCS 110 algorithms may include a touch screen survey function. For example, this function may allow a user to select from a menu of reasons prior to overriding a shade position from the touch screen. This data may be saved in a database associated with CCS 110 and used to fine tune ASC 100 parameters in order to minimize the need for such overrides. Thus, CCS 110 can actively learn how a building's occupants use the shades, and adjust to these shade uses. In this manner, CCS 110 may fine-tune, refine, and/or otherwise modify one or more proactive and/or reactive algorithms responsive to historical data.

For example, proactive and reactive control algorithms may be used based on CCS 110 knowledge of how a building's occupants use window coverings. CCS 110 may be configured with one or more proactive/reactive control algorithms that proactively input information to/from the motor controller facilitate adaptability of ASC 100. Proactive control algorithms include information such as, for example, the continuously varying solar angles established between the sun and the window opening over each day of the solar day. This solar tracking information may be combined with knowledge about the structure of the building and window opening, as well. This structural knowledge includes, for example, any shadowing features of the building (such as, for example, buildings in the cityscape and topographical conditions that may shadow the sun's ray on the window opening at various times throughout the day/year). Further still, any inclination or declination angles of the window opening (i.e., window, sloped window, and/or skylight), any scheduled positioning of the window covering throughout the day/year, information about the British thermal unit (BTU) load impacting the window at anytime throughout the day/year; the glass characteristics which affect transmission of light and heat through the glass, and/or any other historical knowledge about performance of the window covering in that position from previous days/years may be included in the proactive control algorithms. Proactive algorithms can be setup to optimize the positioning of the window covering based on a typical day, worst case bright day or worst case dark day depending on the capabilities and information made available to the reactive control algorithms. These algorithms further can incorporate at least one of the geodesic coordinates of a building; the actual and/or calculated solar position; the actual and/or calculated solar angle; the actual and/or calculated solar penetration angle; the actual and/or calculated solar penetration depth through the window, the actual and/or calculated solar radiation; the actual and/or calculated solar intensity; the time; the solar altitude; the solar azimuth; sunrise and sunset times; the surface orientation of a window; the slope of a window; the window covering stopping positions for a window; and the actual and/or calculated solar heat gain through the window.

Additionally, proactive and/or reactive control algorithms may be used based on measured and/or calculated brightness. For example, CCS 110 may be configured with one or more proactive and/or reactive control algorithms configured to measure and/or calculate the visible brightness on a window. Moreover, the proactive and/or reactive control algorithms may curve fit (e.g. regression analysis) measured radiation and/or solar heat gain in order to generate estimated and/or measured foot-candles on the glazing, foot-candles inside the glass, foot-candles inside the shade and class combination, and the like. Additionally, the proactive and/or reactive control algorithms may utilize lighting information, radiation information, brightness information, reflectance information, solar heat gain, and/or any other appropriate factors to measure and/or calculate a total foot-candle load on a structure.

Further, proactive and/or reactive control algorithms may be used based on measured and/or calculated BTU loads on a window, glass, window covering, and/or the like. CCS 110 may be configured with one or more proactive and/or reactive control algorithms configured to measure and/or calculate the BTU load on a window. Moreover, the proactive and/or reactive control algorithms may take any appropriate action responsive to a measured and/or calculated BTU load, including, for example, generating a movement request to one or more ADIs 105 and/or motors 130. For example, CCS 110 may generate a movement request to move a window covering into a first position in response to a measured load of 75 BTUs inside a window. CCS 110 may generate another movement request to move a window covering into a second position in response to a measured load of 125 BTUs inside a window. CCS 110 may generate yet another movement request to move a window covering into a third position responsive to a measured load of 250 BTUs inside a window, and so on. Additionally, CCS 110 may calculate the position of a window covering based on a measured and/or calculated BTU load on a window. Information regarding measured and/or calculated BTU loads, shade positions, and the like may be viewed on any suitable display device In various embodiments, CCS 110 may be configured with predefined BTU loads associated with positions of a window covering. For example, a "fully open" position of a window covering may be associated with a BTU load of 500 BTUs per square meter per hour. A "halfway open" position may be associated with a BTU load of 300 BTUs per square meter per hour. A "fully closed" position may be associated with a BTU load of 100 BTUs per square meter per hour. Any number of predefined BTU loads and/or window covering positions may be utilized. In this manner, CCS 110 may be configured to move one or more window coverings into various predefined positions in order to modify the intensity of the solar penetration and resulting BTU load on a structure.

Reactive control algorithms may be established to refine the proactive algorithms and/or to compensate for areas of the building which may be difficult and/or unduly expensive to model. Reactive control of ASC 100 may include, for example, using sensors coupled with algorithms which determine the sky conditions, brightness of the external horizontal sky, brightness of the external vertical sky in any/all orientation(s), internal vertical brightness across the whole or a portion of a window, internal vertical brightness measured across the whole or a portion of a window covered by the window covering, internal horizontal brightness of an internal task surface, brightness of a vertical or horizontal internal surface such as the wall, floor or ceiling, comparative brightness between differing internal horizontal and/or vertical surfaces, internal brightness of a PC display monitor, external temperature, internal temperature, manual positioning by the user/occupant near or affected by the window covering setting, overrides of automated window covering position from previous years and/or real time information communicated from other motor controllers affecting adjacent window coverings.

Typical sensors 125 facilitating these reactive control algorithms include radiometers, photometers/photometers, motion sensors, wind sensors, and/or temperature sensors to detect, measure, and communicate information regarding temperature, motion, wind, brightness, radiation, and/or the like, or any combination of the foregoing. For example, motion sensors may be employed in order to track one or more occupants and change reactive control algorithms in certain spaces, such as conference rooms, during periods where people are not present in order to optimize energy efficiency. The disclosure contemplates various types of sensor mounts. For example, types of photometer and temperature sensor mounts include handrail mounts (between the shade and window glass), furniture mounts (e.g., on the room side of the shade), wall or column mounts that look directly out the window from the room side of the shade, and external sensor mounts. For example, for brightness override protection, one or more photometers and/or radiometers may be configured to look through a specific portion of a window wall (e.g., the part of the window wall whose view gets covered by the window covering at some point during the movement of the window covering). If the brightness on the window wall portion is greater than a pre-determined ratio, the brightness override protection may be activated. The pre-determined ratio may be established from the brightness of the PC/VDU or actual measured brightness of a task surface. Each photometer may be controlled, for example, by closed and/or open loop algorithms that include measurements from one or more fields-of-view of the sensors. For example, each photometer may look at a different part of the window wall and/or window covering. The information from these photometers may be used to anticipate changes in brightness as the window covering travels across a window, indirectly measure the brightness coming through a portion of the window wall by looking at the brightness reflecting off an interior surface, measure brightness detected on the incident side of the window covering and/or to measure the brightness detected for any other field of view. The brightness control algorithms and/or other algorithms may also be configured to take into account whether any of the sensors are obstructed (for example, by a computer monitor, etc.). ASC 100 may also employ other sensors; for example, one or more motion sensors may be configured to employ stricter comfort control routines when the building spaces are occupied. That is, if a room's motion sensors detect a large number of people inside a room, ASC 100 may facilitate movement of the window coverings to provide greater shading and cooling of the room.

Moreover, ASC 100 may be configured to track radiation (e.g. solar rays and the like) on all glazing of a building including, for example, windows, skylights, and the like. For example, ASC 100 may track the angle of incidence of radiation; profile solar radiation and solar surface angles; measure the wavelength of radiation; track solar penetration based on the geometry of a window, skylight, or other opening; track solar heat gain and intensity for some or all windows in a building; track shadow information; track reflectance information; and track radiation for some or all orientations, i.e., 360 degrees around a building. ASC 100 may track radiation, log radiation information, and/or perform any other related operations or analysis in real time. Additionally, ASC 100 may utilize one or more of tracking information, sensor inputs, data logs, reactive algorithms, proactive algorithms, and the like to perform a microclimate analysis for a particular enclosed space.

In various embodiments, the natural default operation of the motor controller in "Automatic Mode" may be governed by proactive control algorithms. When a reactive control algorithm interrupts operation of a proactive algorithm, the motor controller can be set up with specific conditions which determine how and when the motor controller can return to Automatic Mode. For example, this return to Automatic Mode may be based upon a configurable predetermined time, for example 12:00 A.M. In another embodiment, ASC 100 may return to Automatic Mode at a predetermined time interval (such as an hour later), when a predetermined condition has been reached (for example, when the brightness returns below a certain level through certain sensors), when the brightness detected is a configurable percentage less than the brightness detected when the motor was placed into brightness override, if the proactive algorithms require the window covering to further cover the shade, when fuzzy logic routines weigh the probability that the motor can move back into automatic mode (based on information regarding actual brightness measurements internally, actual brightness measurements externally, the profile angle of the sun, shadow conditions from adjacent buildings or structures on the given building based on the solar altitude and/or azimuth, reflectance conditions from external buildings or environmental conditions, and/or the like, or any combination of the same), and/or at any other manual and/or predetermined condition or control.

Motors 130 may be configured to control the movement of one or more window coverings. The window coverings are described in greater detail below. As used herein, motors 130 can include one or more motors and motor controllers. Motors 130 may comprise AC and/or DC motors and may be mounted within or in proximity with a window covering which is affixed by a window using mechanical brackets attaching to the building structure such that motors 130 enable the window covering to cover or reveal a portion of the window or glazing. As used herein, the term glazing refers to a glaze, glasswork, window, and/or the like. Motors 130 may be configured as any type of motor configured to open, close and/or move the window coverings at select, random, predetermined, increasing, decreasing, algorithmic and/or any other increments. For example, in one embodiment, motors 130 may be configured to move the window coverings in 1/16-inch increments in order to graduate the shade movements such that the operation of the shade is almost imperceptible to the occupant to minimize distraction. In another embodiment, motors 130 may be configured to move the window coverings in 1/8-inch increments. Motors 130 may also be configured to have each step and/or increment last a certain amount of time. Moreover, motors 130 may follow pre-set positions on an encoded motor. The time and/or settings of the increments may be any range of time and/or setting, for example, less than one second, one or more seconds, and/or multiple minutes, and/or a combination of settings programmed into the motor encoded, and/or the like. In one embodiment, each 1/8-inch increment of motors 130 may last five seconds. Motors 130 may be configured to move the window coverings at a virtually imperceptible rate to a structure's inhabitants. For example, ASC 100 may be configured to continually iterate motors 130 down the window wall in finite increments thus establishing thousands of intermediate stopping positions across a window pane. The increments may be consistent in span and time or may vary in span and/or time across the day and from day to day in order to optimize the comfort requirements of the space and further minimize abrupt window covering positioning transitions which may draw unnecessary attention from the occupants.

Motors 130 may vary between, for example, top-down, bottom-up, and even a dual motors 130 design known as fabric tensioning system (FTS) or motor/spring-roller combination. A bottom-up, sloping, angled, and/or horizontal design(s) may be configured to promote daylighting environments where light level through the top portion of the glass may be reflected or even skydomed deep into the space. Bottom-up window coverings naturally lend their application towards East facing facades where starting from sunrise the shade gradually moves up with the sun's rising altitude up to solar noon. Top-down designs may be configured to promote views whereby the penetration of the sun may be cutoff leaving a view through the lower portion of the glass. Top-down window coverings naturally lend their application towards the West facing facades where starting from solar noon the altitude of the sun drops the shade through sunset. Moreover, angled and/or sloping shading may be used to complement horizontal, angular and/or sloping windows in the façade.

ADI 105 may be configured with one or more electrical components configured to receive information from sensors 125 and/or to transmit information to CCS 110. In one embodiment, ADI 105 may be configured to receive millivolt signals from sensors 125. ADI 105 may additionally be configured to convert the signals from sensors 125 into digital information and/or to transmit the digital information to CCS 110.

ASC 100 may comprise one or more sensors 125 such as, for example, radiometers, photometers, ultraviolet sensors, infrared sensors, temperature sensors, motion sensors, wind sensors, and the like, in communication with ADI 105. In one embodiment, the more sensors 125 used in ASC 100, the more error protection (or reduction) for the system. "Radiometers" as used herein, may include traditional radiometers as well as other photo sensors configured to measure various segments of the solar spectrum, visible light spectrum photo sensors, infrared sensors, ultraviolet sensors, and the like. Sensors 125 may be located in any part of a structure. For example, sensors 125 may be located on the roof of a building, outside a window, inside a window, on a work surface, on an interior and/or exterior wall, and/or any other part of a structure. In one embodiment, sensors 125 are located in clear, unobstructed areas. Sensors 125 may be connected to ADI 105 in any manner through communication links 120. In one embodiment, sensors 125 may be connected to ADI 105 by low voltage wiring. In another embodiment, sensors 125 may be wirelessly connected to ADI 105.

Sensors 125 may additionally be configured to initialize and/or synchronize upon starting ASC 100. For example, various sensors 125, such as radiometers, may be configured to be initially set to zero, which may correspond to a cloudy sky condition regardless of the actual sky condition. Various sensors 125 may then be configured to detect sunlight for a user-defined amount of time, for example three minutes, in order to facilitate building a data file for the sensors. After the user-defined time has lapsed, sensors 125 may be synchronized with this new data file.

As discussed herein, communication links 120 may be configured as any type of communication links such as, for example, digital links, analog links, wireless links, optical links, radio frequency links, TCP/IP links, Bluetooth links, wire links, and the like, and/or any combination of the above. Communication links 120 may be long-range and/or short-range, and accordingly may enable remote and/or off-site communication. Moreover, communication links 120 may enable communication over any suitable distance and/or via any suitable communication medium. For example, in one embodiment, communication link 120 may be configured as an RS422 serial communication link.

ASC 100 may additionally be configured with one or more databases. Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), Base3 by Base3 systems, Paradox or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED).

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on installation, initialization, user or the like. Furthermore, the security information may restrict/permit only certain actions such as accessing, modifying, and/or deleting data sets. In one example, the data set annotation indicates that only the data set owner or the user are permitted to delete a data set, various identified employees are permitted to access the data set for reading, and others are altogether excluded from accessing the data set. However, other access restriction parameters may also be used allowing various other employees to access a data set with various permission levels as appropriate.

One skilled in the art will also appreciate that, for security reasons, any databases, systems, devices, servers or other components may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications (e.g., communication link 120), inputs, storage, databases or displays discussed herein may be facilitated through a website having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stock-quotes/ge) and an IP address (123.45.6.78). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, "IT Web Services: A Roadmap for the Enterprise," (2003), hereby incorporated herein by reference.

One or more computerized systems and/or users may facilitate control of ASC 100. As used herein, a user may include an employer, an employee, a structure inhabitant, a building administrator, a computer, a software program, facilities maintenance personnel, and/or any other user and/or system. In one embodiment, a user connected to a LAN may access ASC 100 to facilitate movement of one or more window coverings. In another embodiment, ASC 100 may be configured to work with one or more third-party shade control systems, such as, for example, Draper's IntelliFlex© Control System. In addition and/or in an alternative embodiment, a Building Management System (BMS), a lighting system and/or an HVAC System may be configured to control and/or communicate with ASC 100 to facilitate optimum interior lighting and climate control. Further, ASC 100 may be configured to be remotely controlled and/or controllable by, for example, a service center. ASC 100 may be configured for both automated positioning of the window coverings and a manual override capability, either through a programmable user interface such as a computer or through a control user interface such as a switch. Additionally, ASC 100 may be configured to receive updated software and/or firmware programming via a remote communication link, such as communication link 120. ASC 100 may also be configured to transmit and/or receive information directed to operational reporting, system management reporting, troubleshooting, diagnostics, error reporting and the like via a remote communication link. Further, ASC 100 may be configured to transmit information generated by one or more sensors, such as motion sensors, wind sensors, radiometers, photometers, temperature sensors, and the like, to a remote location via a remote communication link. Moreover, ASC 100 may be configured to transmit and/or receive any appropriate information via a remote communication link.

In one embodiment, an adaptive/proactive mode may be included. The adaptive/proactive mode may be configured to operate upon first installation for preset duration, whereby manual overrides of the automated settings may be logged and/or critical parameters identified which update the automated routines as to when a specific zone of shades should be deployed to a specific position. Averaging algorithms may be employed to minimize overcompensation. The manual override may be accomplished via a number of methodologies based on how accessible the capability is made to the occupant. In one embodiment, a manager or supervisor may be in charge of manually overriding the shade settings in order to mitigate issues where there may be a variance in comfort settings between individuals. However, override capability may be provided, for example, through switches, a telephone interface, a browser facility on the workstation, a PDA, touch screen, switch and/or by using a remote control. In open plan areas where multi-banded shades are employed, an infrared control may be employed so that the user points directly at the shadeband which needs to be operated. Thus, an infrared sensor may be applied by each band of a multibanded shade especially if the sensor is somewhat concealed. ASC 100 may additionally be configured with a preset timer wherein automatic operation of the window coverings will resume after a preset period after manual override of the system.

In another embodiment, ASC 100 is configured to facilitate control of one or more motor zones, shade bands and/or shade zone. Each motor zone may comprise one motor 130 for one to six shade bands. The shade zones include one or more motor zones and/or floor/elevation zones. For example, in a building that is twelve stories high, each tenant may have six floors. Each floor may comprise one shade zone, containing 3 motor zones. Each motor zone, in turn, may comprise 3 shade bands. A tenant on floors three and four may access ASC 100 to directly control at least one of the shade zones, motor zones and/or shade bands of its floors, without compromising or affecting the shade control of the other tenants.

In another embodiment, ASC 100 is configured with a "Shadow Program," to adapt to shadows caused by nearby buildings and/or environmental components, for example hills, mountains, and the like. For example, the shadow program uses a computer model of adjacent buildings and topography to model and characterize the shadows caused by surrounding nearby buildings on different parts of the object building. That is, ASC 100 may use the shadow program to raise the shades for all motor zones and/or shade zones that are in shadow from an adjacent building, from trees and mountains, from other physical conditions in addition to buildings, and/or from any other obstruction of any kind. This further facilitates maximization of daylight for the time the specific motor zones and/or shade zones are in shadow. When the shadow moves to other motor and/or shade zones (as the sun moves), ASC 100 may revert to the normal operating program protocols and override the shadow program. Thus ASC 100 can maximize natural interior daylighting and help reduce artificial interior lighting needs.

In another embodiment, ASC 100 is configured with a "Reflectance Program," to adapt to light reflected by reflective surfaces. As used herein, reflectance may be considered to be beamed luminance and/or illumination from a specular surface. Light may be reflected onto a building by a body of water, an expanse of snow, an expanse of sand, a glass surface of a building, a metal surface of a building, and the like. For example, the reflectance program uses a computer model of adjacent buildings and topography to model and characterize the light reflected by reflective surfaces onto different parts of the object building. That is, ASC 100 may use the reflectance program to move (lower and/or raise) one or more window coverings 255, for example a window covering 255 in a motor zone and/or shade zones that are in reflected light from any reflected light surface and/or reflected light source of any kind. In this manner, undesirable glare may be reduced. Moreover, certain types of reflected beamed and/or diffuse illumination may also provide additional daylighting, particularly when the light is directed toward a ceiling. When the reflected light moves to other motor and/or shade zones (e.g., as the sun moves), ASC 100 may revert to the normal operating program protocols and/or override the reflectance program. Thus, ASC 100 can maximize natural interior daylighting, help reduce artificial interior lighting needs, and/or reduce glare and other lighting conditions.

In a reflectance program, reflective objects may be defined by the computer as individual objects in a three-dimensional model. Moreover, each reflective object may have multiple reflective surfaces. Each reflective object may be partially or fully, enabled or disabled (i.e., partially or fully included in reflectance calculations or omitted from reflectance calculations). In this manner, if a particular reflective object (or any portion thereof) turns out, for example, to be less reflective than anticipated and/or insufficiently reflective to be of concern at a particular brightness threshold, then that particular reflective object may be fully or partially removed from reflectance calculations without affecting reflectance calculations for other reflective objects. Moreover, a reflectance program utilized by ASC 100 may be activated or inactivated, as desired. For example, the reflectance program may be configured to be activated if external conditions are considered to be sunny, and the reflectance program may be configured to be inactive if external conditions are considered to be overcast and/or cloudy.

Moreover, a reflectance program utilized by ASC 100 may be configured with information regarding the nature of each reflective object (e.g., dimensions, surface characteristics, compositions of materials, etc). In this manner, ASC 100 may respond appropriately to various types of reflected light. For example, in the case of a reflection from a building, the resulting apparent position of the sun has a positive altitude. Therefore, the reflected solar ray is coming downward onto the building in question, just as a direct solar ray is always coming down. Thus, in response, ASC 100 may utilize one or more solar penetration algorithms in order to move a window covering incrementally downward to at least partially block the incoming reflected solar ray. In another example, in the case of reflectance from a body of water such as a pond, the resulting apparent position of the sun has a negative altitude (e.g., the reflected light appears to originate from a sun shining up from below the horizon). In response, ASC 100 may move a window covering to a fully closed position to at least partially block the incoming reflected ray. However, ASC 100 may take any desired action and/or may move a window covering to any suitable location and/or into any appropriate configuration responsive to reflectance information, and ASC 100 is not limited to the examples given.

In certain embodiments, ASC 100 may be configured with a minimum calculated reflectance duration threshold before responding to calculated reflectance information generated by a reflectance program. For example, a particular calculated portion of reflected light may be cast onto a particular surface only for a limited amount of time, for example one minute. Thus, movement of a window covering responsive to this reflected light may be unnecessary. Moreover, movement of the window covering may not be able to be completed before the reflected light has ceased. Thus, in an embodiment, ASC 100 is configured to respond to calculated reflectance information only if the calculated reflected light will continuously impinge on a window for one (1) minute or longer. In another embodiment, ASC 100 is configured to respond to calculated reflectance information only if the calculated reflected light will continuously impinge upon a window for five (5) minutes or longer. Moreover, ASC 100 may be configured to respond to calculated reflectance information wherein the calculated reflected light will continuously impinge upon a window for any desired length of time.

Additionally, ASC 100 may be configured with various reflectance response times, for example advance and/or delay periods, associated with calculated reflectance information. For example, ASC 100 may be configured to move a window covering before a calculated reflected light ray will impinge on a window, for example one (1) minute before a calculated reflected light ray will impinge on the window. ASC 100 may also be configured to move a window covering after a calculated reflected light ray has impinged on a window, for example ten (10) seconds after a calculated reflected light ray has impinged on a window. Moreover, ASC 100 may be configured with any appropriate advance and/or delay periods responsive to calculated reflectance information, as desired. Additionally, the advance and/or delay periods may vary from zone to zone. Thus, ASC 100 may have a first reflectance response time associated with a first zone, a second reflectance response time associated with a second zone, and so on, and the reflectance response times associated with each zone may differ. Additionally, a user may update the reflectance response time associated with a particular zone, as desired. ASC 100 may thus be configured with any number of zone reflectance response times, default reflectance response times, user-input reflectance response times, and the like.

In various embodiments, a reflectance program utilized by ASC 100 may be configured to model primary reflectance information and/or higher order reflectance information, e.g., information regarding dispersion reflections. The reflection of light off a non-ideal surface will generate a primary reflection (a first order reflection) and higher order dispersion reflections. In general, second order dispersion reflections and/or higher order dispersion reflections may be modeled provided that sufficient information regarding the associated reflective surface is available (for example, information regarding material characteristics, surface conditions, and/or the like). Information regarding primary reflections from a reflective surface, as well as information regarding higher order reflections from the reflective surface, may be stored in a database associated with the reflectance program. This stored information may be utilized by the reflectance program to calculate the appearance of various reflected light rays. However, due to various factors (for example, absorption at the reflective surface, absorption and/or scattering due to suspended particles in the air, and/or the like) the calculated reflected light rays may in fact be unobtrusive or even undetectable to a human observer where the calculated reflected light is calculated to fall. Thus, no change in a position of a window covering may be needed to maintain visual comfort. ASC 100 may therefore ignore a calculated reflected light ray in order to avoid "ghosting"—i.e., movement of window coverings for no apparent reason to a human observer.

In general, a ray of light may be reflected any number of times (e.g., once, twice, three times, and so on). A reflectance program may therefore model repeated reflections in order to account for reflected light on a particular target surface. For example, sunlight may fall on a first building with a reflective surface. The light directly reflected off this first building has been reflected one time; thus, this light may be considered once reflected light. The once reflected light may travel across the street and contact a second reflective building. After being reflected from the second building, the once reflected light becomes twice reflected light. The twice reflected light may be further reflected to become thrice reflected light, and so on. Because modeling multiple reflection interactions for a particular light ray results in increased computational load, larger data sets, and other data, a reflectance program may be configured to model a predetermined maximum number of reflections for a particular light ray in order to achieve a desired degree of accuracy regarding reflected light within a desired computation time. For example, in various embodiments, a reflectance program may model only once reflected light (e.g., direct reflections only). In other embodiments, a reflectance program may model once and twice reflected light. Moreover, a reflectance program may model reflected light which has been reflected off any number of reflective surfaces, as desired.

Additionally, because surfaces are typically not perfectly reflective, reflected light is less intense than direct light. Thus, the intensity of light decreases each time it is reflected. Therefore, a reflectance program utilized by ASC 100 may limit the maximum number of calculated reflections for a particular light ray in order to generate calculated reflectance information. For example, a thrice reflected light ray may be calculated to fall on a target window. However, due to absorption caused by the various intermediate reflective surfaces, the intensity of the thrice reflected light ray may be very low, and may in fact be unobtrusive or even undetectable to a human observer. Thus, no change in a position of a window covering may be needed to maintain visual comfort. ASC 100 may therefore ignore the calculated thrice reflected light ray in order to avoid ghosting. Additionally, ASC 100 may calculate reflectance information for only a small number of reflections interactions (for example, once reflected light or twice reflected light) in order to avoid ghosting.

In various embodiments, ASC 100 may utilize one or more data tables, for example a window table, an elevation table, a floor table, a building table, a shadow table, a reflective surface table, and the like. A window table may comprise information associated with one or more windows of a building (e.g., location information, index information, and the like). An elevation table may comprise information associated with one or more elevations of a building (e.g., location information, index information, and the like). A floor table may comprise information associated with floor of a building (e.g., floor number, height from ground, and the like). A building table may comprise information about a building, for example, orientation (e.g., compass direction), 3-D coordinate information, and the like. A shadow table may comprise information associated with one or more objects which may at least partially block sunlight from striking a building, for example, the height of a mountain, the dimensions of an adjacent building, and the like. A reflective surfaces table may comprise information associated with one or more reflective surfaces, for example, 3-D coordinate information, and the like. In this manner, ASC 100 may calculate desired information, for example, when sunlight may be reflected from one or more reflective surfaces onto one or more locations on a building, when a portion of a building may be in a shadow cast by an adjacent building, and the like.

ASC 100 solar tracking algorithms may be configured to assess and analyze the position of the glazing (i.e., vertical, horizontal, sloped in any direction) to determine the solar heat gain and solar penetration. ASC 100 may also use solar tracking algorithms to determine if there are shadows and/or reflections on the glazing, window wall and/or façade from the building's own architectural features. These architectural features include, but are not limited to, windows, skylights, bodies of water, overhangs, fins, louvers, and/or light shelves. Thus, if the building is shaded by, and/or in reflected light from, any of these architectural features, the window covering may be adjusted accordingly using ASC 100 algorithms.

Figure 5:
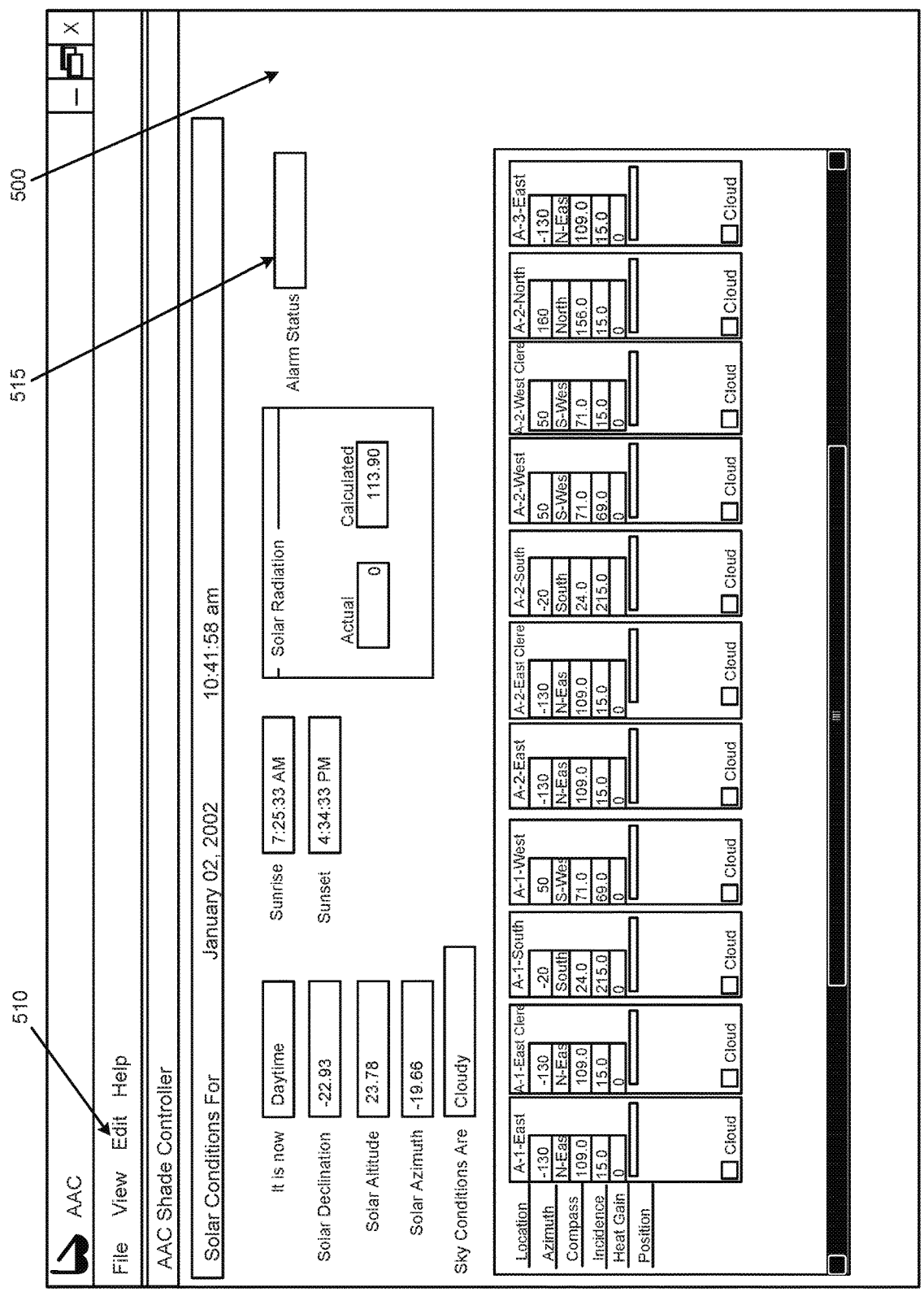
FIG. 5 shows a screen shot of an exemplary user interface (e.g. view of SolarTrac software) in accordance with various embodiments.

ASC 100 may be configured with one or more user interfaces to facilitate user access and control. For example, as illustrated in an exemplary screen shot of a user interface 500 in FIG. 5, a user interface may include a variety of clickable links, pull down menus 510, fill-in boxes 515, and the like. User interface 500 may be used for accessing and/or defining the wide variety of ASC 100 information used to control the shading of a building, including, for example, geodesic coordinates of a building; the floor plan of the building; universal shade system commands (e.g., add shades up, down, etc.); event logging; the actual and calculated solar position; the actual and calculated solar angle; the actual and calculated solar radiation; the actual and calculated solar penetration angle and/or depth; the actual and/or calculated solar intensity; the measured brightness and veiling glare across the height of the window wall or a portion of the window (e.g. the vision panel) and/or on any facades, task surfaces and/or floors; shadow information; reflectance information; the current time; solar declination; solar altitude; solar azimuth; sky conditions; sunrise and sunset time; location of the various radiometers zones; the azimuth or surface orientation of each zone; the compass reading of each zone; the brightness at the window zones; the incidence angle of the sun striking the glass in each zone; the window covering positions for each zone; the heat gain; and/or any other parameters used or defined by the ASC 100 components, the users, the radiometers, the light sensors, the temperature sensors, and the like.

ASC 100 may also be configured to generate one or more reports based on any of the ASC 100 parameters as described above. For example, ASC 100 can generate daylighting reports based on floor plans, power usage, event log data, sensor locations, shade positions, shade movements, shadow information, reflectance information, the relationship of sensor data to shade movements and/or to manual over-rides and/or the like. The reporting feature may also allow users to analyze historical data detail. For example, historical data regarding shade movement in conjunction with at least one of sky condition, brightness sensor data, shadow information, reflectance information, and the like, may allow users to continually optimize the system over time. As another example, data for a particular period can be compared from one year to the next, providing an opportunity to optimize the system in ways that have never been possible or practical with existing systems.

ASC 100 may be configured to operate in automatic mode (based upon preset window covering movements) and/or reactive modes (based upon readings from one or more sensors 125). For example, an array of one or more visible light spectrum photo sensors may be implemented in reactive mode where they are oriented on the roof towards the horizon. The photo sensors may be used to qualify and/or quantify the sky conditions, for example at sunrise and/or sunset. Further, the photo sensors may be configured inside the structure to detect the amount of visible light within a structure. ASC 100 may further communicate with one or more artificial lighting systems to optimize the visible lighting within a structure based upon the photo sensor readings.

Figure 2A:
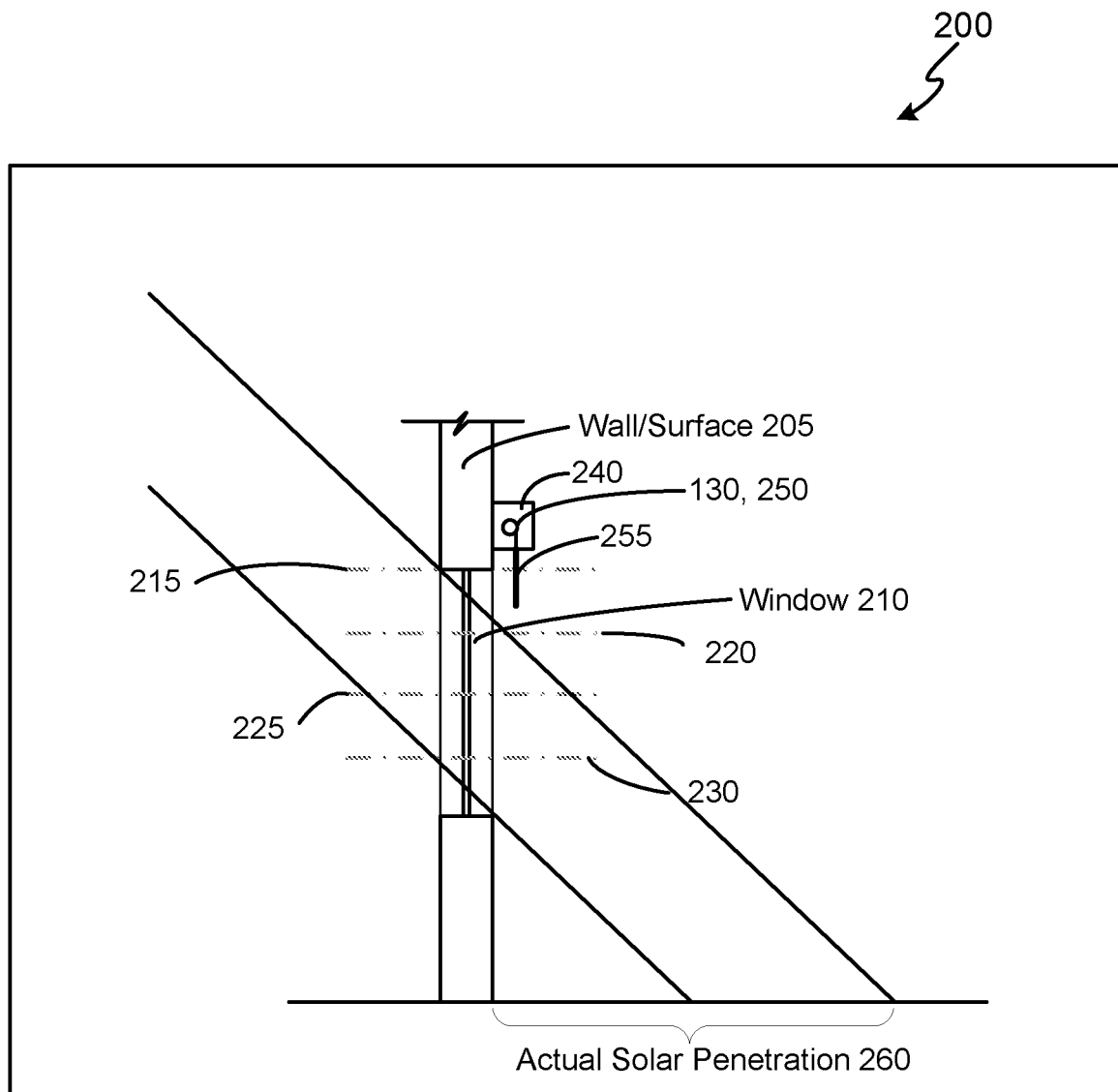
FIG. 2A shows a schematic illustration of an exemplary window system with a window covering retracted in accordance with various embodiments.
Figure 2B:
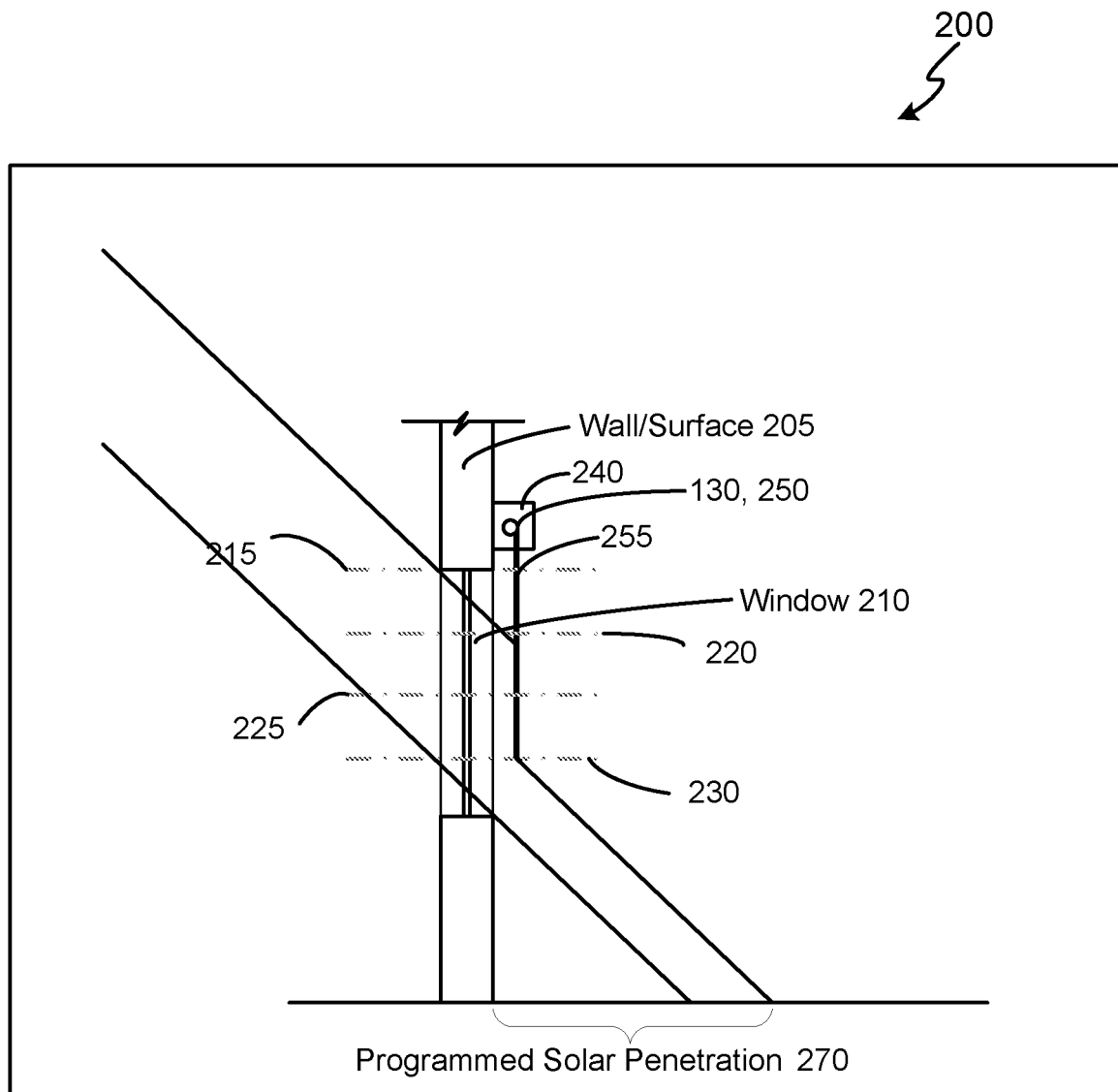
FIG. 2B shows a schematic illustration of an exemplary window system with a window covering extended in accordance with various embodiments.

With reference to an exemplary diagram illustrated in FIG. 2A, an embodiment of a window system 200 is depicted. Window system 200 comprises a structural surface 205 configured with one or more windows 210. A housing 240 may be connected to structural surface 205. Housing 240 may comprise one or more motors 130 and/or opening devices 250 configured for adjusting one or more window coverings 255. Based on factors including, for example, time of day, time of year, window geometry, building geometry, building environment, and the like, a solar ray may achieve an actual solar penetration 260 into an enclosed space through window system 200. With reference now to FIG. 2B, one or more window coverings 255 may be extended in order to partially and/or fully block and/or obstruct the solar ray in order to limit an actual solar penetration to a programmed solar penetration 270.

With continued reference to FIGS. 2A and 2B, structural surface 205 may comprise a wall, a steel reinforcement beam, a ceiling, a floor, and/or any other structural surface or component. Windows 210 may comprise any type of window, including, for example, skylights and/or any other type of openings configured for sunlight penetration. Housing 240 may be configured as any type of housing, including, for example, ceramic pipes, hardware housings, plastic housings, and/or any other type of housing. Opening devices 250 may comprise pull cords, roller bars, drawstrings, ties, pulleys, levers, and/or any other type of device configured to facilitate adjusting, opening, closing, and/or varying window coverings 255.

Window coverings 255 may be any type of covering for a window for facilitating control of solar glare, brightness and veiling glare, contrasting brightness and veiling glare, illuminance ratios, solar heat gain or loss, UV exposure, uniformity of design and/or for providing a better interior environment for the occupants of a structure supporting increased productivity. Window coverings 255 may be any type of covering for a window, such as, for example, blinds, drapes, shades, Venetian blinds, vertical blinds, adjustable louvers or panels, fabric coverings with and/or without low E coatings, mesh, mesh coverings, window slats, metallic coverings and/or the like.

Window coverings 255 may also comprise two or more different fabrics or types of coverings to achieve optimum shading. For example, window coverings 255 may be configured with both fabric and window slats. Furthermore, various embodiments may employ a dual window covering system whereby two window coverings 255 of different types are employed to optimize the shading performance under two different modes of operation. For instance, under clear sky conditions a darker fabric color may face the interior of the building (weave permitting a brighter surface to the exterior of the building to reflect incident energy back out of the building) to minimize reflections and glare thus promoting a view to the outside while reducing brightness and veiling glare and thermal load on the space. Alternatively, during cloudy conditions a brighter fabric facing the interior may be deployed to positively reflect interior brightness and veiling glare back into the space thus minimizing gloom to promote productivity.

Window coverings 255 may also be configured to be aesthetically pleasing. For example, window coverings 255 may be adorned with various decorations, colors, textures, logos, pictures, and/or other features to provide aesthetic benefits. In one embodiment, window coverings 255 are configured with aesthetic features on both sides of the coverings. In another embodiment, only one side of coverings 255 are adorned. Window coverings 255 may also be configured with reflective surfaces, light-absorbent surfaces, wind resistance material, rain resistance material, and/or any other type of surface and/or resistance. While FIG. 2 depicts window coverings 255 configured within a structure, window coverings 255 may be configured on the outside of a structure, both inside and outside a structure, between two window panes and/or the like. Motors 130 and/or opening device 250 may be configured to facilitate adjusting window coverings 255 to one or more positions along window 210 and/or structural surface 205. For example, as depicted in FIGS. 2A and 2B, motor 130 and/or opening device 250 may be configured to move window coverings 255 into any number of stop positions, such as into four different stop positions 215, 220, 225, and 230.

Moreover, window coverings 255 may be configured to be moved independently. For example, window coverings 255 associated with a single window and/or set of windows may comprise a series of adjustable fins or louvers. Control of the upper fins may be separate from control of the lower fins. Thus, light from lower fins may be directed at a first angle to protect people and daylighting, while light from upper fins may be directed at a second angle to maximize illumination on the ceiling and into the space behind the fins. In another example, window coverings 255 associated with a single window and/or set of windows may comprise roller screens and/or horizontal blinds associated with a lower portion of a single window and/or set of windows, and a series of adjustable fins or louvers associated with an upper portion of a single window and/or set of windows. Control of the lower roller screens and/or lower horizontal blinds may be separate from the upper louvers. As before, the lower roller screens and/or lower horizontal blinds may protect people and daylighting, while the upper louvers may direct light toward the ceiling to maximize illumination on the ceiling and into the space behind the louvers.

Further, window coverings 255 may comprise any number of individual components, such as multiple shade tiers. For example, window coverings 255 associated with a single window and/or set of windows may comprise multiple horizontal and/or vertical tiers, for example three shade tiers—a bottom tier, a middle tier, and a top tier. Control of each shade tier may be separate from control of each other shade tier. Thus, for example, the top shade tier may be moved down, then the middle tier may be moved down, and then the lower tier may be moved down, and vice versa. Moreover, multiple shades may be configured to act in concert. For example, a 300 foot high window may be covered by three 100 foot shades, each of which are controlled individually. However, the three 100 foot shades may be configured to move in a concerted manner so as to provide continuous or nearly continuous deployment of shading from top to bottom. Thus, multiple shade tiers may be moved in any sequence and/or into any configuration suitable to facilitate control of one or more parameters such as, for example, interior brightness, interior temperature, solar heat gain, and the like.

Stop positions 215, 220, 225, and 230 may be determined based on the sky type. That is, CCS 110 may be configured to run one or more programs to automatically control the movement of the motorized window coverings 255 unless a user chooses to manually override the control of some or all of the coverings 255. One or more programs may be configured to move window coverings 255 to shade positions 215, 220, 225, and 230 depending on a variety of factors, including, for example, latitude, the time of day, the time of year, the measured solar radiation intensity, the orientation of window 210, the extent of solar penetration 235, shadow information, reflectance information, and/or any other user-defined modifiers. Additionally, window coverings 255 may be configured to specially operate under a severe weather mode, such as, for example, during hurricanes, tornadoes, and the like. While FIGS. 2A and 2B depict four different stop positions, ASC 100 may comprise any number of shade and/or stop positions for facilitating automated shade control.

For example, shading on a building may cause a number of effects, including, for example, reduced heat gain, a variation in the shading coefficient, reduced visible light transmission to as low as 0-1%, lowered "U" value with the reduced conductive heat flow from "hot to cold" (for example, reduced heat flow into the building in summer), and/or reduced heat flow through the glazing in winter. Window coverings 255 may be configured with lower "U" values to facilitate bringing the surface temperature of the inner surface of window coverings 255 closer to the room temperature. That is, to facilitate making the inner surface of window coverings 255 i.e. cooler than the glazing in the summer and warmer than the glazing in the winter. As a result, window coverings 255 may help occupants near the window wall to not sense the warmer surface of the glass and therefore feel more comfortable in the summer and require less air conditioning. Similarly, window coverings 255 may help during the winter months by helping occupants maintain body heat while sitting adjacent to the cooler glass, and thus require lower interior heating temperatures. The net effect is to facilitate a reduction in energy usage inside the building by minimizing room temperature modifications.

Figure 4:
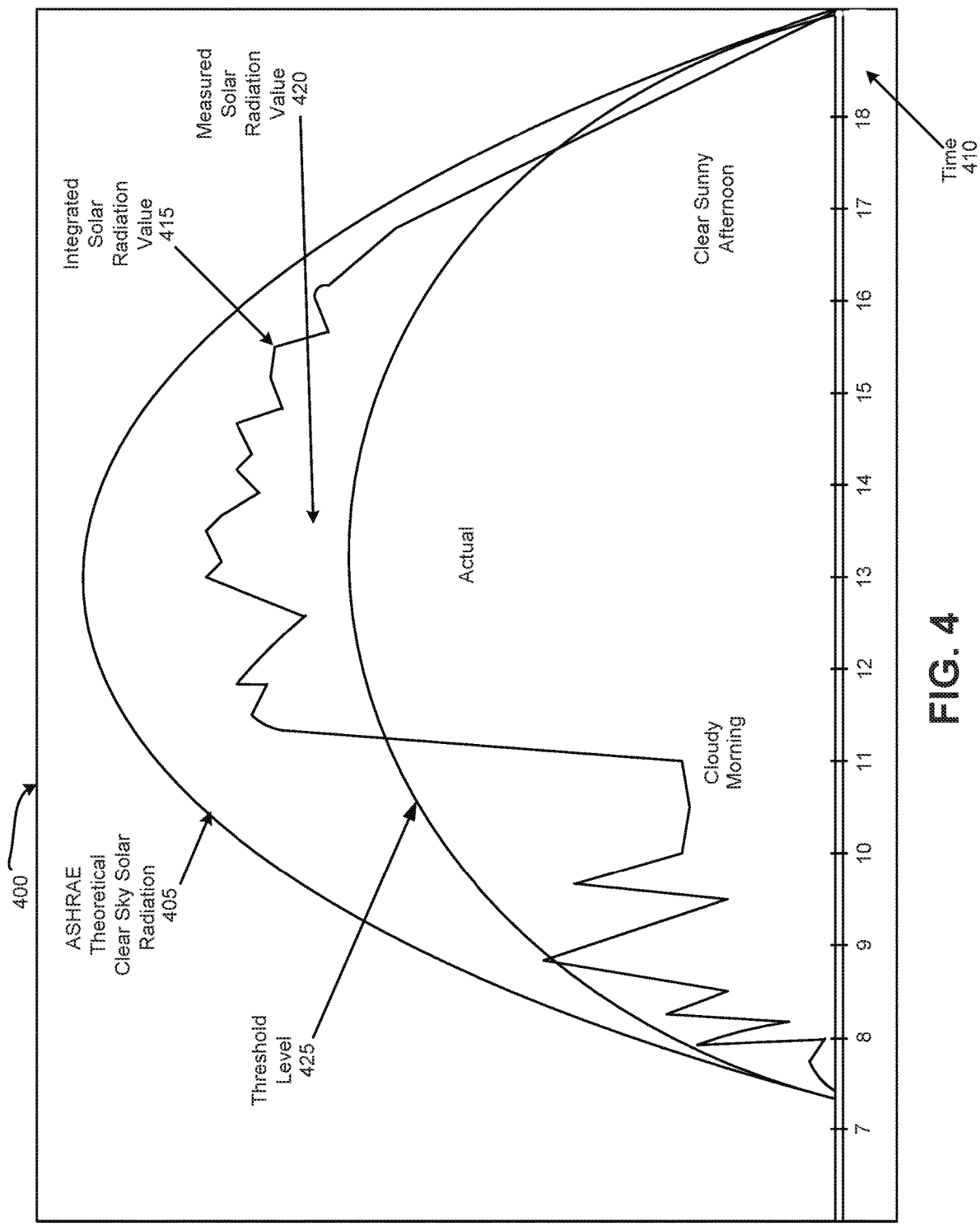
FIG. 4 depicts an exemplary ASHRAE model in accordance with various embodiments.

ASC 100 may be configured to operate in a variety of sky modes to facilitate movement of window coverings 255 for optimum interior lighting. The sky modes include, for example, overcast mode, night mode, clear sky mode, partly cloudy mode, sunrise mode, sunset mode and/or any other user configured operating mode. ASC 100 may be configured to use clear sky solar algorithms, for example algorithms developed by the American Society of Heating, Refrigerating and Air-Conditioning Engineers (ASHRAE) and/or any other clear sky solar algorithms known or used to calculate and quantify sky models. For example, and with reference to FIG. 4, the ASHRAE model 400 may include a curve of the ASHRAE theoretical clear sky solar radiation 405 as a function of time 410 and the integrated solar radiation value 415. Time 410 depicts the time from sunrise to sunset. The measured solar radiation values 420 may then be plotted to show the measured values to the calculated clear sky values. ASHRAE model 400 may be used to facilitate tracking sky conditions throughout the day. CCS 110 may be configured to draw a new ASHRAE model 400 every hour, every day, and/or at any other user-defined time interval. Additionally, ASC 100 may be configured to compare measured solar radiation values 420 to threshold level 425. Threshold level 425 may represent a percentage of ASHRAE calculated clear sky solar radiation 405. When measured solar radiation values 420 exceed threshold level 425, ASC 100 may be configured to operate in a first sky mode, such as clear sky mode. Similarly, when measured solar radiation values 420 do not exceed threshold level 425, ASC may be configured to operate in a second sky mode, such as overcast mode.

ASC 100 may use the ASHRAE clear sky models in conjunction with one or more inputs from one or more sensors 125, such as radiometers, to measure the instantaneous solar radiation levels within a structure and/or to determine the sky mode. CCS 110 may be configured to send commands to motors 130 and/or window openings 250 to facilitate adjustment of the position of window coverings 255 in accordance with the sky mode, the solar heat gain into the structure, the solar penetration into the structure, ambient illumination and/or any other user defined criteria.

For example, in one embodiment, the ASHRAE model can be used to provide a reduced heat gain which is measured by the shading coefficient factor of a fabric which varies by density, weave and color. In addition the window covering, when extended over the glass, may add a "U" Value (reciprocal to "R" value) and reduce conductive heat gain (i.e. reduction in temperature transfer by conduction.)

Figure 3:
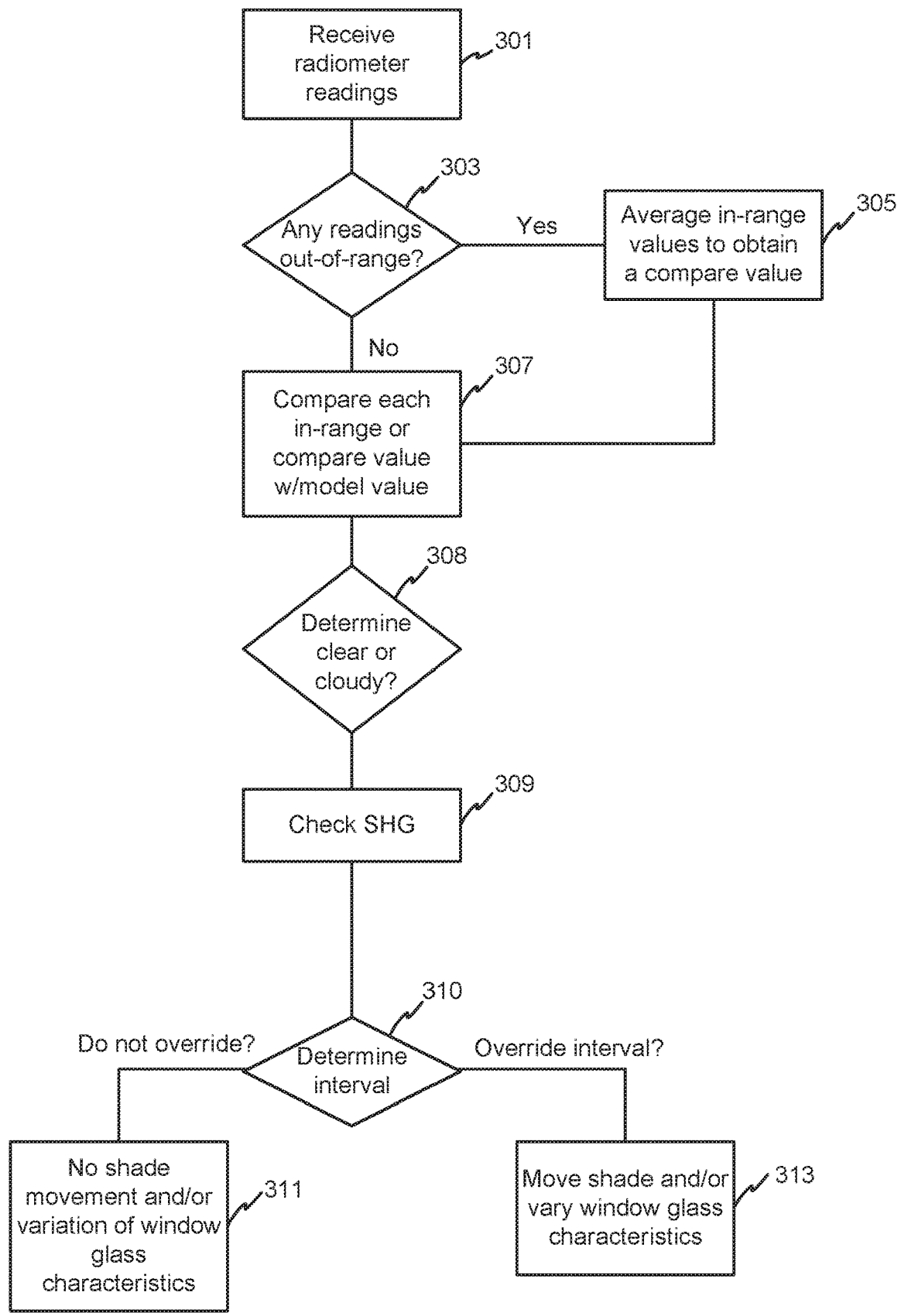
FIG. 3 illustrates a flow diagram of an exemplary method for automated shade control in accordance with various embodiments.

For example, with reference to a flowchart exemplified in FIG. 3, CCS 110 may be configured to receive solar radiation readings from one or more sensors 125, such as radiometers (step 301). CCS 110 may then determine whether any of the sensor readings are out-of-range, thus indicating an error (step 303). If any of the readings/values are out-of-range, CCS 110 may be configured to average the readings of the in-range sensors to obtain a compare value (step 305) for comparison with an ASHRAE clear sky solar radiation model (step 307). If all readings are in-range, then each sensor value may be compared to a theoretical solar radiation value predicted by the ASHRAE clear sky solar radiation model (step 307). That is, each sensor 125 may have a reading that indicates a definable deviation in percentage from the ASHRAE clear sky theoretical value. Thus, if the sensor readings are all a certain percentage from the theoretical value, it can be determined that the conditions are cloudy or clear (step 308).

CCS 110 may also be configured to calculate and/or incorporate the solar heat gain (SHG) period for one or more zones (step 309). By calculating the SHG, CCS 110 may communicate with one or more sun sensors configured within ASC 100. The sun sensors may be located on the windows, in the interior space, on the exterior of a structure and/or at any other location to facilitate measuring the solar penetration and/or solar radiation and/or heat gain at that location. CCS 110 may be configured to compare the current position of one or more window coverings 255 to positions based on the most recent calculated SHG to determine whether window coverings 255 should be moved. CCS 110 may additionally determine the time of the last movement of window coverings 255 to determine if another movement is needed. For example, if the user-specified minimum time interval has not yet elapsed, then CCS 110 may be configured to ignore the latest SHG and not move window coverings 255 (step 311). Alternately, CCS 110 may be configured to override the user-defined time interval for window coverings 255 movements. Thus, CCS 110 may facilitate movement of coverings 255 to correspond to the latest SHG value (step 313).

While FIG. 3 depicts the movement of window coverings 255 in a specific manner with specific steps, any number of these steps may be used to facilitate movement of window coverings 255. Further, while a certain order of steps is presented, any of the steps may occur in any order. Further still, while the method of FIG. 3 anticipates using sensors and/or the SHG to facilitate movement of window coverings 255, a variety of additional and/or alternative factors may be used by CCS 110 to facilitate movement, such as, for example, the calculated solar radiation intensity incident on each zone, user requirements for light pollutions, structural insulation factors, light uniformity requirements, seasonal requirements, and the like.

For example, ASC 100 may be configured to employ a variety of iterations for the movement of window coverings 255. In one embodiment, ASC 100 may be configured to use a Variable Allowable Solar Penetration Program (VASPP), wherein ASC 100 may be configured to apply different maximum solar penetration settings based on the time of the year. These solar penetrations may be configured to vary some of the operation of ASC 100 because of the variations in sun angles during the course of a year. For example, in the wintertime (in North America), the sun will be at a lower angle and thus sensors 125, such as radiometers and/or any other sensors used with the present disclosure, may detect maximum BTUs, and there may be high solar penetration into a structure. That is, the brightness and veiling glare on the south and east orientations of the building will have substantial sunshine and brightness on the window wall for the winter months, for extended periods of the day from at least 10 am to 2 pm. Under these situations, the allowable solar penetration setting of ASC 100 may be set lower to facilitate more protection due to the lower solar angles and higher brightness and veiling glare levels across the façade of the structure. In another embodiment, a shade cloth with a medium to medium dark value grey to the out side and a light medium grey to the interior at 2-3% openness, depending on the interior color may be used to control brightness, maximize view and allow for the more open fabric.

In contrast, in the summertime, the sun will be at a higher angle minimizing BTU load, thus the allowable solar penetration for ASC 100 may be set higher to facilitate viewing during clear sky conditions. For example, the north, northwest and northeast orientations generally have much lower solar loads year round but do have the orb of the sun in the early morning and the late afternoon in summer, and may have brightness levels that exceed 2000 NITS; 5500 Lux (current window brightness default value) at various times of the year and day however for shorter periods. These high solar intensities are most prevalent during the three month period centered on June 21, the summer solstice. To combat this, ASC 100 may be configured so that the higher solar penetration does not present a problem with light reaching an uncomfortable position with regard to interior surfaces. Under these conditions, the VASPP may be configured with routine changes in solar penetration throughout the year, for example, by month or by changes in season (i.e., by the seasonal solstices). A minimum BTU load ("go"/"no-go") may additionally be employed in ASC 100 whereby movement of window coverings 255 may not commence unless the BTU load on the façade of a structure is above a certain preset level.

The VASPP may also be configured to adjust the solar penetration based on the solar load on the glass. For example, if the south facing elevation has a stairwell, it may have a different solar penetration requirement than the office area and different from the corner at the west elevation. Light may filter up and down the stairwell causing shades to move asymmetrically. As a result, window coverings 255 may be lowered or raised based upon the sun angle and solar heat gain levels (which may or may not be confirmed by active sensors before making adjustments). The VASPP may also be configured with an internal brightness and veiling glare sensor to facilitate fine-tuning of the levels of window coverings 255. Additionally, there may be one or more pre-adjusted set position points of window coverings 255 based on a day/brightness analysis. The day/brightness analysis may factor in any one or more of, for example, estimated BTU loads, sky conditions, daylight times, veiling glare, averages from light sensors and/or any other relevant algorithms and/or data.

In another aspect, one or more optical photo sensors may be located in the interior, exterior or within a structure. The photo sensors may facilitate daylight/brightness sensing and averaging for reactive protection of excessive brightness and veiling glare due to reflecting surfaces from the surrounding cityscape or urban landscape. These bright reflective surfaces may include but are not limited to, reflective glass on adjacent buildings, water surfaces, sand, snow, and/or any other bright surfaces exterior to the building which under specific solar conditions will send visually debilitating reflective light into the building.

In one exemplary method, the sensors may be located about 30-36 inches from the floor and about 6-inches from the fabric to emulate the field of view (FOV) from a desk top. One or more additional sensors may detect light by looking at the light through window coverings 255 while it moves through the various stop positions. The FOV sensors and the additional sensors may be averaged to determine the daylight levels. If the value of daylight levels is greater than a default value, ASC 100 may enter a brightness override mode and move window coverings 255 to another position. If the daylight levels do not exceed the default value, ASC 100 may not enter a brightness override mode and thus not move window coverings 255. Afterwards, ASC 100 may be configured for fine-tuning the illuminance levels of the window wall by averaging the shaded and unshaded portion of the window. Fine tuning may be used to adjust the field of view from a desk top in accordance with the season, interior, exterior, and furniture considerations and/or task and personal considerations.

In another embodiment, ASC 100 may be configured with about 6-10 photo sensors positioned in the following exemplary locations: (1) one photo sensor looking at the fabric at about 3 feet 9 inches off the floor and about 3 inches from the fabric at a south elevation; (2) one sensor looking at the glass at about 3 feet 6 inches off the floor and about 3 inches from the glass at a south elevation; (3) one sensor looking at the dry wall at a south elevation; (4) one sensor mounted on a desk-top looking at the ceiling; (5) one sensor mounted outside the structure looking south; (6) one sensor mounted outside the structure looking west; (7) one sensor about 3 inches from the center of the extended window coverings 255 when window coverings 255 is about 25% closed; (8) one sensor about 3 inches from the center of the extended window coverings 255 when coverings 255 is about 25% to 50% closed; (9) one sensor about 3 inches from the center of the glass; and (10) one sensor about 3 inches from the middle of the lower section of a window, approximately 18 inches off the floor. In one embodiment, ASC 100 may average the readings from, for example, sensors 10 and 7 described above. If the average is above a default value and the ASC has not moved window coverings 255, coverings 255 may be moved to an about 25% closed position. Next, ASC 100 may average the readings from sensors 10 and 8 to determine whether window coverings 255 should be moved again.

In another embodiment, ASC 100 may be configured to average the reading from sensors 2 and 1 above. ASC 100 may use the average of these two sensors to determine a "go" or "no go" value. That is, if the glass sensor (sensor 2) senses too much light and ASC 100 has not moved window coverings 255, coverings 255 will be moved to a first position. ASC 100 will then average the glass sensor (sensor 2) and the sensor looking only at light through the fabric (sensor 1). If this average value is greater than a user-defined default value, window coverings 255 may be moved to the next position and this process will be repeated. If ASC 100 has previously dictated a window covering position based upon the solar geometry and sky conditions (as described above), ASC 100 may be configured to override this positioning to lower and/or raise window coverings 255. If the average light levels on the two sensors drop below the default value, the positioning from the solar geometry and sky conditions will take over.

In another similar embodiment, a series of photo sensors may be employed discreetly behind an available structural member such as a column or staircase whereby, for example, these sensors may be located approximately 3 to 5 feet off the fabric and glass surfaces. Four sensors may be positioned across the height of the window wall corresponding in mounting height between each of potentially five alignment positions (including full up and full down). These sensors may even serve a temporary purpose whereby the levels detected on these sensors may be mapped over a certain time period either to existing ceiling mounted photo sensors already installed to help control the brightness and veiling glare of the lighting system in the space or even to externally mounted photo sensors in order to ultimately minimize the resources required to instrument the entire building.

In various embodiments, ASC 100 may be configured with one or more additional light sensors that look at a window wall. The sensors may be configured to continuously detect and report the light levels as the shades move down the window. ASC 100 may use these light levels to compute the luminous value of the entire window walls, and it may use these values to facilitate adjustment of the shades. In one embodiment, three different sensors are positioned to detect light from the window wall. In another embodiment, two different sensors are positioned to detect light from the window wall. A first sensor may be positioned to view the window shade at a position corresponding to window coverings 255 being about 25% closed, and a second sensor may be positioned to view the window at a position of about 75% closed. The sensors may be used to optimize light threshold, differentiate between artificial and natural light, and/or utilize a brightness and veiling glare sensor to protect against overcompensation for brightness and veiling glare. This method may also employ a solar geometry override option. That is, if the light values drop to a default value, the movement of window coverings 255 may be controlled by solar geometric position instead of light levels.

Additionally, ASC 100 may be configured with one or more sensors looking at a dry interior wall. The sensors may detect interior illuminance and compare this value with the average illuminance of one or more sensors looking at the window wall. This ratio may be used to determine the positioning of window coverings 255 by causing coverings 255 to move up or down in order to achieve an interior lighting ratio of dry wall illuminance to window wall illuminance ranging from about, for example, 9:1 to 15:1. Other industry standard configurations employ illuminance ratios of 3:1 regarding a 30 degree cone of view (central field of vision) around the VDU (Video Display Unit), 10:1 regarding a 90 degree cone of view around the VDU and a ratio of 30:1 regarding back wall illuminance to the VDU. Sensors may be placed strategically throughout the room environment in order to bring data to the controller to support these types of algorithms.

In yet another embodiment, ASC 100 may also be configured to accommodate transparent window facades following multi-story stair sections which tend to promote a "clerestory-like" condition down a stairway (i.e., the upper portion of a wall that contains windows supplies natural light to a building). ASC 100 may be configured to use the solar tracking algorithm to consider a double-height façade to ensure that the penetration angle of the sun is properly accounted for and controlled. For example, the geometry of a window (including details such as height, overhangs, fins, position in the window wall, and/or the like) may be programmed into ASC 100, which then calculates the impact of a solar ray on the window. The photo sensor placement and algorithms may be placed to help detect and overcome any overriding brightness and veiling glare originating from reflections from light penetration through the upper floors.

In another embodiment, ASC 100 may employ any combination of photo sensors located on the exterior of the building and/or the interior space to detect uncomfortable light levels during sunrise and sunset which override the window covering settings established by the solar tracking under these conditions.

In another embodiment, ASC 100 may be configured to detect bright overcast days and establish the appropriate window covering settings under these conditions. Bright overcast days tend to have a uniform brightness in the east and west while the zenith tends to be approximately one-third the brightness of the horizons which is contrary to a bright, clear day where the zenith is typically three times brighter than the horizon. Exterior sensors 125, such as photo sensors and/or radiometers, may be configured to detect these conditions. Under these conditions, the window coverings (top-down) may be pulled down to just below the desk height in order to promote proper illumination at the desk surface while providing a view to the cityscape. Internal photo sensors may also be helpful in determining this condition and may allow the window coverings to come down to only 50% and yet preserve the brightness and veiling glare comfort derived by illuminance ratios in the space. For example, various sensors 125, such as photometers and/or radiometers, may be placed on all sides and/or roof surfaces of a building. For example, a rectangular building with a flat roof may have various sensors 125 placed on all four sides of the building and on the roof. Thus, ASC 110 may detect directional sunlighting on a clear day. Additionally, ASC 110 may detect a bright overcast condition, wherein sunlighting may have a relatively diffuse, uniform luminous character. Accordingly, ASC 110 may implement various algorithms in order to control excessive sky brightness. Moreover, ASC 100 may comprise any various sensors 125 placed on all sides and/or facades of a building which has many orientations due to the shape of the building and/or the directions a building façade faces.

In various embodiments, overriding sensors 125 may also be strategically placed on each floor and connected to ASC 100 to help detect glare reflections from the urban landscape as well as to handle changes made in the urban landscape and ensure the proper setting for the shades to maintain visual comfort. These sensors 125 may also be employed to help reduce veiling glare and brightness problems at night in urban settings where minimal signage thresholds imposed on surrounding buildings and the instrumented building may pose unusual lighting conditions which may be difficult to model. In some cases, these situations may be static whereby a sensor 125 may be unnecessary and a timer may simply be employed to handle these conditions based on occupancy which is information that may be provided from the building's lighting system. Moreover, a reflectance algorithm may be employed by ASC 100 in order to account for reflected light, including reflected sunlight, reflected artificial light from nearby sources, and the like.

Figure 6:
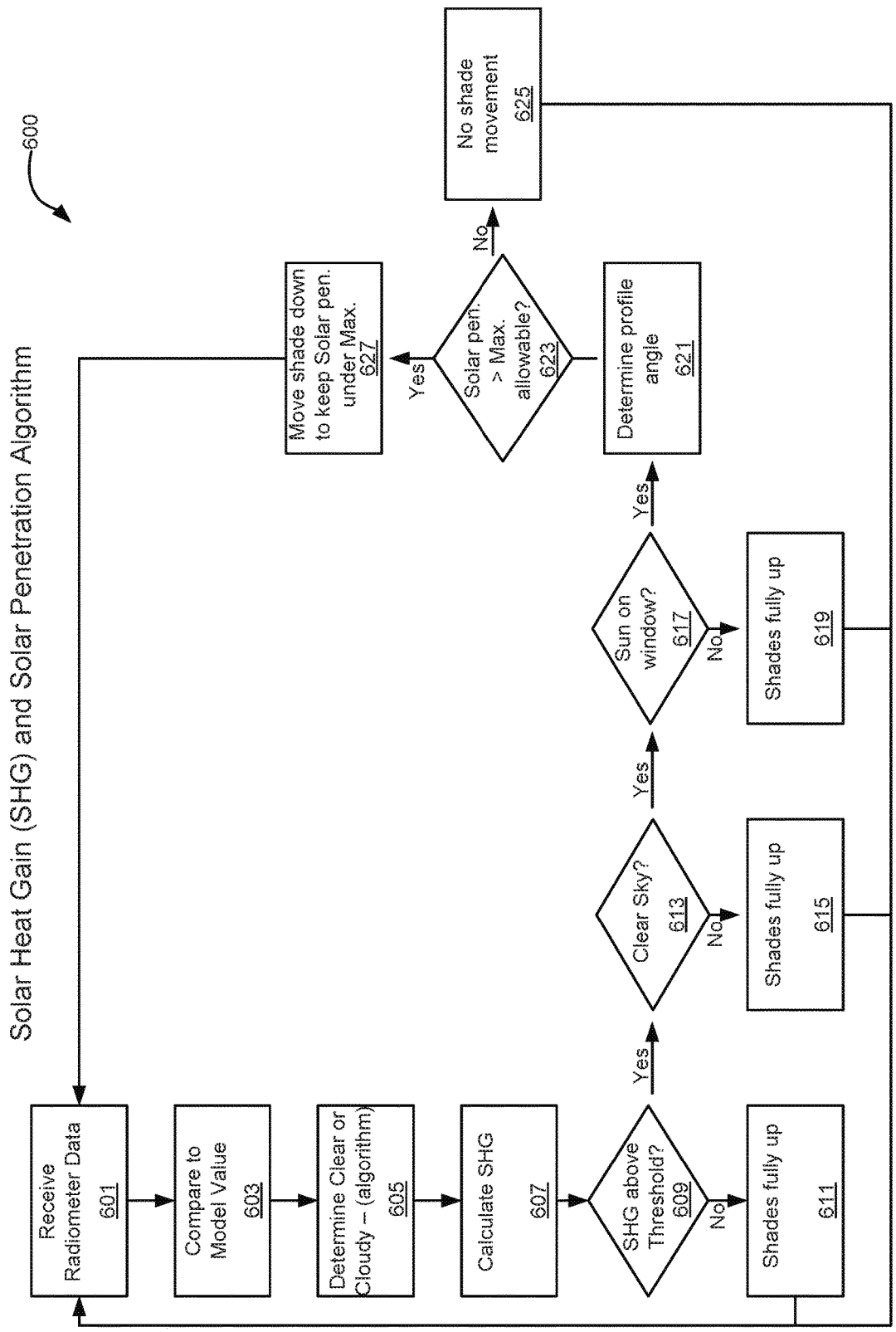
FIG. 6 illustrates a flowchart of exemplary solar heat gain and solar penetration sensing and reaction in accordance with various embodiments.

In accordance with various embodiments, and with reference now to FIG. 6, ASC 100 may be configured to implement an algorithm, such as algorithm 600, incorporating at least one of solar heat gain information, sky condition information, shadow information, reflectance information, solar profile information and/or solar penetration information. CCS 110 may be configured to receive information from one or more sensors 125, such as radiometers or other total solar measuring sensors (step 601). CSS 110 may then compare the received information to one or more model values (step 603). Based on the results of the comparison, CCS 110 may determine if the sky conditions are cloudy or clear (step 605). CCS 110 may then calculate the solar heat gain for the interior space in question (step 607). CCS 110 may then evaluate if the solar heat gain is above a desired threshold (step 609). If the solar heat gain is below a desired threshold, for example, one or more window coverings may be moved at least partially toward a fully opened position (step 611). Correspondingly, if one or more window coverings are already in a fully opened position, the window coverings may not be moved.

Continuing to reference FIG. 6, if the solar heat gain is above a desired threshold, CCS 110 may use sky condition information determined in step 605 to evaluate the need to move one or more window coverings (step 613). If the sky conditions are determined to be overcast, one or more window coverings may be moved at least partially toward a fully opened position and/or kept in a fully opened position (step 615). If the sky conditions are determined to be clear, CCS 110 may use at least one of shadow information, reflectance information, and the like, to determine if one or more windows in question are exposed to sunlight (step 617). If the one or more windows in question are not exposed to sunlight, the one or more window coverings may be moved at least partially toward a fully opened position and/or kept in a fully opened position (step 619). If the one or more windows in question are exposed to sunlight, CCS 110 may calculate and/or measure the profile angle and/or incident angle of the sunlight (step 621).

With continued reference to FIG. 6, based on information including but not limited to solar profile angle, solar incident angle, window geometry, building features, position of one or more window coverings, shadow information, reflectance information, sky conditions and/or the like, CCS 110 may then calculate the current solar penetration. If the current solar penetration is below a threshold solar penetration (step 623), one or more windows coverings may be moved at least partially toward a fully open position and/or kept in a fully opened position (step 625). Alternatively, if the current solar penetration is above a threshold solar penetration, CCS 110 may issue instructions configured to move one or more window coverings at least partway toward a fully closed position in order to reduce the current solar penetration below the threshold solar penetration (step 627).

Moreover, in certain embodiments, CCS 110 and/or ASC 100 may be configured with a delay period before responding to information received from a sensor (for example, reflectance information, brightness information, shadow information, and/or the like). For example, certain reflected light, such as light reflected from a moving vehicle, may be cast onto a particular surface only for a limited amount of time. Thus, movement of a window covering responsive to this reflected light may be unnecessary. Moreover, movement of the window covering may not be able to be completed before the reflected light has ceased. Additionally, responding to repeated transient reflected light rays (e.g., reflections from a procession of vehicles, from the unsettled surface of a body of water, and the like) may result in near-constant window covering movement in an attempt to keep up with the ever-changing lighting conditions. In another example, a certain shadow condition may only persist for a brief period of time, for example a shadow condition caused by the sun being momentarily obscured by a cloud. Therefore, movement of a window covering responsive to this change in lighting may be unnecessary.

Thus, in an embodiment, ASC 100 and/or CCS 110 is configured to respond to information from a sensor only after the sensor has reported a changed lighting condition (e.g., the appearance of reflected light, the appearance of shadow, and/or the like) persisting for five (5) seconds. In another embodiment, ASC 100 and/or CCS 110 is configured to respond to information from a sensor only after the sensor has reported a changed lighting condition persisting for ten (10) seconds. Moreover, ASC 100 may have a first response time associated with a first zone, a second response time associated with a second zone, and so on, and the response times associated with each zone may differ. Additionally, a user may update the response time associated with a particular zone, as desired. ASC 100 may thus be configured with any number of zone response times, default response times, user-input response times, and the like.

Figure 7A:
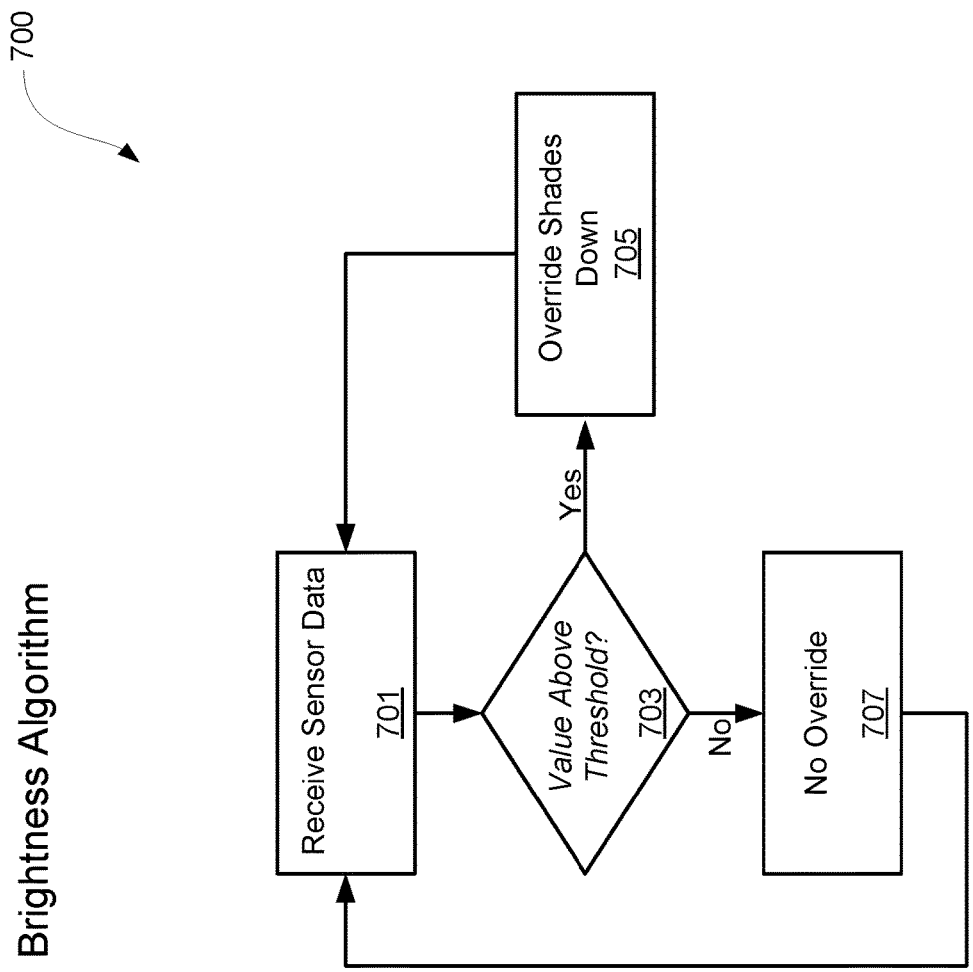
FIG. 7A illustrates a flowchart of exemplary brightness sensing and reaction in accordance with various embodiments.

Turning now to FIG. 7A, and in accordance with various embodiments, ASC 100 may be configured to implement an algorithm, such as algorithm 700, incorporating measured brightness information. CCS 110 may be configured to receive brightness information from one or more photometers. CCS 110 may also be configured to receive information from other sensors, such as radiometers, ultraviolet sensors, infrared sensors, and the like (step 701). CCS 110 may then evaluate the current luminance and/or illuminance, and compare the current luminance and/or illuminance to a threshold luminance and/or illuminance (step 703). If the current value exceeds a threshold value, CCS 110 may implement a brightness override, and one or more window coverings may be moved at least partway toward a fully closed position (step 705). If the current value does not exceed a threshold value, CCS 110 may not implement a brightness override, and one or more window coverings may be left in their current positions and/or moved at least partway toward a fully open position (step 707).

Moreover, ASC 100 may be configured to utilize one or more external sensors, for example visible light sensors, in order to implement a brightness override. In this manner, individual building zone brightness sensors may be reduced and/or eliminated, leading to significant cost savings, as the building zone brightness sensors may be costly to purchase and/or install, and difficult to calibrate and/or maintain. Moreover, ASC 100 may be configured to utilize one or more interior photo sensors in conjunction with one or more external photo sensors in order to determine if a brightness override is needed for any of the motor zones in a particular building.

Figure 7B:
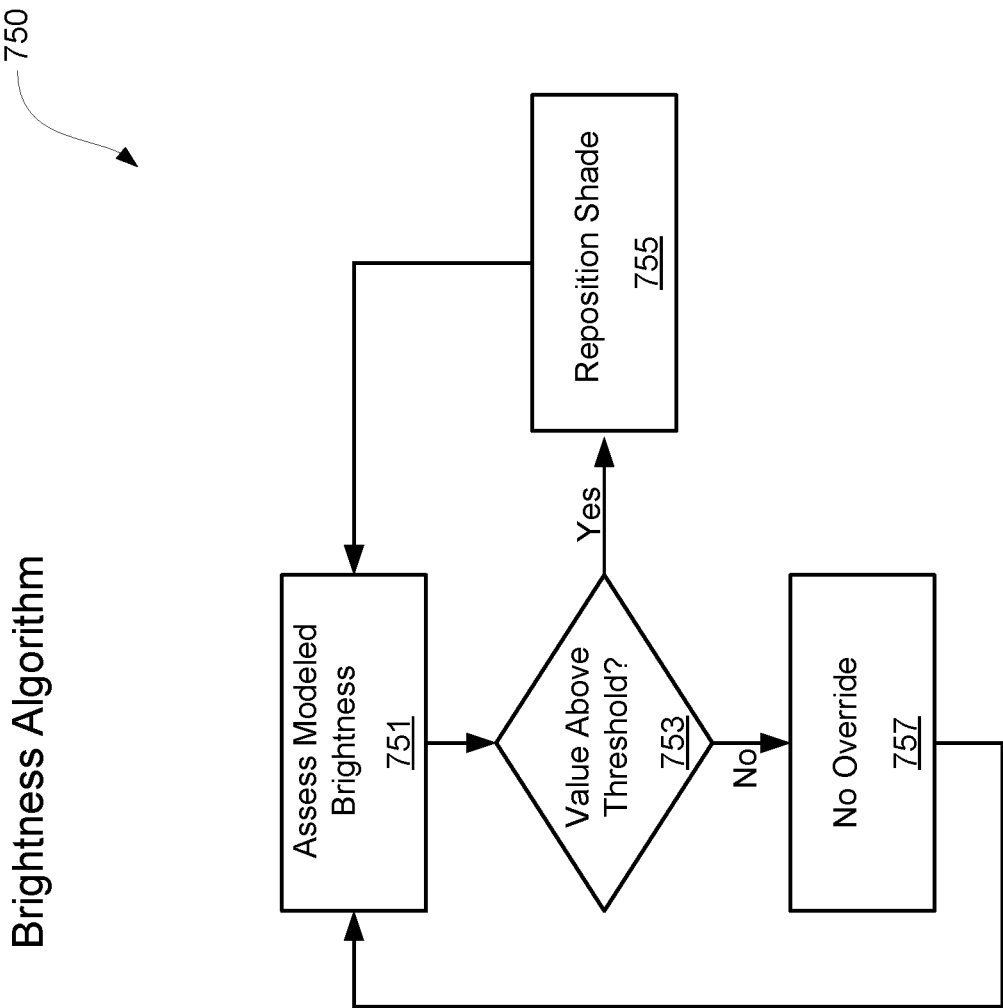
FIG. 7B illustrates a flowchart of exemplary brightness modeling and reaction in accordance with various embodiments.

Turning now to FIG. 7B, and in accordance with various embodiments, ASC 100 may be configured to implement an algorithm, such as algorithm 750, incorporating modeled brightness information. For example, ASC 100 may be configured to utilize modeled brightness information in order to determine whether to move a shade. In various embodiments, the modeled brightness information is correlated and/or curve-fit to a measured and/or modeled BTU load on a window, a measured and/or modeled total solar radiation level (for example, as predicted by a clear sky model, such as an ASHRAE model), or other variable associated with a window. In various embodiments, a brightness model may be utilized by and/or incorporated into ASC 100 in order to enable adjustment of shades in incremental, intermediate positions (in addition to fully closed or fully open) to achieve a desired brightness level, for example, a desired brightness level in a room. In connection with a brightness model, ASC 100 may be configured to position a particular shade in up to 128 intermediate positions between fully open and fully closed. In this manner, ASC 100 enables incremental adjustment of the brightness level in a room, rather than just a binary open/closed adjustment. For example, if brightness is X Lux, go to position 1, if brightness is Y Lux, go to position 2, and so forth.

Using modeled brightness information, ASC 100 may be configured with a reduced and/or eliminated reliance on external photometers and/or radiometers. For example, via use of modeled brightness information, ASC 100 may be operable at a suitable level of performance in connection with only a single external photometer (for example, a photometer located on the roof of a building) or a small number of external photometers (for example, a photometer associated with each floor of a building), rather than in connection with a photometer associated with each window on a building. In this manner, by eliminating most and/or all external photometers, ASC 100 may be configured to greatly reduce initial system cost, reduce ongoing maintenance expense, and improve system reliability.

In addition to modeled brightness information, measured brightness information may be utilized by ASC 100, for example, to calibrate and/or refine a brightness model. In various embodiments, a default brightness model may be utilized by ASC 100 in connection with a particular building based on latitude, elevation, date and time, and so forth. Based on information obtained over time from one or more radiometers and/or photometers associated with the building, ASC 100 may refine and/or revise the default brightness model to more closely model actual conditions associated with the building. In this manner, ASC 100 may improve the accuracy of a brightness model, allowing ongoing operation of ASC 100 with fewer and/or no photometers while still delivering an acceptable level of performance.

Moreover, measured brightness information utilized to refine, update, modify, or supplement modeled brightness information may be obtained from one or more sensors (e.g., photometers, radiometers, and/or the like). In various embodiments, ASC 100 is configured with four (4) photometers, one facing each cardinal direction (north, south, east, west). Brightness information from the photometers may be utilized to refine and/or update the brightness model. In various embodiments, ASC 100 is configured with photometers in the intercardinal directions (northeast, northwest, southwest, southeast). Photometers may vary in azimuth as well as elevation in order to obtain a desired amount of measured brightness information.

In various embodiments, a brightness model is configured to consider multiple factors contributing to the brightness at a location of interest (for example, a window) throughout the day. In various embodiments, a brightness model is configured to include information about direct solar radiation, diffused solar radiation, reflected solar radiation, and field-of-view (i.e., skyline) information for one or more locations of interest In various embodiments, a brightness model may be created by utilizing correlation, curve-fitting, modification factors (i.e. weighting), algorithms, and/or other mathematical relationships to one or more other variables associated with a structure (and/or locations of interest thereon) and/or the environment of a structure. For example, a brightness model may be created and/or refined by utilizing one or more of a clear sky model, measured BTU load information, modeled BTU load information, atmospheric information (altitude, humidity, pollution, and/or the like), measured total radiation, modeled total radiation, window orientation, window elevation, window azimuth, window size, window altitude, skyline information, and/or the like. Moreover, a brightness model may be created and/or modified by utilizing any suitable inputs or variables, as desired.

In various embodiments, field-of-view information may be utilized in a brightness model in order to more accurately predict and/or model how brightness varies at a location of interest and/or among multiple locations of interest (e.g., multiple windows on a building). For example, in a particular building, a first window (having a particular orientation, elevation, and so forth) may have an unobstructed view to the horizon, while a second window (having, again, its own particular orientation, elevation, and so forth) may have a partially obstructed view due to a nearby building, and a third window may have a nearly completely obstructed view due to the nearby building. Because the field-of-view can affect the brightness at a location, a brightness model may incorporate this information for each location of interest (e.g., in order to allow ASC 100 to control the shades in a desired manner). In this manner, ASC 100 may implement a modeled brightness override for shades associated with certain windows, while simultaneously not implementing a modeled brightness override for shades associated with certain other windows. Stated differently, ASC 100 may be configured to implement a modeled brightness override on an "as-needed" basis, and independently with respect to one window and/or motor zone from another.

Additionally, in various embodiments ASC 100 may be configured with multiple photometers in order to assess the amount of brightness that is due to the sky dome and the amount of brightness that is due to the urban landscape. As discussed in additional detail herein, in various embodiments, a computer model of a building and its surroundings can be used to generate a Pleijel projection image (for example, a "virtual camera" constructs a 180 degree hemispherical projection of all objects visible in the direction the virtual camera is facing). This field of view information can be combined and/or correlated with photometer information and utilized in brightness model. For example, a photometer mounted on a rooftop may be utilized to identify brightness contributions from the sky dome, while a photometer mounted on a window may be utilized to identify brightness contributions from the adjacent urban landscape. The relative weighting of these inputs can be adjusted, for example based on the field of view information.

In various embodiments, field-of-view information may be utilized in a brightness model as an adjustment parameter, for example expressed as a percentage, which may modify the effect of calculated sky brightness for a location of interest. For example, if the view from a particular window includes urban landscape in the bottom ⅔ of the view, and sky in the upper ⅓ of the view, a particular adjustment parameter value may be set, decreasing the effect/contribution of calculated sky brightness as compared to a full sky view at that location of interest in consideration of the urban landscape portion of the field of view. Similarly, if the view from a particular window includes urban landscape in the bottom ⅓ of the view, and sky in the upper ⅔ of the view, a particular adjustment parameter value may be set, decreasing the effect of calculated sky brightness to a lesser degree. It will be appreciated that, in general, the greater the degree to which the urban landscape or other items occlude a view of the sky at a location of interest, the lesser the contribution/impact of calculated sky brightness in a brightness model for that location of interest.

In various embodiments, ASC 100 is configured to use a measured brightness algorithm simultaneously with a modeled brightness algorithm, for example in order to refine the modeled brightness algorithm, to evaluate potential addition and/or removal of photometers, to evaluate computational loads on the system, and so forth.

In various embodiments, ASC 100 is configured to use a modeled brightness algorithm that incorporates luminance values. In various other embodiments, ASC 100 is configured to use a modeled brightness algorithm that incorporates illuminance values. In certain embodiments, ASC 100 is configured to use a modeled brightness algorithm that incorporates luminance values and illuminance values.

Additionally, in certain embodiments a modeled brightness algorithm may be operative in real time; in other embodiments a modeled brightness algorithm may operate not in real time. Moreover, a modeled brightness algorithm may be configured to use current weather data from local sensors or third-party sources (for example, weather data available from a database or via an electronic network), historical weather data, and so forth.

In various embodiments, ASC 100 is configured to utilize a brightness model in connection with one or more timers and/or delays. For example, ASC 100 may be configured to not implement a modeled brightness override if one or more windows and/or motor zones will be in an excessive brightness condition for a limited period of time, such as between about one minute and thirty minutes. Moreover, ASC 100 may be configured to not implement a modeled brightness override if one or more windows and/or motor zones will be in an excessive brightness condition for any desired length of time.

"Excessive" brightness may include a condition that causes visual or physical discomfort for an occupant. Moreover, excessive brightness may include a specific brightness value in Lux that is flagged as excessive. For example, if it is a cloudy day and Lux in the room is above a certain value, then the room is too bright. If it is a sunny day and Lux in the room is above another certain value, then the room is too bright.

It will be appreciated that ASC 100 may be configured to utilize modeled brightness information at a particular location, for example on a vertical plane that is parallel to window glass. In this manner, modeled brightness information may be further accounted for and/or utilized, for example, by considering internal brightness values to be equal to modeled brightness values multiplied by the visible light transmittance of the window glass. Similarly, modeled brightness information may be utilized in connection with information regarding brightness factor of shade material in order to determine overall internal brightness arising from a particular window and shade combination. Additional details regarding brightness factor may be found in U.S. Ser. No. 12/710,054, now U.S. Patent Application Publication No. 2010/0157427 entitled "System and Method for Shade Selection Using a Fabric Brightness Factor", the contents of which is hereby incorporated by reference in its entirety for all purposes.

Continuing to reference FIG. 7B, in an exemplary method, ASC 100 may be configured to utilize modeled brightness information in connection with implementing a modeled brightness override. ASC 100 may receive, retrieve, or otherwise obtain a modeled brightness value for a location of interest (step 751). ASC 100 may then evaluate the modeled brightness value, and compare the modeled brightness value to a threshold brightness value (step 753). If the modeled brightness value exceeds a threshold brightness value, ASC 100 may implement a modeled brightness override, and one or more window coverings may be moved at least partway toward a fully closed position (step 755). If the modeled brightness value does not exceed a threshold brightness value, ASC 100 may not implement a modeled brightness override, and one or more window coverings may be left in their current positions and/or moved at least partway toward a fully open position (step 757).

In various embodiments, ASC 100 may be configured to implement a modeled brightness override when ASC 100 is operating in clear sky mode. In various embodiments, ASC 100 may be configured to implement a modeled brightness override when ASC 100 observes measured solar radiation equal to or in excess of a threshold value, for example 75 percent of a clear sky model (for example, ASHRAE) calculated clear sky solar radiation, 60 percent of a clear sky model calculated clear sky solar radiation, and/or the like.

In various embodiments, ASC 100 may be configured to control the position of one or more window coverings based on multiple algorithms. The algorithms may be ranked or otherwise weighted to determine priority. In certain embodiments, ASC 100 may control the position of one or more window coverings based on algorithms associated with i) solar penetration, ii) solar heat gain, iii) illuminance, iv) luminance, v) sky conditions, and/or combinations of some or all of the foregoing. Depending on user preference, climate conditions, energy expenditure targets, and the like, the priority of a certain algorithm may be raised and/or lowered. Thus, in certain instances an algorithm for controlling one or more window coverings based on solar heat gain may take priority over an algorithm for controlling one or more window coverings based on solar penetration. Likewise, in certain other instances an algorithm for controlling one or more window coverings based on solar penetration may take priority over an algorithm for controlling one or more window coverings based on solar heat gain. Moreover, in yet other instances an algorithm for controlling one or more window coverings based on modeled brightness information may take priority over an algorithm for controlling one or more window coverings based on solar heat gain, and so forth.

Yet further, in various embodiments various control algorithms may be configured to have only partial priority over one another. For example, an algorithm for controlling one or more window coverings based on solar penetration may determine a maximum level to which a window covering can be raised without exceeding a target solar penetration level. Another algorithm, for example an algorithm for controlling one or more window coverings based on modeled brightness information, may determine a different position for a window covering in order to avoid excessive brightness; ASC 100 may be configured to allow the modeled brightness algorithm to further refine (e.g., lower and raise) the position of the window covering, provided such position does not exceed the maximum allowed position calculated by the solar penetration algorithm. Stated differently, the modeled brightness algorithm may be permitted to raise and lower a window shade, but not beyond the maximum raised level permitted by the solar penetration algorithm. In a similar manner, multiple algorithms may be configured in a hierarchy, or otherwise restrict or partially govern one another, in order to provide a greater level of control over one or more window coverings.

Figure 8:
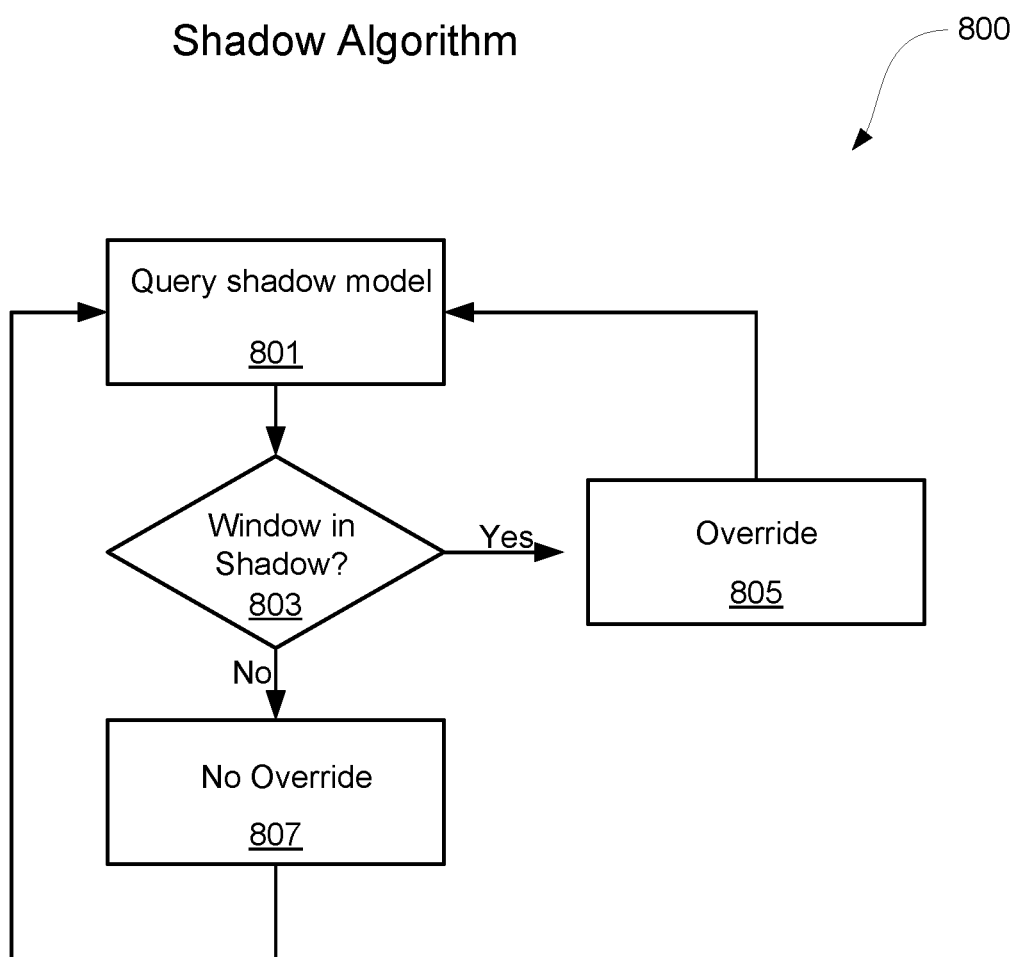
FIG. 8 illustrates a flowchart of exemplary shadow modeling and reaction in accordance with various embodiments.

With reference now to FIG. 8, and in accordance with various embodiments, ASC 100 may be configured to implement an algorithm, such as algorithm 800, incorporating shadow information. CCS 110 may be configured to query a shadow model (step 801) which may contain information regarding shadowing of a building due to the environment, such as nearby structures, landscape features (e.g., mountains, hills, and the like), and other items which may cast a shade onto a building at any point during a day and/or year. CCS 110 may then evaluate the current shadow information to determine if one or more windows and/or motor zones are in a shadowed condition (step 803). If the one or more windows and/or motor zones are shadowed, CCS 110 may implement a shadow override, and one or more window coverings may be moved at least partway toward a fully open position (step 805). If one or more windows and/or motor zones are not shadowed, CCS 110 may not implement a shadow override, and one or more window coverings may be left in their current positions and/or moved at least partway towards a fully closed position (step 807). Additionally, CCS 110 may be configured to not implement a shadow override if one or more windows and/or motor zones will be shadowed for a limited period of time, such as between about one minute and thirty minutes. Moreover, CCS 110 may be configured to not implement a shadow override if one or more windows and/or motor zones will be shadowed for any desired length of time.

In various embodiments, CCS 110 may be configured to implement a shadow override when ASC 100 is operating in clear sky mode. In various embodiments, CCS 110 may be configured to implement a shadow override when ASC 100 observes measured solar radiation equal to or in excess of 75 percent of ASHRAE calculated clear sky solar radiation. Moreover, in various embodiments, CCS 110 may be overridden by a bright overcast sky mode calculation wherein one or more window coverings are moved to a predetermined position, for example 50% of fully open.

Figure 9:
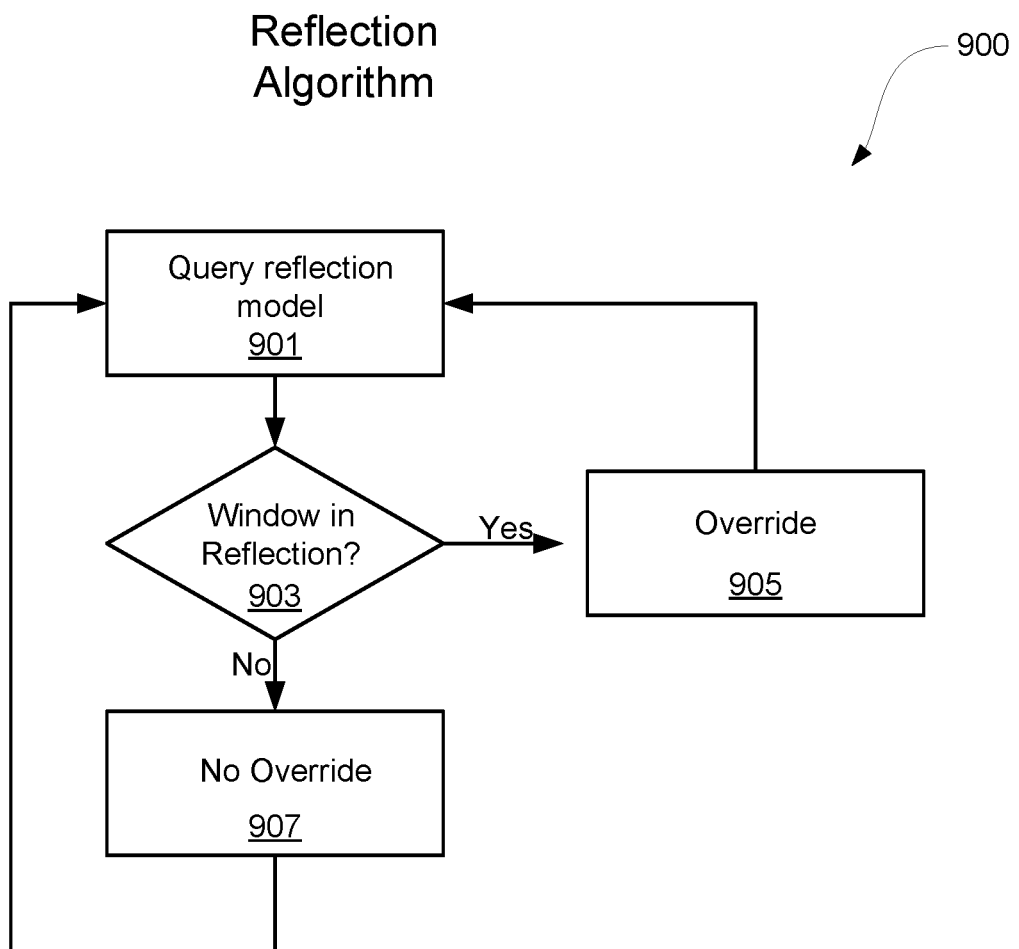
FIG. 9 illustrates a flowchart of exemplary reflectance modeling and reaction in accordance with various embodiments.

With reference now to FIG. 9, and in accordance with various embodiments, ASC 100 may be configured to implement an algorithm (e.g., algorithm 900) incorporating reflectance information. CCS 110 may be configured to query a reflectance model (step 901) which may contain information regarding light reflected onto a building due to the environment, for example by reflective components of nearby structures, landscape features (e.g., water, sand, snow, and the like), and other items which may reflect light onto a building at any point during any time period (e.g., day, season, year). CCS 110 may then evaluate the current reflectance information to determine if one or more windows and/or motor zones are in a reflectance condition (step 903). If reflected light is cast on at least a portion of one or more windows and/or motor zones, the window and/or motor zone may be deemed to be in a reflectance condition. Moreover, if only a subset of the windows comprising a motor zone is in a reflectance condition, that motor zone may be considered to be in a reflectance condition.

However, ASC 100 may be configured to assess each window in a motor zone and determine if each window is in a non-reflectance condition (e.g., no reflected light is falling on the window), a full reflectance condition (e.g., reflected light is falling on all portions of the window), a partial reflectance condition (e.g., reflected light is falling on only a portion of the window), and the like. ASC 100 may thus consider a window and/or motor zone to be in a reflectance condition based on a user preference. For example, in an embodiment, ASC 100 is configured to consider a window to be in a reflectance condition when the window is fully or partially in reflected light. In other embodiments, ASC 100 is configured to consider a window to be in a reflectance condition when the window is fully in reflected light. In still other embodiments, ASC 100 is configured to consider a window to be in a reflectance condition when at least 10% of the window is in reflected light. Moreover, ASC 100 may consider a window to be in a reflectance condition by using any appropriate thresholds, measurements, and/or the like.

If the one or more windows and/or motor zones are in reflected light, CCS 110 may implement a reflectance override, and one or more window coverings may be moved at least partway toward a fully closed position (step 905). If one or more windows and/or motor zones are not in reflected light, CCS 110 may not implement a reflectance override, and one or more window coverings may be left in their current positions and/or moved at least partway towards a fully open position (step 907). Additionally, CCS 110 may be configured to not implement a reflectance override in response to one or more windows and/or motor zones being in reflected light for a limited period of time, such as between about one minute and thirty minutes. Moreover, CCS 110 may be configured to not implement a reflectance override if one or more windows and/or motor zones will be in reflected light for any desired length of time.

ASC 100 may further be configured to enable and/or disable a reflectance override based on any suitable criteria, for example: the current ASHRAE and/or radiometer sky data readings (i.e., full spectrum information); the sky data readings from one or more photometers (i.e., oriented in any suitable manner, for example east-facing, west-facing, zenith-oriented, and/or the like); a combination of radiometer and photometer data readings; and/or the like. Moreover, data from one or more photometers may be utilized by ASC 100 in order to calculate the need for a reflectance override. However, data from one or more radiometers may also be utilized. Further, in various embodiments, ASC 100 may be configured to implement various averaging algorithms, thresholds, and the like in order to reduce the need for repeated movements or "cycling" of one or more window coverings 255.

In various embodiments, CCS 110 may be configured to implement a reflectance override when ASC 100 is operating in clear sky mode. However, CCS 110 may also implement a reflection override, for example responsive to radiometer sky data, when ASC is operating in any mode. In various embodiments, CCS 110 may be configured to implement a reflectance override when ASC 100 observes measured solar radiation equal to or in excess of a particular threshold, for example 75 percent of ASHRAE calculated clear sky solar radiation. Further, the threshold utilized for implementing a reflectance override may be related to the threshold utilized for determining a sky condition (clear, cloudy, bright overcast, partly sunny, and the like). For example, in an embodiment, the threshold utilized for implementing a reflectance override may be 5% greater than the threshold for determining a clear sky condition. Additionally, when radiometers and photometers are employed, CCS 110 may be configured to implement a reflectance override only when ASC 100 is operating under a particular mode or modes (clear sky, partly clear sky, and so forth). CCS 110 may thus assess data received from one or more photometers in order to see if the ambient lighting level is above a particular threshold. Moreover, in various embodiments, CCS 110 may be overridden by a bright overcast sky mode calculation wherein one or more window coverings are moved to a predetermined position, for example 50% of fully open.

Figure 10A:
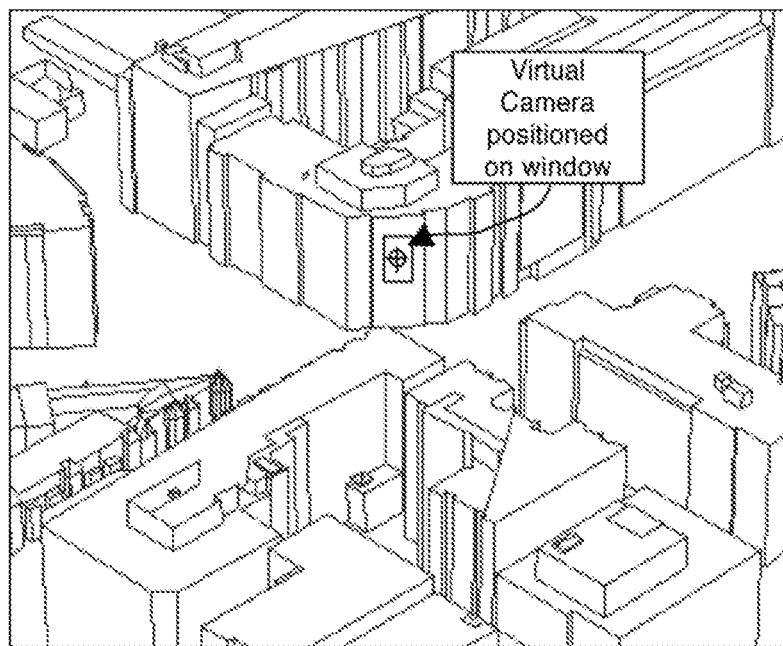
FIGS. 10A-10E illustrate reflectance modeling in accordance with various embodiments.
Figure 10B:
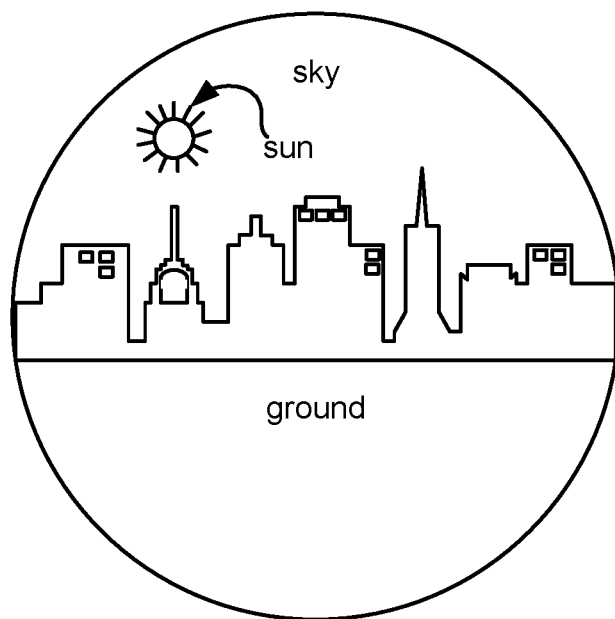

With reference now to FIGS. 10A to 10D, in various embodiments, a reflectance program is configured to determine if reflected light falls on a particular location on a building. A three-dimensional computer model of the building is constructed. As depicted in FIG. 10A, a virtual camera is placed at the location on the building model where reflectance is to be assessed. A three-dimensional computer model of surrounding objects (other buildings, bodies of water, and the like) is constructed. With this information, the virtual camera constructs a 180 degree hemispherical projection of all objects visible in the direction the camera is facing, as depicted in FIG. 10B. The position of the sun is plotted in the hemispherical projection. Depending on the position of the sun and the properties of the objects visible to the camera (e.g., reflective, non-reflective, and the like), the virtual camera location may be in a direct sunlight condition, shaded condition, a reflectance condition, and the like. For example, if the position of the sun is within the boundary of another building, and the building is not reflective, the building will cast a shadow onto the virtual camera location, resulting in a shaded condition.

Figure 10C:
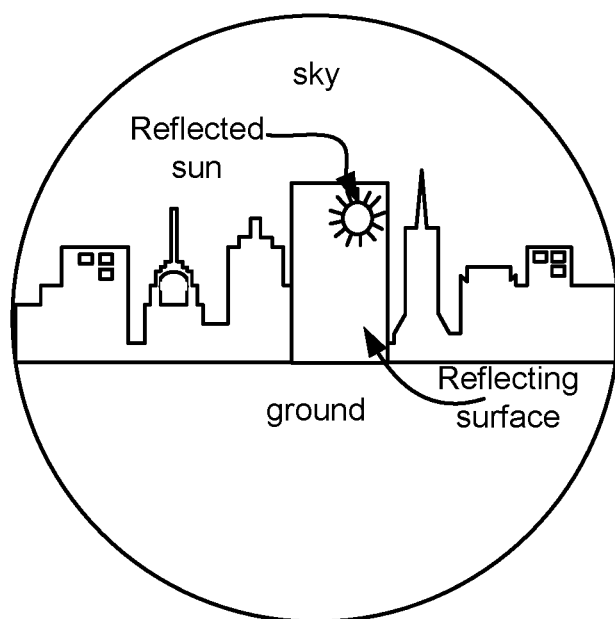

With reference now to FIG. 10C, in accordance with various embodiments, one or more reflecting surfaces are plotted in the hemispherical projection. Information about reflecting surfaces may be stored in a reflector table. For example, a reflector table may contain information characterizing the dimensions of the reflecting surface, the location of a reflecting surface, the azimuth of a reflecting surface, the altitude of a reflecting surface, and/or the like. Information from the reflector table may be utilized to plot one or more reflecting surfaces in the hemispherical projection. Moreover, for a defined sun position in the sky (azimuth and altitude), the sun may be reflected onto the virtual camera location by one or more of the reflecting surfaces. The reflected sun (and associated sunlight) has a position (azimuth and altitude) different from the actual sun location in the sky. The reflected sun is plotted on the hemispherical projection.

Figure 10D:
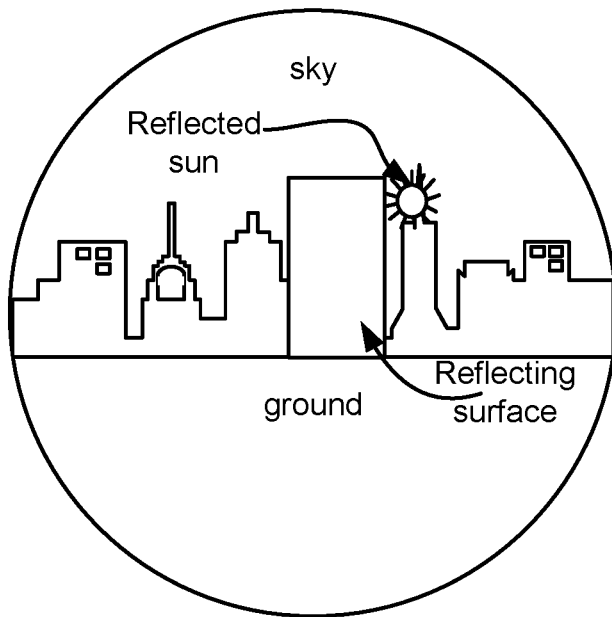

At this point, the reflected sun may fall within the bounds of at least one reflecting surface. If this occurs, the reflected sunlight will fall on the virtual camera, as illustrated in FIG. 10C. Alternately, the reflected sun may fall outside the bounds of any reflecting surface. In this event, no reflected sunlight falls on the virtual camera, as illustrated in FIG. 10D.

Figure 10E:
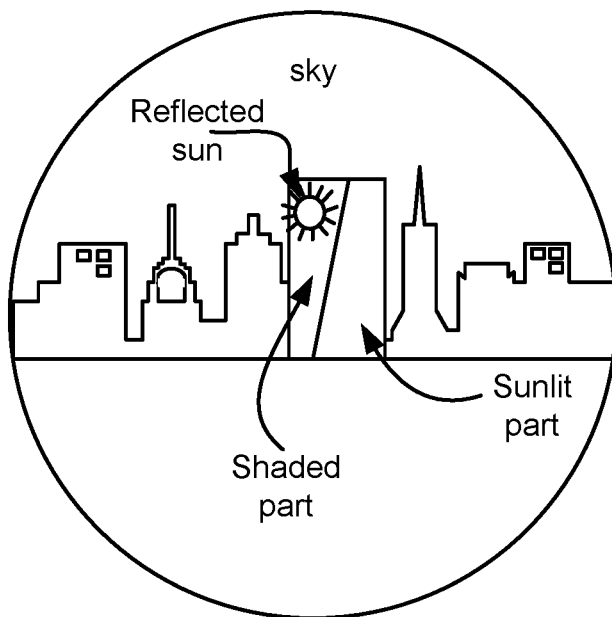
Figure 11A:
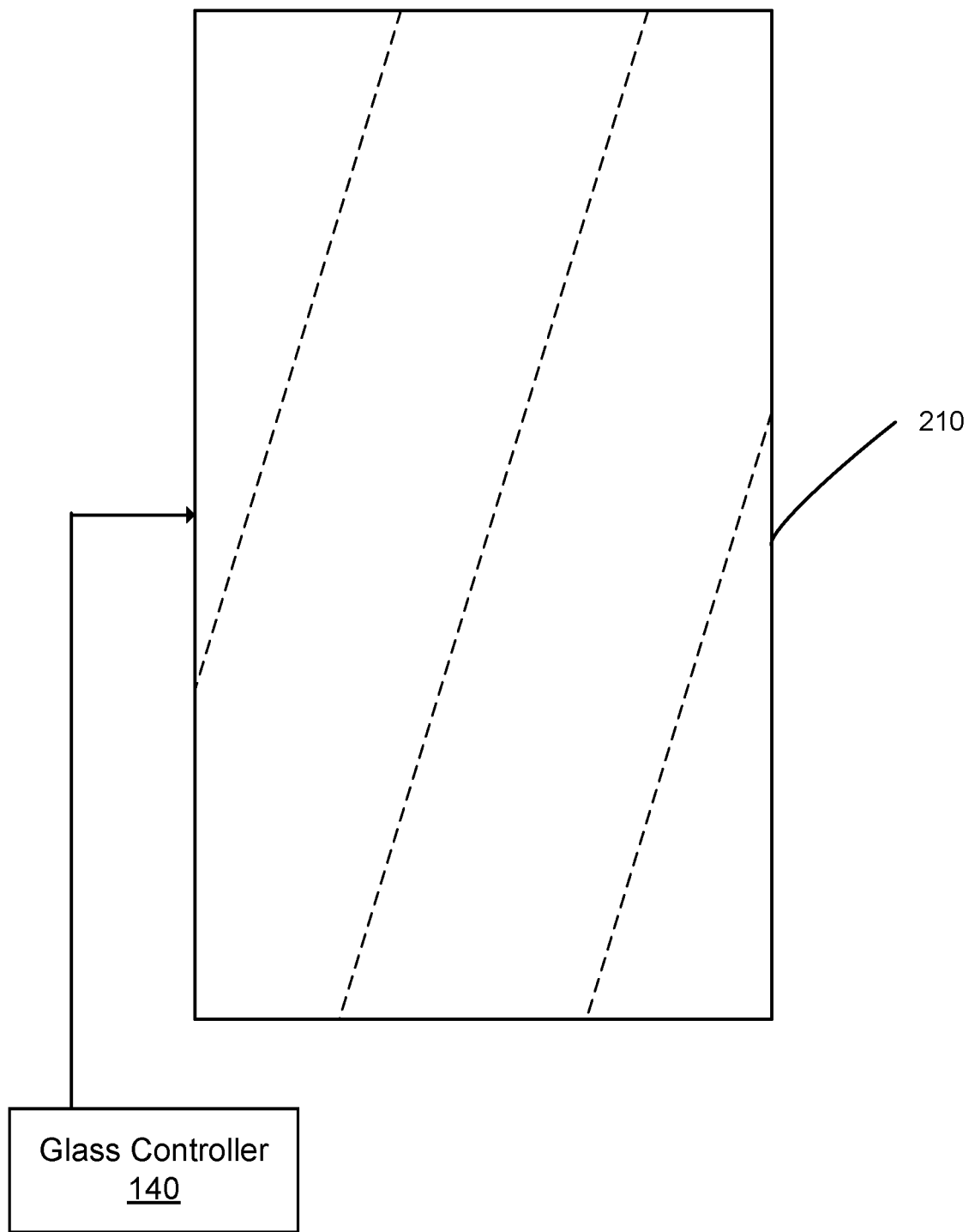
FIGS. 11A and 11B illustrate control of a variable characteristic of a glass in a uniform manner across a window in accordance with various embodiments.
Figure 11B:
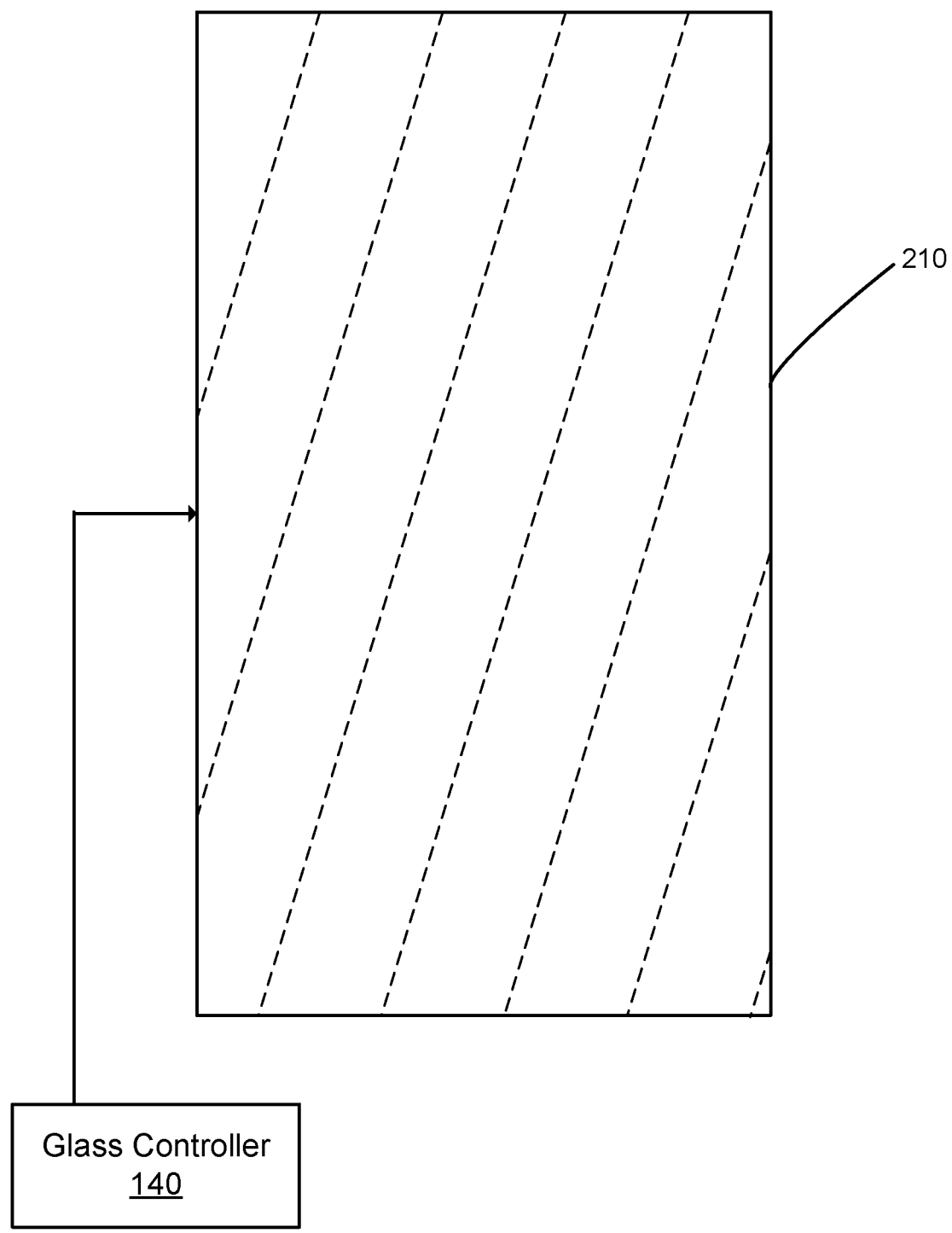
Figure 11C:
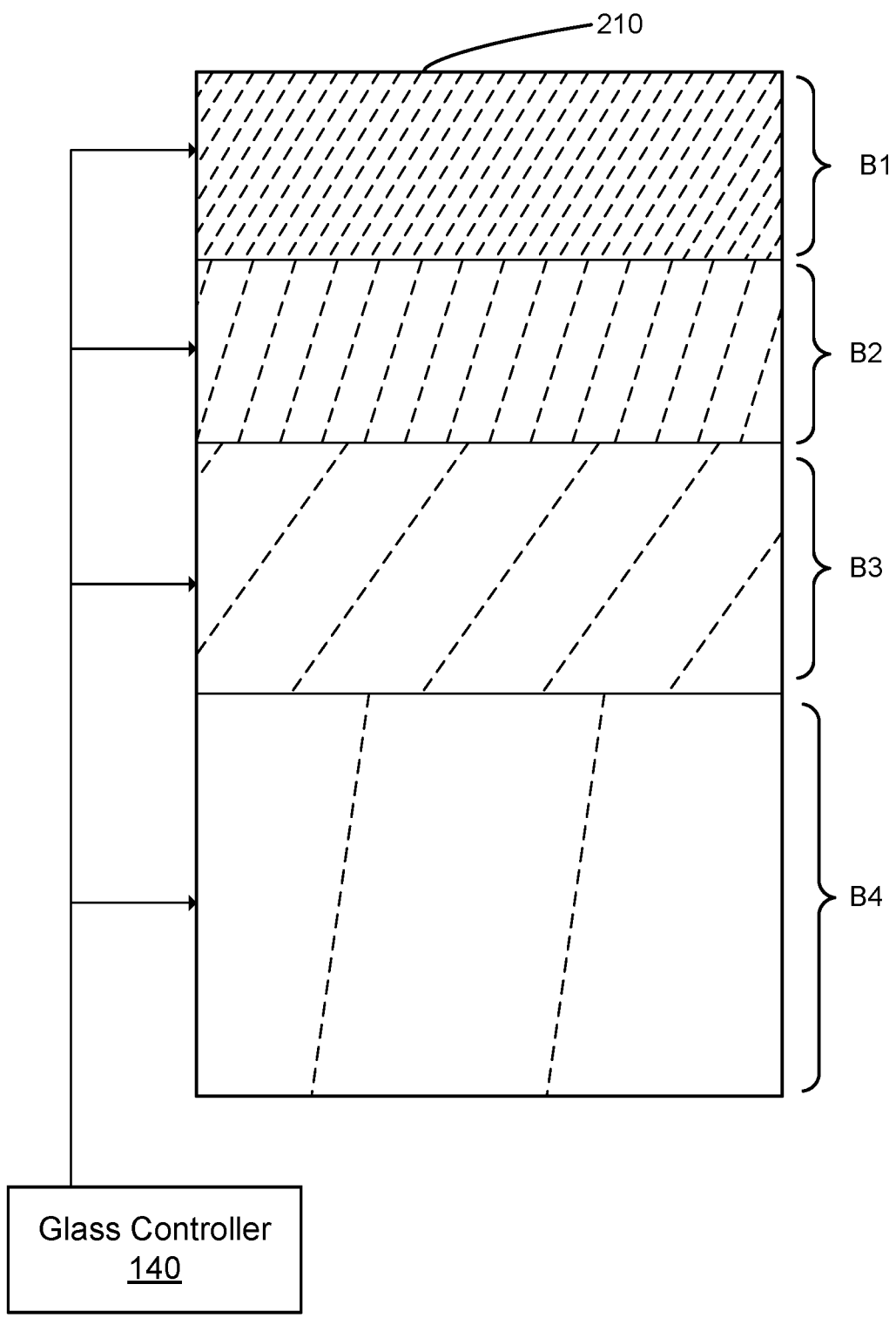
FIG. 11C illustrates control of a variable characteristic of a glass in a banded manner across a window in accordance with various embodiments.

Moreover, as illustrated by FIG. 10E, a reflecting surface may itself be shaded. A reflectance program may test the location of the reflected sun to determine if the reflected sun is in the shaded or sunlit portion of a reflecting surface. If the reflected sun is on the sunlit part of the reflecting surface, the reflected sunlight will fall on the virtual camera. If the reflected sun is on the shaded part of the reflecting surface, no reflected sunlight will fall on the virtual camera. Moreover, a reflectance program may be configured to account for and properly model "self-shading", wherein a portion of a building casts a shadow onto another portion of the building, and "self-reflectance", wherein a portion of a building reflects light onto another portion of the building. In this manner, a reflectance algorithm may model, plot, determine, and/or otherwise calculate the presence and/or absence of specular reflections and/or diffuse reflections at any desired location. Moreover, reflectance information for complex building shapes (e.g., cruciform buildings, pinwheel-shaped buildings, irregular buildings, and/or the like) may thus be modeled, and one or more window coverings 255 may be moved accordingly.

In various embodiments, CCS 110 may occasionally calculate conflicting movement information for a motor zone (for example, via use one or more of algorithm 600, algorithm 700, algorithm 750, algorithm 800, algorithm 900, and/or the like). For example, a first portion of a motor zone may be in a shadowed condition, resulting in CCS 110 calculating a need to move at least one window covering toward a fully open position in accordance with algorithm 800. At the same time, a second portion of a motor zone may be in a reflectance condition—resulting in CCS 110 calculating a need to move at least one window covering toward a fully closed position in accordance with algorithm 900. In order to maintain brightness comfort, CCS 110 may be configured to allow the results of algorithm 900 to take priority over the results of algorithm 800. Stated another way, CCS 110 may be configured to give reflectance priority over shadow.

CCS 110 may be configured to execute one or more algorithms, including but not limited to algorithms 600, 700, 750, 800, and/or 900, on a continuous and/or real-time basis, on a scheduled basis (every ten seconds, every minute, every ten minutes, every hour, and the like), on an interrupt basis (responsive to information received from one or more sensors, responsive to input received from a user, responsive to a remote command, and the like), and/or any combination of the above. Moreover, CCS 110 may be configured to execute an algorithm, such as algorithm 600, independently. CCS 110 may also be configured to execute an algorithm, such as algorithm 600, simultaneously with one or more additional algorithms, such as algorithm 700, algorithm 750, algorithm 800, algorithm 900, and the like. Further, CCS 110 may be configured to turn off and/or otherwise disable use of one or more algorithms, such as algorithm 800, as desired, for example when conditions are overcast, cloudy, and the like. Moreover, CCS 110 may be configured to implement and/or execute any suitable number of algorithms at any suitable times in order to achieve a desired effect on an enclosed space.

As mentioned herein, ASC 100 may be configured to communicate with a Building Management System (BMS), a lighting system and/or a HVAC system to facilitate optimum interior lighting and climate control. Moreover, ASC 100 may communicate with a BMS for any suitable reason, for example, responsive to overheating of a zone, responsive to safety considerations, responsive to instructions from a system operator, and/or the like. For example, ASC 100 may be used to determine the solar load on a structure and communicate this information to the BMS. The BMS, in turn, may use this information to proactively and/or reactively set the interior temperatures and/or light levels throughout the structure to avoid having to expend excessive energy required to mitigate already uncomfortable levels, and to avoid a lag time in response to temperature changes on a building. For example, in typical systems, a BMS responds to the heat load on a building once that heat load has been registered. Because changing interior environment of a building takes significant energy, time and resources, there is a substantial lag in response time by a BMS to that heat load gain. In contrast, the proactive and reactive algorithms and systems of ASC 100 are configured to actively communicate to BMS regarding changes in brightness, solar angle, heat, and the like, such that BMS can proactively adjust the interior environment before any uncomfortable heat load/etc. on a building is actually registered.

Furthermore, ASC 100 may be given the priority to optimize the window covering settings based on energy management and personal comfort criteria after which the lighting system and HVAC system may be used to supplement the existing condition where the available natural daylight condition may be inadequate to meet the comfort requirements. Communication with a lighting system may be imperative to help minimize the required photo sensor resources where possible and to help minimize situations where closed loop sensors for both the shading and lighting control algorithms may be affected by each other. For example, based on information from one or more brightness sensors, ASC 100 may move at least one window covering into a first position. After ASC 100 has moved a window covering, a lighting system may then be activated and select appropriate dimming for the room. However, oftentimes the lighting system may overcompensate an existing bright window wall where the lighting system may lower the dimming setting too far and thus create a "cave effect" whereby the illuminance ratio from the window wall to the surrounding wall and task surfaces may be too great for comfort. Proper photo sensor instrumentation for illuminance ratio control may be configured to help establish the correct setting for the shades as well as for the lights even though it may cost more energy to accomplish this comfort setting. In addition, the lighting sensor may also provide the shading system with occupancy information which may be utilized in multi-use spaces to help accommodate different modes of operation and functionality. For instance, an unoccupied conference room may go into an energy conservation mode with the window coverings being deployed all the way up or down in conjunction with the lights and HVAC to minimize solar heat gain or maximize heat retention. Furthermore, the window coverings may otherwise enter into a comfort control mode when the space is occupied unless overridden for presentation purposes.

ASC 100 may also be configured to be customizable and/or fine-tuned to meet the needs of a structure and/or its inhabitants. For example, the different operating zones may be defined by the size, geometry and solar orientation of the window openings. ASC 100 control may be configured to be responsive to specific window types by zone and/or to individual occupants. ASC 100 may also be configured to give a structure a uniform interior/exterior appearance instead of a "snaggletooth" look that is associated with irregular positioning of window attachments.

ASC 100 may also be configured to receive and/or report any fine-tuning request and/or change. Thus, a remote controller and/or local controller may better assist and or fine-tune any feature of ASC 100. ASC 100 may also be configured with one or more global parameters for optimizing control and use of the system. Such global parameters may include, for example, the structure location, latitude, longitude, local median, window dimensions, window angles, date, sunrise and sunset schedules, one or more communication ports, clear sky factors, clear sky error rates, overcast sky error rates, solar heat gain limits for one or more window covering positions, positioning timers, the local time, the time that the shade control system will wait before adjusting the shades from cloudy to clear sky conditions (or vise versa) and/or any other user-defined global parameter.

ASC 100 may also be configured to operate, for example, in a specific mode for sunrise and/or sunset because of the low heat levels, but high sun spot, brightness, reflectance and veiling glare associated with these sun times. For example, in one embodiment, ASC 100 may be configured with a solar override during the sunrise that brings window coverings 255 down in the east side of the structure and move them up as the sun moves to the zenith. Conversely, during sunset, ASC 100 may be configured to move window coverings 255 down on the west side of the structure to correspond to the changing solar angle during this time period. In another embodiment, ASC 100 may be configured with a reflectance override during the sunrise that brings window coverings 255 down in the west side of the structure due at least in part to light reflected onto the west side of the structure, for example light reflected off an adjacent building with a reflective exterior. Moreover, when trying to preserve a view under unobtrusive lighting conditions, a Sunrise Offset Override or a Sunset Offset Override may lock in the shade position and prevent the ASC from reacting to solar conditions for a preset length of time after sunrise or a preset length of time before sunset.

Moreover, ASC 100 may be configured with a particular subset of components, functionality and/or features, for example to obtain a desired price point for a particular version of ASC 100. For example, due to memory constraints or other limitations, ASC 100 may be configured to utilize the average solar position of each week of a solar year, rather than the average solar position of each day of a solar year. Stated another way, ASC 100 may be configured to determine changes to the solar curve on a weekly basis, rather than on a daily basis. Moreover, ASC 100 may be configured to support a limited number of motor zones, radiometers and/or photometers, proactive and/or reactive algorithms, data logging, and/or the like, as appropriate, in order to obtain a particular system complexity level, price point, or other desired configuration and/or attribute. Further, ASC 100 may be configured to support an increased number of a particular feature (for example, motor zones), in exchange for support of a corresponding decreased number of another feature (for example, solar days per year). In particular, an ASC 100 having a limited feature set is desirable for use in small-scale deployments, retrofits, and/or the like. Additionally, an ASC 100 having a limited feature set is desirable to achieve improved energy conservation, daylighting, brightness control, and/or the like, for a particular building. Moreover, ASC 100 may be configured as a stand-alone unit having internal processing functionality, such that ASC 100 may operate without requiring computational resources of a PC or other general purpose computer and associated software.

For example, in various embodiments, ASC 100 comprises a programmable microcontroller configured to support 12 motor zones. The programmable microcontroller is further configured to receive input from 2 solar radiometers. Moreover, in order to provide scalability, multiple instances of an ASC 100 may be operatively linked (i.e. "ganged") together to support additional zones. For example, four ASCs 100 may be ganged together to support 48 zones. Additionally, ASC 100 is configured with an IP interface in order to provide networking and communications functionality. Moreover, ASC 100 may be configured with a local communication interface, for example an RS-232 interface, to facilitate interoperation with and/or control of or by third-party systems. ASC 100 may also be configured with one or more of a graphical user interface, buttons, switches, indicators, lights, and the like, in order to facilitate interaction with and/or control by a system user.

Further, in this exemplary embodiment, ASC 100 may be configured with a basic event scheduler, for example a scheduler capable of supporting weekly, bi-weekly, monthly, and/or bi-monthly events. ASC 100 may also be configured with a time-limited data log, for example a log containing information regarding manual and/or automatic shade moves, the solar condition for one or more days, system troubleshooting information, and/or the like, for a limited period of time (e.g., 30 days, or other limited period selected based on cost considerations, information storage space considerations, processing power considerations, and/or the like).

Moreover, in this exemplary embodiment, the programmable microcontroller of ASC 100 may be configured to utilize a limited data set in order to calculate one or more movements for a window shade. For example, ASC 100 may be configured to utilize one or more of ASHRAE algorithms, window geometry, window size, window tilt angle, height of the window head and sill off the floor, motor zone information, solar orientation, overhang information, window glazing specifications (i.e., shading coefficient, visible light transmission, and the like). ASC 100 may then calculate solar angles and/or solar intensity (i.e., in BTUs or watts per square meter) for each motor zone and/or solar penetration for each motor zone. Based on a measured and/or calculated sky condition, one or more window shades may then be moved to an appropriate position. ASC 100 may further utilize both shade movements resulting from real-time calculations (for example, calculations based on sensor readings) as well as scheduled shade movements.

Figure 12:
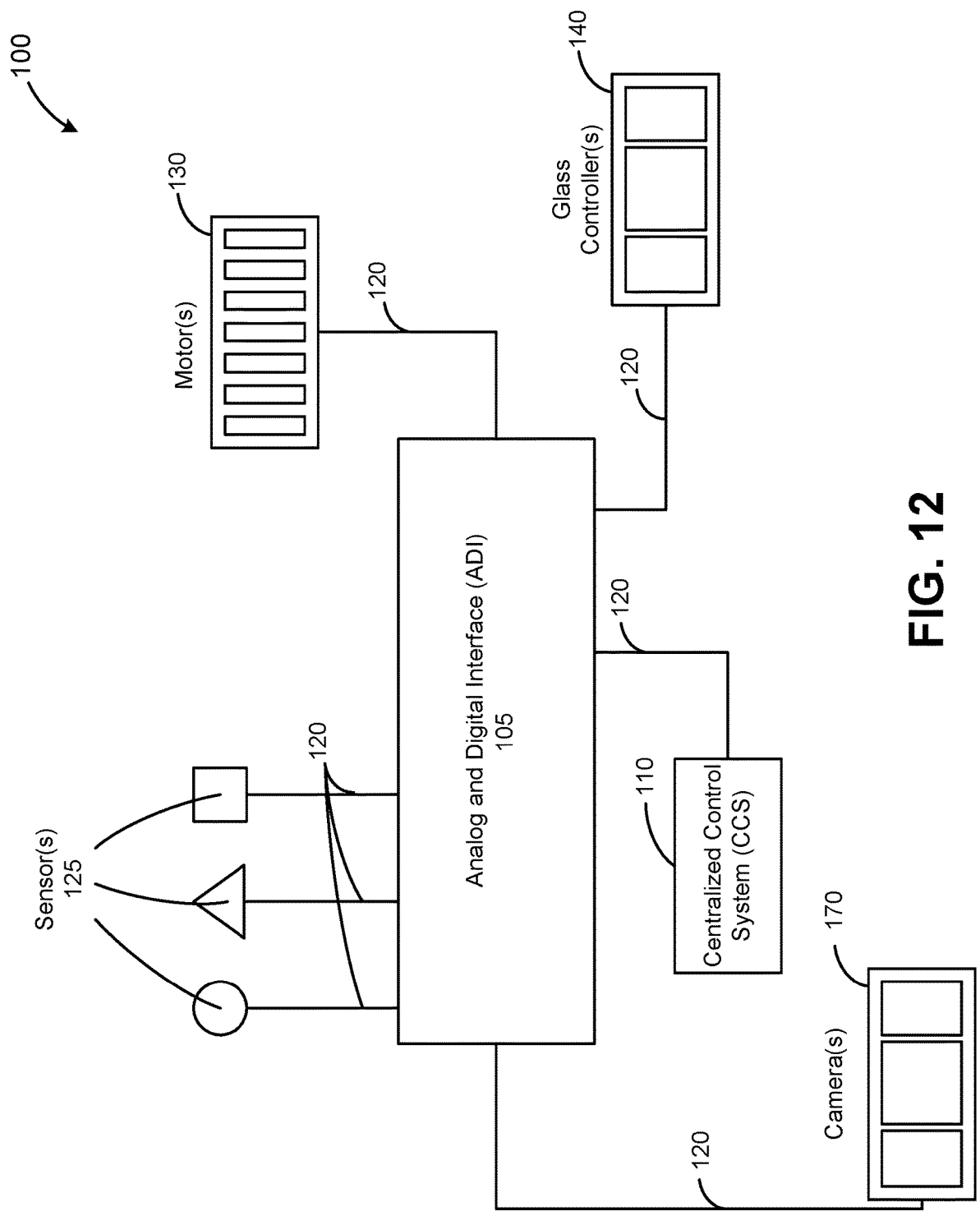
FIG. 12 illustrates a block diagram of an exemplary automated control system utilizing cameras in accordance with various embodiments.

With reference now to FIG. 12, ASC 100 is configured as (and/or is configured to utilize and/or be coupled to) a sky camera system. In various embodiments, ASC 100 utilizes one or more digital imaging systems (for example, cameras 170) to provide images for use in connection with one or more algorithms operable within ASC 100. Cameras 170 may comprise visible light cameras, infrared cameras, ultraviolet cameras, and/or cameras with similar features. Moreover, in addition to camera functionality, cameras 170 may be configured with various sensors, for example temperature sensors, ultraviolet light sensors, wind sensors, radiometers, photometers, and the like.

In contrast to prior approaches set forth in the background, principles of the present disclosure contemplate a sky camera system utilizing a plurality of cameras 170. For example, an exemplary sky camera system may utilize cameras 170 linked via an electronic network to one another and/or to ASC 100. The sky camera system can utilize images from multiple high quality, or more preferably for purposes of cost, lower quality cameras 170 as the basis for a more precise analysis. The lower quality cameras 170 may be spread out in distance such that the system can view several portions of the sky dome from different camera positions and/or orientations at the same time. The number of surrounding cameras 170, the quality of the connection between them, the reliability in sampling time between images, the working percentage and orientation of each camera's 170 view, and the distance between them are exemplary variables that may be utilized by the sky camera system. As clouds pass outside of the view of one camera 170 and into the view of another camera 170, the sky camera system can track the movements and characteristics of the clouds more precisely than is possible with one camera. This exemplary network of cameras 170 ultimately becomes much more useful than a single point camera. Further, by using a network of installed cameras 170, a sky camera system can support intelligent control at locations which do not have access to mount a camera 170 unit. Additionally, a sky camera system can support intelligent control of a building which lacks a suitable view of the sky from any accessible part of the building. In such case, an exemplary sky camera system may utilize network cameras 170 in the general vicinity (for example, within a half-mile radius, a one mile radius, a five mile radius, a ten mile radius, or the like) to provide sky images for analysis.

In various embodiments, cameras 170 within a 5 mile radius of a building are utilized to augment information (and/or act in liu of information) available from a particular camera 170 associated with that building. For example, additional cameras 170 may capture portions of the sky that are not visible to an onsite camera 170 due to obstructions such as nearby buildings.

Moreover, cameras 170 outside the 5 mile radius may be useful for forecasting how the sky will change over a particular future timetable, for example the next 5 minutes, 10 minutes, 15 minutes, 30 minutes, 1 hour, 2 hours, or the like, depending at least in part on how far the cameras 170 are located from the location in question.

An exemplary sky camera system is configured to view different portions of the sky via multiple cameras 170, which in turn allows the sky camera system to better evaluate the type of sky condition presented at a particular location at any given time. For example, by comparing a northern portion of the sky to a south-western portion, the sky camera system can determine if conditions represent an overcast sky with uniform brightness or a relatively clear sky. Moreover, by evaluating differences in cloud cover as viewed by multiple cameras 170, the sky camera system can determine a gradation or degree of overcast, and/or a general directionality of diffuse light arising from an overcast sky (for example, an overcast sky that is generally brighter in an eastern direction than in a western direction). In other cases, the sky camera system may rely on one view during morning time around sunrise and another around sunset time; in this manner, the sky camera system can utilize particular cameras 170 which, based for example on field of view, are particularly well suited to evaluation of sky conditions for a particular time, date, or the like.

An exemplary sky camera system correlates the view from one or more cameras 170 into a macro view of cloud conditions in the area from a weather satellite network. As the sky camera system establishes outlines of major cloud activity within the view of a camera 170, knowing the orientation and field of view of that camera 170, the sky camera system builds a translation of that cloud outline into the view of neighboring cameras 170, taking into account each neighboring camera 170's specific orientation and view. The ability of an exemplary sky camera system to map local imagery into a global satellite view of cloud activity facilitates significantly improved overall microclimatic cloud characterization, thus leading to improved control of building shades, electrochromic glazings, lighting systems, and/or the like.

In various embodiments, a sky camera system utilizes a multi-pixel view of the sky with respect to a location of interest, for example a building where automated control of one or more of shades, electrochromic glass, HVAC, lighting, and/or the like is desired. The multi-pixel view may be configured as a grid, for example a grid centered on the building. Alternatively, the multi-pixel view may be configured via a radial coordinate system. Moreover, any suitable coordinate system and/or division of the sky into segments may be utilized by the sky camera system. In various embodiments, a sky camera system may utilize a representation of the sky comprising as few as 4 segments or as many as 256 segments. Moreover, the sky camera system may utilize the known position of the sun based on time, date, latitude, longitude, and so forth. The sky camera system may utilize digital images from cameras 170 having any suitable resolution, for example 640×480 pixels, 1024×768 pixels, 1280×720 pixels, 1920×1080 pixels, 3840×2160 pixels, and/or the like. Additionally, the sky camera system may utilize digital images from cameras 170 having any suitable dynamic range, and does not require use of high-dynamic range images.

In various embodiments, the sky camera system may utilize ASHRAE sky models as disclosed above. Moreover, the sky camera system may utilize CIE sky models, for example the CIE Standard General Sky model pursuant to ISO 15469 and/or CIE S011.

Any suitable cameras 170 may be utilized in connection with a sky camera system. In various embodiments, a sky camera system may utilize a camera or cameras 170 having an associated or bundled sensor or sensors, for example temperature, humidity, barometric pressure, or the like. In various embodiments, camera 170 offers an image resolution of at least 640×480 pixels. Moreover, the cameras 170 may be coupled to a network via wired or wireless approaches, as suitable. Yet further, cameras 170 may be part of a social network whereby public access to camera 170 data is facilitated. Cameras 170 may be distributed across a single network, or multiple networks (public and/or private) as desired, in order to obtain a suitable level of performance for the sky camera system.

In various embodiments, a camera 170 suitable for use with the sky camera system may comprise a SKY2 camera offered by Bloomsky, Inc. (Sunnyvale, Calif.). Moreover, exemplary cameras 170 suitable for use with the sky camera system may be wide view (for example, for general sky observation), narrow view (for example, for specific observations such as sunrise, sunset, reflections from nearby buildings, and/or the like), or variable view (for example, via a zoom lens). Moreover, cameras 170 may be configured with aperture control, shutter speed control, filtering controls, and/or the like. In various embodiments, a camera 170 is configured with a dynamic range sufficient to capture images over a wide range of ambient light levels.

In various embodiments, a sky camera system utilizes a multi-camera, multi-pixel view of the sky for use in connection with building automation and/or control. Use of one or more cameras 170 supports a more precise characterization of the sky condition than can be obtained by one or more individual sensors 125 (such as radiometers) alone. Moreover, combining camera 170 information with individual sensor information allows for advanced prediction and modeling algorithms. Intelligent characterization of the sky facilitates positioning of shades, and in turn provides the basis for integration to support more intelligent building operation for HVAC, lighting, electrochromics, shading, and so forth. In operation of a sky camera system, a desirable outcome is balancing the often-conflicting needs for comfort, view, daylight exposure (for health and productivity, including circadian rhythm optimization), sustainability, and energy efficiency. In one exemplary embodiment, a sky camera system provides a prediction of light levels associated with a location of interest for about 10 minutes into the future. In another exemplary embodiment, a sky camera system provides a prediction of light levels associated with a location of interest for about 30 minutes into the future. In yet another exemplary embodiment, a sky camera system provides a prediction of light levels associated with a location of interest for about 60 minutes into the future. It will be appreciated that the sky camera system may switch between desired predictive modes and/or timelines (for example, switching from providing 10 minute predictions to 30 minute predictions) based at least in part on a desired level of prediction accuracy, a rate of change in the sky or cloud condition, a time of day, and/or the like. For example, a predictive window associated with sky camera system operation around sunrise and/or sunset may be very short (1 minute, 2 minutes, 5 minutes, or the like), as sky conditions and light levels are changing rapidly around those times; conversely, a predictive window associated with sky camera system operation around midday may be longer (for example, 30 minutes) based on slower rates of change of sky conditions and/or light levels at that time of day.

Via use of a multi-pixel view of the sky, a sky camera system configured in accordance with principles of the present disclosure provides enhanced support capabilities. For example, when a building occupant complains about shade position, archived images of the sky condition can be referenced in order to better determine why the shades were positioned as they were. Facilities managers and others can provide detailed responses to occupant inquiries or make adjustments to system operation based on occupant feedback. Moreover, historical data available within the sky camera system may be utilized to learn patterns and in turn to adjust parameters of the sky camera system in the manner of machine learning, such that the sky camera system is self-improving over time.

In various embodiments, a sky camera system supports a global sky condition as well as partitioned sky conditions, which can be related to façade-based solar orientations, multiple façade-based solar orientations (i.e., building corners), sky conditions for different floor heights in the building relative to urban landscape and sky condition, and so forth.

In various embodiments, a sky camera system allows for a real-time determination of actual environmental conditions. For example, a sky camera system can provide real-time information at a desired level of granularity such as, for example, a per-building level, a per-floor level, a per-window level, or even real-time information for different locations within the same room.

In various embodiments, a sky camera system is configured to utilize a "virtual sensor" which can be placed (in a system model within the sky camera system) in any location, for example a location in a modeled room. The virtual sensor may be understood to be a selected point within a 3D computer model of a particular room or building. The virtual sensor provides information regarding environmental conditions associated with the virtual sensor. For example, rather than simply knowing that a particular building is in shadow (or reflected light) based at least in part on information provided by one or more cameras 170, a sky camera system may utilize one or more virtual sensors to determine which parts of that particular building (for example, which windows, rooms, and/or the like) are in shadow (or reflected light). For example, when an evaluation of a particular virtual sensor indicates that the virtual sensor is blocked from a direct view of the sun, and an evaluation of images from one or more cameras 170 indicates that the sun is not occluded (i.e., the sky condition is generally sunny), then the virtual sensor may be utilized to estimate the level of light at the location of the virtual sensor by using one or more associated algorithms, for example a shadow algorithm, a reflectance algorithm, and so forth.

In this manner, the sky camera system may coordinate an appropriate response for each location of interest, for example a first window in a building (for example, at least partially opening a window shade due to shadow on the first window) and an appropriate response for a second window in the same building (for example, at least partially closing a window shade due to a brightness level associated with the second window). Moreover, the sky camera system can utilize both real-time and predictive information, for example in order to take actions (such as opening or closing a shade, dimming or brightening an electrochromic glazing, activating a HVAC or lighting function, or the like) in advance to ensure seamless and unobtrusive management of a particular building or buildings.

In various embodiments, the sky camera system utilizes a virtual sensor to override one or more zones in the event there is an unacceptable level of brightness and/or glare not arising from direct solar penetration, but rather due to sky conditions (for example, a bright overcast sky).

As compared to prior approaches, a sky camera system offers increased ability to evaluate sky conditions beyond just clear and cloudy. The sky camera system can more accurately identify partly cloudy sky, grades of overcast sky, and can even detect types of cloud conditions, allowing the sky camera system to better understand transparency impacts and improve forecasting capability. Moreover, these refined evaluations of sky conditions also offer a better analysis of sky condition at sunrise and sunset.

In various embodiments, a sky camera system facilitates forecasting changes in sky condition as it relates to global and partitioned sky conditions for positioning optimization. This increases the ability of the sky camera system to reduce shade movement based on sky condition changes, which ultimately minimizes distractions to occupants and lengthens window shade motor life. In addition, this also helps to intelligently position and/or control extremely tall shades, and/or other devices such as electrochromic glazings that may have long transition times.

An exemplary sky camera system supports adaptive or artificial intelligence, machine learning, or the like in refining system operation, for example based on feedback from the user. Feedback such as routine overrides at consistent solar angles and sky conditions may suggest setting refinements. A sky camera system may be set into a learning mode, which can be enabled or disabled by zone. The sky camera system may be configured to identify opportunities to refine operation and either make the changes automatically, or recommend the changes to a user or operator of the sky camera system. Moreover, various forms of feedback can be used to keep interested parties, for example a facilities manager, aware of the changes/recommendations.

An exemplary sky camera system facilitates improved virtual brightness algorithms, for example as disclosed in the patents and/or patent applications incorporated by reference herein. For example, a more accurate picture of the sky allows the sky camera system to more accurately qualify the daylight impact for local brightness assessment anywhere in a building—even with urban landscape affecting the view. Additionally, an exemplary sky camera system facilitates improved shadow and/or reflectance algorithms as discussed above. For example, a more accurate evaluation of the overcast state of the sky allows improved evaluation as to when reflected light is, or is not, falling on a particular location of interest; stated another way, given a sufficiently overcast sky, a location of interest that would otherwise be in reflected light may not be in reflected light due to the diffuse, rather than point source, nature of daylight as filtered through an overcast sky.

In various embodiments, information from cameras 170 may be utilized as an input for, or a variable within, one or more of algorithms 600, 700, 750, 800, and/or 900 disclosed above. For example, in algorithm 700, use of a camera or cameras 170 can permit a reduction in the number of photosensors otherwise utilized. Moreover, with regard to algorithms 800 and 900, information from a camera or cameras 170 may be utilized to verify the performance and/or accuracy of such algorithms. Moreover, it will be appreciated that information from a camera or cameras 170 may be integrated into and/or utilized within any control and/or evaluation algorithms or systems disclosed herein.

In various embodiments, the sky camera system may utilize images from cameras 170 to determine a condition of the sky. In one example, the sky camera system may utilize an image (or images) representing a view of the sky at a particular point in time, and segment the image (or images) into two portions: (i) a first portion representing an area generally around (and containing) the known position of the solar disk based on the time, date, camera location, camera angle, lens focal length, etc; and (ii) a second portion representing the remainder of the sky. The sky camera system may analyze the first portion and the second portion independently and/or via different algorithms; alternatively, the sky camera system may apply a common evaluation algorithm, independently, to both the first portion and the second portion.

In various embodiments, the sky camera system processes the first portion of the image to determine an apparent diameter of the solar disk. If the apparent diameter of the solar disk is close to or equal to the apparent diameter that would be expected on a clear day, the sky camera system may determine that a clear sky condition exists. In contrast, if the apparent diameter of the solar disk is significantly larger than the diameter that would be expected on a clear day, or if the solar disk appears irregular in shape or has indistinct boundaries (for example, via a geometric assessment algorithm or the like), the sky camera system may determine that a bright overcast sky condition exists. Moreover, if the solar disk is not distinguishable or if the intensity of the light where the sun should be is below a threshold, the sky camera system may determine that an overcast sky condition exists. In evaluating the condition of the solar disk, the sky camera system may utilize color information, gradient information, intensity information, and/or other suitable information from the image to make a determination about the appearance (or occlusion) of the solar disk.

In various embodiments, in various exemplary embodiments, the sky camera system may analyze the first portion of the image and the second portion of the image to detect the presence of clouds and/or clear sky. For example, the sky camera system may perform a pixel-by-pixel analysis of the RGB content of the image; the higher the degree of "blueness" (i.e., higher blue channel values), the stronger the determination that a particular pixel or group of pixels represents generally clear sky. Likewise, the sky camera system may perform edge detection, evaluation of intensity, color analysis, or other suitable routines to determine which portions of the image represent clouds, and which portions of the image represent clear sky. Moreover, for portions of the image considered to represent clouds, the sky camera system may classify the particular type of cloud, and utilize the type of cloud as an input to one or more algorithms utilized by ASC 100.

In various embodiments, the sky camera system utilizes a machine learning approach whereby images from cameras 170 are compared, via an artificial intelligence algorithm, to prior sky images classified into a corpus. In this manner, the sky camera system can offer improved performance over time, as the ability of the system to effectively identify sky conditions based on prior sky condition images increases.

In various embodiments, the sky camera system will employ a first processing algorithm for images obtained from a first camera 170, and a second processing algorithm for images obtained from a second camera 170. For example, processing of an image from first camera 170 to determine a sky condition may involve different steps, coefficients, or variables than processing of an image from second camera 170, for example due to differences in lens focal length, camera sensor behavior, field of view, and/or the like. In this manner, the sky camera system may apply a processing algorithm to images from each camera 170 that is best suited to facilitate detection of a sky condition from those images.

In various embodiments, the sky camera system may utilize the International Commission on Illumination (CIE) "Spatial Distribution of Daylight—CIE General Sky" (ISO 15469:2004(E)/CIE S 011/E:2003) classification scheme (i.e., five clear sky classes, five partly cloudy/intermediate sky classes, and five overcast sky classes) to identify and group images obtained from cameras 170 and/or to classify or quantify a sky condition associated therewith. In these exemplary embodiments, the sky camera system may classify the sky condition into one of the following standard sky classes:

1. Type I1—CIE standard overcast sky, steep luminance gradation towards zenith, azimuthal uniformity
2. Type I2—Overcast, with steep luminance gradation and slight brightening toward the sun
3. Type II1—Overcast, moderately graded with azimuthal uniformity
4. Type II2—Overcast, moderately graded and slight brightening toward the sun
5. Type III1—sky of uniform luminance
6. Type III2—partly cloudy sky, no gradation toward zenith, slight brightening toward the sun
7. Type III3—partly cloudy sky, no gradation toward zenith, brighter circumsolar region
8. Type III4—partly cloudy sky, no gradation toward zenith, distinct solar corona
9. Type IV2—partly cloudy, with the obscured sun
10. Type IV3—partly cloudy, with brighter circumsolar region
11. Type IV4—white-blue sky with distinct solar corona
12. Type V4—CIE standard clear sky, low luminance turbidity
13. Type V5—CIE standard clear sky, polluted atmosphere
14. Type VI5—cloudless turbid sky with broad solar corona
15. Type VI6—white-blue turbid sky with broad solar corona Stated generally, in an exemplary embodiment ASC 100 determines shade positions (and/or electrochromic glazing settings) based on the calculated position of the sun and the resultant angles of the direct solar ray on any and all facades. The apparent position of the sun in the sky, with respect to a particular building location, may be precisely known based on time of day, day of year, latitude and longitude. So for perfectly clear days, ASC 100 knows how to position all shades, set all electrochromic glazings, communicate with a building management system, and so forth. However, because dynamic micro climatic conditions can cause great variation to the amount of light (and to the characteristics of that light) with respect to a particular building or portion thereof, it is desirable that the sky camera system quantify these other than clear conditions in real time (or as close as possible thereto) in order to optimally position window shades, configure electrochromic glazings, and so forth. Thus, in various exemplary embodiments, images obtained from cameras 170 may be utilized to determine if the sky is clear and if not, to what extent the sun is occluded by clouds. It will be understood that certain types of cloud cover may cause extreme brightness and/or glare without specific directionality (i.e., a bright overcast day). This in turn may make it desirable for shades to deploy to intermediate positions (and/or electrochromic glazings to be set to an intermediate value) in order to down-regulate the amount of light entering the work space across the window height, rather than selecting a window shade position (and/or electrochromic glazing setting) based on a solar angle. Likewise, based on analysis of the images from cameras 170 and the multipixel nature of that information, the sky condition can be determined to be different from façade to façade, allowing the sky camera system to manage each façade individually to more optimally manage the daylight entering the building. For example, it may be determined that brightness due to cloud cover is more pronounced on some building facades, therefore requiring different intermediate shade positioning on different facades.

Moreover, it will be appreciated that analysis of the images from cameras 170 can be utilized to prevent excessive shade movement (which can be distracting to occupants or otherwise undesirable, for example due to increased wear on motors and drive systems), particularly in instances when the sky camera system utilizes images from cameras 170 to identify a particular sky condition (such as a beam of light coming from a small gap in the clouds) to be of limited scope or transitory in duration. Additionally, even when the sky camera system determines that a movement of a shade may be desirable, in order to increase occupant comfort such movement may be delayed and/or prevented based at least in part on a minimum allowable duration between a prior shade movement and a current shade movement. In various embodiments, the sky camera system utilizes a conservative approach, such that with respect to repeated transitions from a cloudy sky condition to a clear sky condition and back again, the sky camera system sets the window shades to a down position most appropriate for the clear sky condition, and thus minimizes and/or eliminates certain shade moves associated with a change in the sky condition. In this process, percentage thresholds may be utilized as desired. For example, in one exemplary embodiment, the sky camera system sets the window shades to a down position responsive to determining that the sky has been (and/or is predicted to be) clear for 50% of a relevant time interval, such over a 30 minute time interval stretching 20 minutes into the past and 10 minutes into the future. A more conservative threshold may be utilized, for example 40% of a relevant time interval. Likewise, a less conservative threshold may be utilized, for example 60% of a relevant time interval. However, any suitable threshold may be utilized.

In various embodiments, a sky camera system may also utilize one or more interior cameras 170, for example to help quantify impacts of exterior conditions. These interior cameras 170 may be utilized during commissioning of a sky camera system and taken away after a certain learning period, or may be installed permanently—for example in lieu of traditional photosensors; thus providing a sky camera system with multi-pixel interior data points instead of single point data. Additionally, interior cameras 170 may be utilized to correlate external sky conditions with interior light levels. However, the sky camera system may be configured with any suitable number of external cameras 170 and/or internal cameras 170.

Some cameras 170 utilize dedicated wired power and data lines, making them impractical to place in some locations that would otherwise be well suited, especially in terms of field of view of the sky, skyline, or the like. Accordingly, an exemplary sky camera system may utilize portable, battery-powered, photovoltaic rechargeable camera units 170. By using multiple cameras 170 in different relevant locations, and by synchronizing the sample times, timed images may be captured at a desired net sample rate for the overall sky camera system (for example, a rate greater than one sample per five minutes), even though no individual camera 170 is capturing images at a rate faster than one image per five minutes. In this manner, the sky camera system may obtain a desired level of sky information while preserving battery life for the cameras 170. Stated another way, by combining multiple cameras 170 in the sky camera system, the sky camera system provides a technical improvement to the operating of each individual camera 170 by extending its operational life and/or reducing its power draw. Moreover, by combining multiple cameras 170 in the sky camera system, the sky camera system improves the functioning of the overall camera network by providing predictive and/or real-time sky condition evaluation that would be degraded and/or impossible to achieve via only a single camera. Yet further, the sky camera system improves the functioning of a particular camera 170 because, when combined with images from other similar cameras 170, the sky camera system can offer a system resolution or level of performance that would otherwise only be possible, if at all, by using a much more expensive and/or higher resolution camera 170. Stated another way, the sky camera system improves the effective resolution of a camera 170. Moreover, the sky camera system improves the functioning of an associated data network by reducing the volume of image information required to be transmitted across the network.

It will be appreciated that a sky camera system also provides a technical improvement to the operating of a motorized window shade, an electrochromic glazing, a building management system, and/or a lighting management system. With respect to a motorized window shade, the sky camera system allows the motor to be actuated less frequently, thus reducing wear on the motor as well as on the guide wheels and other supporting structures associated with movement of a window shade. Thus, the operational lifetime of these components can be extended significantly. Moreover, with respect to an electrochromic glazing, the sky camera system allows the electrochromic glazing to be set to a lower power level, thus conserving energy and allowing the electrochromic glazing to maintain a suitable level of lighting control at a lower power draw. Yet further, the sky camera system provides a technical improvement to the operation of a lighting management system because, based on information received from the sky camera system, the lightning management system can leave various lighting components in a powered-down state, reducing power draw and heat generation associated with the system. None of these technical improvements could be realized to the same degree absent the capabilities provided by the sky camera system.

In various embodiments, the sky camera system archives camera 170 images and/or associated sensor values (for example, in an electronic database), allowing for historical data analysis of the images. Moreover, by correlating sky images and/or sensor values to reported perceived problems with improper or undesirable shade operation, sky camera system performance may be enhanced. For example, a building occupant may complain that a particular window shade was lowered even when the sky outside was cloudy at the time. Archived camera 170 images may establish that the clouds parted briefly, allowing direct sunlight to impinge on the building, and thus the shades descended to protect the occupant from direct sunlight, and retracted once the sun again was obscured by clouds. Put simply, archived images from cameras 170 are desirable in order to establish proper operation of the sky camera system at a particular point in time or under a particular set of conditions. Image archiving also facilitates enhanced reporting capabilities.

In various embodiments, a sky camera system may utilize asynchronous camera units 170. Synchronous camera units 170, and/or a combination of synchronous and asynchronous camera units 170, may also be utilized as inputs to the sky camera system, as desired. Images and other information obtained from cameras 170 may be utilized by the sky camera system, for example on a scheduled basis (such as every 5 minutes), on an interrupt basis (such as every time a new image is received), on a real-time basis, or the like.

In various embodiments, a sky camera system utilizes an algorithm to use discrete sensor information (UV, IR, radiometer, etc.) between camera 170 image captures to help mitigate the effects of a slow image sampling rate and to preserve battery power in a camera or cameras 170. An exemplary strategy includes capturing more images from cameras 170 when deemed necessary, for example due to rapidly changing conditions as indicated by one or more other sensors 125, and capturing fewer images from cameras 170 when conditions are deemed to be stable (for example, when the sky camera system determines that a consistent, dark overcast sky will persist for a period of time, for example 30 minutes, 1 hour, 2 hours, 4 hours, and/or the like).

It will be appreciated that, when feasible, exemplary cameras 170 may be hardwired with power and/or data lines, for example in order to achieve image sample rates directly at a target interval (for example, every 30 seconds, every 1 minute, every 2 minutes, etc.). Moreover, for any particular project (i.e., a particular building), a sky camera system may employ different strategies with respect to how many network cameras 170 are utilized, depending at least in part if at least one camera unit 170 can be attached to the building. In various embodiments, a camera 170 attached to a building intended for management in connection with the sky camera system is connected by power and data lines.

A sky camera system may utilize standard (i.e., non-high-dynamic range) cameras 170, for example in order to reduce cost, and/or in connection with camera 170 locations where the camera is unlikely to see direct sun in its view. Cameras 170 utilized by the sky camera system may utilize fisheye lenses; moreover, lenses with a narrower field of view may be utilized as appropriate, particularly when multiple, at least partially overlapping, cameras 170 are utilized.

In various embodiments, a sky camera system utilizes cameras 170 with clear view of the horizon generally in the eastward and westward directions to better characterize sky conditions at and near sunrise and sunset. Typically, sunrise and sunset are the most difficult times to determine sky condition using conventional sensors due to low light levels and high atmospheric interference and distortion. Moreover, a sky camera system may utilize a motorized positioning capability, allowing movement of the camera 170 view to track parts of the sky which are relevant to current conditions. For example, the sky camera system may utilize this feature to position a camera 170 to look directly in the direction of sunrise and/or sunset, which changes daily.

The sky camera system may be further enhanced by allowing users or databases to input information about sky conditions, for example in a "crowd sourcing" methodology, which can then be used to qualify and/or influence the analysis based on the camera 170 network and sensors.

Moreover, network-based weather services, satellite images, and the like may also be employed in order to supplement the data from the camera 170 network and sensors. These services typically offer intermittent updates (for example, approximately every 15 minutes) and as such may be insufficient to rely upon solely for decision-making by the sky camera system; however, they may be used as supplemental data points, particularly at the time near sunrise and sunset. New satellites are going on line with the promise of better, faster, more reliable data feeds, and as such, principles of the present disclosure contemplate use of satellite imagery both in the present form as well as enhanced future versions. For example, an exemplary sky camera system may utilize visible light satellite imagery, radar satellite imagery, infrared satellite imagery, and/or the like. More specifically, a sky camera system may utilize satellite imagery in the visible and near infrared spectrum (roughly 0.6-1.6 μm wavelength) in connection with information regarding cloud cover, in the infrared spectrum (roughly 3.9-7.3 μm wavelength) in connection with information regarding water vapor, and/or in the infrared spectrum (roughly 8.7-13.4 μm wavelength) in connection with information regarding thermal imaging. Moreover, any suitable type of satellite imagery now available or developed in the future may be utilized as an input to a sky camera system. Additionally, information from various ground-based systems, such as Doppler radar systems, may be utilized as an input to a sky camera system.

Moreover, real-time images from cameras 170 forming part of a sky camera system may be utilized as part of a graphical user interface (GUI) or "dashboard" style interface to enhance the user understanding of and interaction with the system. A single image can convey an enormous amount of data at a glance.

In various embodiments, the ability of a sky camera system to utilize information from a multitude of cameras 170 on a network facilitates intelligent control of small building projects, or on isolated floors of buildings where installation of sensors and control hardware and wiring is impractical.

In various embodiments, a sky camera system utilizes a multi-pixel representation of the sky. The multi-pixel images allow the system to characterize sky type in gradations instead of simply cloudy or clear. This allows intermediate sky types to be determined, for more optimal positioning of shades, settings for HVAC or lighting, settings for electrochromic glazings, and the like.

In various exemplary embodiments, a multi-pixel representation of the sky (e.g., as obtained via a sky camera system as disclosed above) may comprise a pixelated view of the color temperature outside a building, around/above a location of interest, or the like. Stated another way, the multi-pixel representation of the sky comprises color temperature information. Thus, the sky camera system possesses a nuanced view of how the natural world around the building is performing. This detailed view can be utilized by the sky camera system in various embodiments, for example, in connection with management of building lighting. Moreover, the sky camera system can utilize predictive algorithms, including algorithms disclosed hereinabove, in order to adjust lighting in a building in advance of external lighting changes. For example, the sky camera system can be configured to make a single adjustment in advance of a change in external lighting conditions; alternatively, the sky camera system can be configured to make a series of gradual adjustments (for example, over a period of between about 5 minutes and 30 minutes prior to a predicted change in external lighting conditions).

Figure 13:
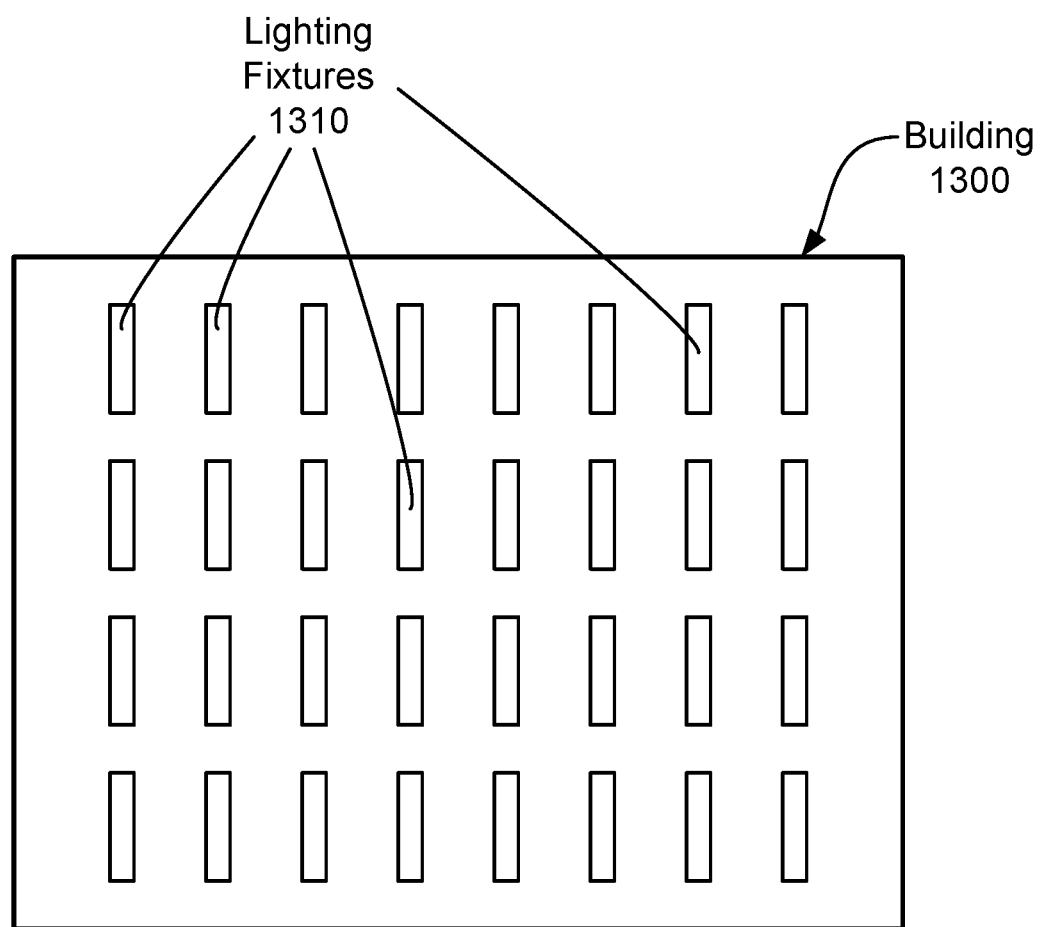
FIG. 13 illustrates a sky camera system interacting with lighting fixtures of a building in accordance with various embodiments.

With reference now to FIG. 13, based on the multi-pixel representation of the sky, the sky camera system may evaluate, consider, compute, correlate, compare, and/or otherwise make calculations or decisions on how internal lighting of an exemplary building 1300 may interact with the available natural light. For example, the sky camera system may send a signal that causes a system to turn a light source on, turn a light source off, increase the luminance of a light source, decrease the luminance of a light source, modify the color temperature of a light source, and/or the like. It will be appreciated that exemplary lighting fixtures 1310 communicating with the sky camera system may utilize technology, whereby discrete adjustments of light level and/or adjustments of color temperature may be realized. For example, the technology may include light emitting diode (LED) technology. Moreover, in various exemplary embodiments, lighting fixtures 1310 are capable of adjusting light level and color temperature independently of one another, such that the light output of the fixture, and the color temperature of that light, may each be selected from within a range of possible values.

For example, in various exemplary embodiments lighting fixtures 1310 are configured with various LEDs that generate light of differing color temperatures, for example a first set of LEDs generating white light having a high color rendering index (CRI) of 90 or above and a color temperature of about 1800 Kelvin (K), and a second set of LEDs generating white light having a CRI of 90 or above and a color temperature of about 5000K. By varying the relative output of the first set of LEDs and the second set of LEDs, the color temperature of the overall light output of a lighting fixture 1310 may be modified, while the luminance of the overall light output of the lighting fixture 1310 may remain the same or similar. However, any suitable components or methods for varying the luminance and/or color temperature of light produced by operation of lighting fixture 1310 may be utilized, as desired.

In various embodiments, the sky camera system averages the color temperature in the multi-pixel representation of the sky. The sky camera system may also segment the color temperature at the pixel level. Yet further, the sky camera system may divide the sky into multiple sections, with each section comprising a plurality of pixels, and average the color temperature within each section. The multi-pixel representation of the sky may be utilized by the sky camera system to enhance building 1300 occupant comfort and performance, for example in order to optimize circadian stimuli. It will be appreciated that the sky camera system can evaluate the view of every window in building 1300 to the sky, and thus support multiple simultaneous lighting strategies such as, for example, different strategies by floor, by façade, and/or even by room/office/window of building 1300.

In various embodiments, the multi-pixel representation of the sky is utilized by the sky camera system to create (e.g., within building 1300 and using the internal lighting fixtures 1310 of building 1300) a dynamic replica of the external color temperature outside building 1300. Stated another way, the sky camera system may be utilized to create an environment, at a location within building 1300, that has a similar color temperature profile as would exist if there were no obstructions to natural light above that location. Considered yet another way, the sky camera system may be utilized to create a "transparent building" effect, whereby an occupant of building 1300 experiences a lighting environment having a color temperature profile that is similar to the lighting environment the occupant would experience if building 1300 and items therein were transparent to the naturally impinging light.

For example, at a particular point in time, with respect to a building 1300, the sky generally to the westward may have a generally warmer color temperature, for example as a result of sunlight passing through diffuse dust as the sun moves lower in the western sky. At the same time, the sky generally to the eastward may have a generally cooler color temperature. Yet further, at the same time the sky generally to the northward may have an intermediate color temperature, but also be generally darker and thus less luminous, for example due to the presence of cloud cover to the north of building 1300. All of this information is reflected in the multi-pixel representation of the sky for building 1300 at the particular point in time. The sky camera system adjusts the output and color temperature of lighting fixtures 1310 in building 1300 to correspond to the external sky conditions (e.g., lighting fixtures generally to the westward may be shifted to a warmer color temperature, lighting fixtures generally to the eastward may be shifted to a cooler color temperature, and so forth). An occupant of building 1300 is thus presented with artificial lighting which more closely approximates external conditions. Such a lighting environment may be less disruptive to natural circadian rhythms of building 1300 occupants.

Moreover, coordination of lighting fixtures 1310 in connection with operation of a sky camera system may employ use of a shading system to reduce and/or block external sky contributions to a building lighting environment, for example by lowering shades in front of a windowed area to enhance a lighting effect created by lighting fixtures 1310, energizing an electrochromic glazing to reduce visible light transmission into building 1300, and/or the like.

Yet further, the sky camera system may utilize one or more daylight sensors, for example daylight sensors mounted on the mullion of a window or similar location. Each daylight sensor may be in wired or wireless communication with the sky camera system. Moreover, each daylight sensor maybe configured to detect a level of brightness or intensity of light (e.g., lux level) and average color temperature of the sky visible to the daylight sensor/average color temperature of the light impinging on the daylight sensor. Via use of one or more daylight sensors, the sky camera system can qualify and/or quantify lux level relative to a particular sky type or conditions (e.g., clear, cloudy, overcast, bright overcast, and so forth).

In various exemplary embodiments, a daylight sensor 125 relays information wirelessly to a sensor controller such as ADI 105, to CCS 110, and/or directly to an intelligent motor 130. The device receiving the information from daylight sensor 125 may be configured to process algorithms for shade control, electrochromic glazing operation, and/or the like (for example, as disclosed hereinabove) based on the condition of the sky and the lux level.

It will be appreciated that lux level information and color temperature information from a daylight sensor 125 may be utilized by the sky camera system as inputs to a circadian algorithm. For example, a camera 170 may provide a wide-area or 'global' view of sky conditions and illumination, while a daylight sensor 125 may provide a more limited or 'local' view of conditions; thus, the sky camera system may integrate the information from daylight sensor 125 as a further refinement or detail of the overall conditions applicable to a particular area of interest, for example a window. Moreover, lux level information and color temperature information from a daylight sensor 125 may be communicated to one or more external systems, for example a lighting management system, an HVAC system, a building management system, and/or the like, for use in circadian-based control of a building and/or related components.

In various embodiments, the sky camera system utilizes the multi-pixel representation of the sky to control internal building 1300 lighting in a manner that simulates passage of time to building 1300 occupants. For example, using lighting fixtures 1310 under the control of the sky camera system (and/or in communicative connection therewith, for example via a lighting management system), internal building 1300 lighting levels may increase as the sun comes up, internal building 1300 luminance and color temperature may evolve as the day progresses, and eventually internal building 1300 lighting levels may decrease as the sun lowers and sets. Over the course of the day, sun, cloud and shadow movement may be replicated across the floorplan of building 1300. In this manner, the natural passage of time is conveyed via lighting conditions to the occupants.

In various embodiments, the multi-pixel representation of the sky is utilized by the sky camera system to create, within building 1300 and using at least a portion of internal lighting fixtures 1310 of building 1300, a color temperature profile that differs from (and/or compensates for) the external color temperature outside building 1300. For example, if the sky camera system determines that the light entering a particular office window at a point in time has a color temperature that is cooler than a desired color temperature for that office at the point in time, the sky camera system may adjust the artificial lighting for that office to a warmer setting, thus resulting in an overall color temperature profile for the office that is closer to a desired color temperature profile.

In certain exemplary embodiments, control strategies utilized by the sky camera system operate lighting fixtures 1310 in a manner that takes into account various information about one or more occupants of building 1300, for example working shift schedule information, specific health condition information, occupant travel schedule information, chronotype information (e.g., "morning larks" vs. "night owl" information, for example as self-reported by occupants, or as determined for an occupant, for example via an analysis of working behavior, sleep cycles, or the like).

In one exemplary embodiment, the sky camera system is programmed with the locations of each lighting fixture 1310, as well as the lighting distribution and spectral power distribution for each lighting fixture 1310. Moreover, exposure to daylight may be evaluated at multiple locations of interest within building 1300, for example at least one location per control zone, in order to evaluate natural light contribution factors within the relevant space. In this exemplary embodiment, the sky camera system is integrated with a lighting system communication network in building 1300 and has access to address mapping information for each of these calibrated, intelligent lighting fixtures 1310 along with a protocol to command intensity and color temperature settings as described hereinabove.

In this exemplary embodiment, the sky camera system is configured with configuration settings which define the control strategy (for example, on a fixture, room, zone, floor and/or building level) to be employed relative to duplicating or supplementing the external sky contributions when favorable for promoting comfort and productivity, and/or compensating for external conditions in order to make a more productive work environment when conditions are not favorable. For those spaces that do not have access to natural daylight contribution, circadian strategies can also still be deployed which do not have to factor in daylight contribution. Circadian strategies can utilize appropriate principles, for example lighting conditions that reinforce natural patterns of the human circadian cycle with appropriate melanopic light intensity in work areas. For example, in one exemplary embodiment, the sky camera system and lighting fixtures 1310 are operative to ensure 250 equivalent melanopic lux (EML) is present at 75% or more of workstations, at 4 ft above the finished floor, for at least four hours per day. Additionally, ambient lights provide maintained recommended illuminance of EML greater than or equal to lux recommendation from the Illuminating Engineering Society (IES).

In various exemplary embodiments, EML may be calculated by measuring the visual lux and multiplying it by a ratio that correlates to the impact the light has on the body's sleep/wake cycle. Shorter-wavelength light (blue) has a stronger biological response than longer-wavelength light (yellow or red). The ratio of shorter-wavelength light will be higher due to the impact on the body's circadian system. The ratio for a 6500K fluorescent light might be 1.02 because it has a lot of stimulating blue light, while the ratio for a 2950K fluorescent light may be 0.43 because its spectral power distribution (SPD) contains lower amounts of stimulating blue light. It will be appreciated that generally blue light that helps meet EML during the day can have a negative impact on sleep at night. Accordingly, in various exemplary embodiments the sky camera system utilizes color tuning lighting fixtures 1310—they can provide biologically active light during the day at lower power consumption, and adjust to deliver less biologically active light in the evening and night.

In certain exemplary embodiments, the sky camera system utilizes algorithms for solar glare control. This feature helps to mitigate glare from the sun by blocking or reflecting harsh, direct sunlight away from space occupants. Controllable window shades, electrochromic glazings, and/or the like may be utilized to provide controllable or automatic window shading.

In various exemplary embodiments, the sky camera system promotes improved occupant circadian and psychological health by setting thresholds for indoor sunlight exposure. Manual shades can be utilized, but automated shades that respond to changing daylight conditions and integrate with daylight responsive lighting control also increase spatial daylight autonomy. The sky camera system can provide active compensation to levels of daylight level exposure through the shades while employing the lighting system with tunable fixtures to implement optimized spectral exposure for the occupants. For example, a particular building may have a defined "daylight" zone which extends about 20 feet into the building from an exterior wall. Thus, lighting fixtures 1310 located in the daylight zone may be configured to apply a first level of light in connection with a particular exterior daylight condition, while lighting fixtures 1310 located outside the daylight zone may be configured to apply a second, different level of light in connection with that exterior daylight condition. In this manner, the sky camera system can appropriately supplement and/or support building zones where a particular level of external daylight is available. Moreover, the sky camera system may be configured to apply a third level of light via certain lighting fixtures 1310 disposed in building locations which have historically been problematic, for example building corners, irregular-shaped passageways, and/or the like.

In various exemplary embodiments, the sky camera system may be in communication with wearable electronic devices utilized by building occupants, including wearable electronic devices which may feature a light sensor therein. For example, the sky camera system may assess an overall color temperature and/or intensity of outside daylight, and communicate the color temperature information, intensity information, and so forth to a wearable electronic device (for example, via an app operative on the wearable electronic device). The sky camera system may account for obstructions or reductions in light level (for example, due to shade positioning, electrochromic glass conditions, window glass light transmission characteristics, and the like) when providing measured or calculated light information to a wearable device of a building occupant. Additionally, the sky camera system may communicate recommendations or suggestions for meeting a goal or target of a building occupant with respect to light exposure. For example, the sky camera system may send a message to a building occupant, via a wearable electronic device, noting the presence of a bright overcast sky with a high lux level and cool color temperature, and suggest that the user position themselves near an external window while working to help achieve a light exposure goal. Additionally, the sky camera system may receive a message or inquiry from an app operative on a wearable device of a building occupant, requesting information regarding current or anticipated lux level and color temperature information for a location or locations in the building at one or more points in time. Based on the measured or predicted information, the app (and/or the sky camera system) may make recommendations to the building occupant regarding suggested movements or positioning of the occupant with respect to the building over the course of the day. For example: "It looks like the west conference room on the 35$^{th}$ floor will be brightly lit by diffuse sunlight at 3 PM. Consider working in this room from 3 PM to 5 PM to help meet your light exposure goal."

In various exemplary embodiments, the sky camera system is compatible with and/or utilizes visible light communication (VLC) capabilities. For example, the sky camera system may utilize lighting fixtures 1310 (and LED and/or fluorescent lighting elements therein) to send information to opto-electronic devices disposed within and/or receive information therefrom. The sky camera system may utilize principles and standards of visible light communication promulgated by any relevant body, for example standards promulgated pursuant to IEEE 802.15. The sky camera system may utilize VLC to locate the position of a building occupant or for ongoing occupant tracking. Additionally, the sky camera system may utilize VLC for identification of an occupant associated with an override request, for identification of an occupant associated with activation of a switch or control panel, for determining a level of light exposure associated with an occupant, for access control into one or more areas of a building, and/or the like.

In general, the sky camera system may utilize the multi-pixel representation of the sky to make (and/or communicate) any suitable changes, updates, revisions, or controls to operation of internal lighting for building 1300.

As will be appreciated by one of ordinary skill in the art, the present disclosure may be embodied as a customization of an existing system, an add-on product, upgraded software, a stand-alone system, a distributed system, a method, a data processing system, a device for data processing, and/or a computer program product. Accordingly, the present disclosure may take the form of an entirely software embodiment, an entirely hardware embodiment, or an embodiment combining aspects of both software and hardware. Furthermore, the present disclosure may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical." When language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

We claim:
1. A method, comprising:
predicting for a location of interest on a building, by an automated control system and utilizing a first camera image of a sky and using a predictive algorithm, a predicted color temperature associated with the location of interest in advance of the color temperature impacting the location of interest; and
performing, by the automated control system, at least one of:
(i) communicating, to a building management system, information regarding the predicted color temperature at the location of interest in advance of the color temperature impacting the location of interest,
(ii) activating a motor to adjust a window covering associated with the location of interest in advance of the color temperature impacting the location of interest,
(iii) activating a glass controller to adjust a variable characteristic of a glass associated with the location of interest in advance of the color temperature impacting the location of interest,
(iv) communicating, to a lighting control system, information regarding the predicted color temperature at the location of interest in advance of the color temperature impacting the location of interest, or
(v) adjusting, by the automated control system, a color temperature of a lighting fixture associated with the location of interest in advance of the color temperature impacting the location of interest.
2. The method of claim 1, wherein the first camera image is captured by a first camera disposed on the building.

3. The method of claim 1, wherein the automated control system utilizes the first camera image and a second camera image of the sky to predict the color temperature associated with the location of interest.

4. The method of claim 3, wherein the first camera image and the second camera image are captured by the first camera, and wherein the first camera image and the second camera image are captured at least one minute apart.

5. The method of claim 3, wherein the first camera image is captured by a first camera disposed on the building, and wherein the second camera image is captured by a second camera at a location remote from the building.

6. The method of claim 5, wherein the first camera image and the second camera image comprise a partially overlapping view of the sky at a common moment in time.

7. The method of claim 1, wherein the performing is conducted gradually over a period of time.

8. The method of claim 2, wherein the first camera is a low dynamic range camera.

9. The method of claim 2, wherein the automated control system utilizes at least one of:
(i) an ASHRAE clear sky model, or
(ii) a CIE Standard General Sky model pursuant to ISO 15469 and/or CIE 5011.

10. The method of claim 1, wherein the predicting the color temperature associated with the location of interest comprises:
evaluating the first camera image of the sky to obtain a baseline color temperature; and
modifying the baseline color temperature to account for at least one of: time of day, latitude, longitude, direction of view of a camera which captured the first camera image of the sky, Doppler radar information for the location of interest, or satellite imagery for the location of interest.

11. The method of claim 1, wherein the predicting the color temperature associated with the location of interest comprises obtaining, from a color temperature sensor disposed at the location of interest, color temperature information for the location of interest.

12. The method of claim 1, wherein the adjusting a color temperature of a lighting fixture associated with the location of interest is performed to cause a circadian response in an occupant of the location of interest.

13. The method of claim 1, wherein automated control system performs the predicting in connection with dividing the sky into a plurality of zones, and wherein the plurality of zones are configured as a grid centered on the building.

14. The method of claim 1, further comprising:
measuring, by a daylight sensor, a brightness level associated with the location of interest;
determining, based on the brightness level and the predicted color temperature, light exposure information for the location of interest; and
communicating, by the automated control system and to a wearable electronic device of a building occupant, the light exposure information.

15. The method of claim 14, further comprising measuring, by the daylight sensor, a color temperature associated with the location of interest.

16. The method of claim 1, further comprising communicating, via the lighting control system and utilizing one or more visible light fixtures, information to a wearable electronic device of a building occupant.

* * * * *